(12) United States Patent
Matsuzawa

(10) Patent No.: US 11,181,376 B2
(45) Date of Patent: Nov. 23, 2021

(54) INFORMATION PROCESSING DEVICE AND INFORMATION PROCESSING METHOD

(71) Applicant: SONY CORPORATION, Tokyo (JP)

(72) Inventor: Sota Matsuzawa, Tokyo (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 16/099,470

(22) PCT Filed: Feb. 7, 2017

(86) PCT No.: PCT/JP2017/004331
§ 371 (c)(1),
(2) Date: Nov. 7, 2018

(87) PCT Pub. No.: WO2017/199481
PCT Pub. Date: Nov. 23, 2017

(65) Prior Publication Data
US 2019/0195632 A1   Jun. 27, 2019

(30) Foreign Application Priority Data
May 17, 2016   (JP) .............................. JP2016-098874

(51) Int. Cl.
*G01C 21/16* (2006.01)
*G01S 5/14* (2006.01)
(Continued)

(52) U.S. Cl.
CPC .......... *G01C 21/16* (2013.01); *G01C 21/165* (2013.01); *G01C 21/20* (2013.01); *G01P 15/02* (2013.01);
(Continued)

(58) Field of Classification Search
CPC ...... G01C 21/16; G01C 21/165; G01C 21/20; G06F 3/017; G06F 3/0346; G08G 1/005;
(Continued)

(56) References Cited

U.S. PATENT DOCUMENTS

2004/0203904 A1   10/2004   Gwon et al.
2007/0279237 A1*  12/2007   Julian .................... G01S 13/76
                                                                340/686.1
(Continued)

FOREIGN PATENT DOCUMENTS

EP   2779020 A2   9/2014
EP   3007097 A1   4/2016
(Continued)

OTHER PUBLICATIONS

International Search Report and Written Opinion of PCT Application No. PCT/JP2017/004331, dated May 9, 2017, 10 pages of ISRWO.

*Primary Examiner* — Jaime M Holliday
(74) *Attorney, Agent, or Firm* — Chip Law Group

(57) ABSTRACT

Provided is an information processing device including a sensor control unit that acquires inertial sensor data detected by an inertial sensor and distance measuring sensor data detected by a distance measuring sensor. The information processing device further includes a data processing unit that estimates a relative position on a basis of the inertial sensor data and the distance measuring sensor data.

19 Claims, 62 Drawing Sheets

(51) Int. Cl.

| | | |
|---|---|---|
| *G06F 3/01* | (2006.01) | |
| *H04W 64/00* | (2009.01) | |
| *G08G 1/005* | (2006.01) | |
| *G01C 21/20* | (2006.01) | |
| *H04W 4/02* | (2018.01) | |
| *G06F 3/0346* | (2013.01) | |
| *H04M 1/00* | (2006.01) | |
| *G01P 15/02* | (2013.01) | |
| *G08B 21/02* | (2006.01) | |
| *H04M 1/60* | (2006.01) | |

(52) U.S. Cl.
CPC ............... *G01S 5/14* (2013.01); *G06F 3/017* (2013.01); *G06F 3/0346* (2013.01); *G08B 21/0277* (2013.01); *G08G 1/005* (2013.01); *H04M 1/00* (2013.01); *H04M 1/6066* (2013.01); *H04W 4/023* (2013.01); *H04W 4/026* (2013.01); *H04W 64/00* (2013.01)

(58) Field of Classification Search
CPC .. G01P 15/02; G08B 21/0277; H04M 1/6066; H04M 1/00; H04W 4/026; H04W 64/00; H04W 4/023; G01S 5/14
See application file for complete search history.

(56) References Cited

U.S. PATENT DOCUMENTS

| | | | |
|---|---|---|---|
| 2012/0088452 A1 | 4/2012 | Jorgensen | |
| 2012/0203451 A1* | 8/2012 | Kim | G01C 21/165 701/408 |
| 2013/0130712 A1* | 5/2013 | Karasudani | G01S 5/14 455/456.1 |
| 2013/0184005 A1* | 7/2013 | Hieronimi | H04W 64/00 455/456.1 |
| 2013/0249736 A1 | 9/2013 | Nikitin et al. | |
| 2014/0148196 A1* | 5/2014 | Bassan-Eskenazi | H04W 4/029 455/456.1 |
| 2014/0149033 A1* | 5/2014 | Moosavi | G01C 21/206 701/430 |
| 2014/0323162 A1* | 10/2014 | Ezra | H04W 4/023 455/457 |
| 2014/0329543 A1* | 11/2014 | Hayashi | H04W 64/00 455/456.1 |
| 2016/0033634 A1 | 2/2016 | Nikitin et al. | |
| 2016/0112839 A1* | 4/2016 | Choi | H04W 4/80 455/41.2 |
| 2016/0270023 A1* | 9/2016 | Ashizuka et al. | H04W 64/003 |
| 2016/0363661 A1 | 12/2016 | Nikitin et al. | |

FOREIGN PATENT DOCUMENTS

| | | |
|---|---|---|
| JP | 09-138269 A | 5/1997 |
| JP | 2004-061178 A | 2/2004 |
| JP | 2004-215258 A | 7/2004 |
| JP | 2004-354351 A | 12/2004 |
| JP | 2005-156259 A | 6/2005 |
| JP | 2007-114003 A | 5/2007 |
| JP | 2008-089315 A | 4/2008 |
| JP | 2012-038164 A | 2/2012 |
| JP | 2013-117493 A | 6/2013 |
| JP | 2013-172420 A | 9/2013 |
| WO | 2013/084827 A1 | 6/2013 |
| WO | 2013/125306 A1 | 8/2013 |

* cited by examiner

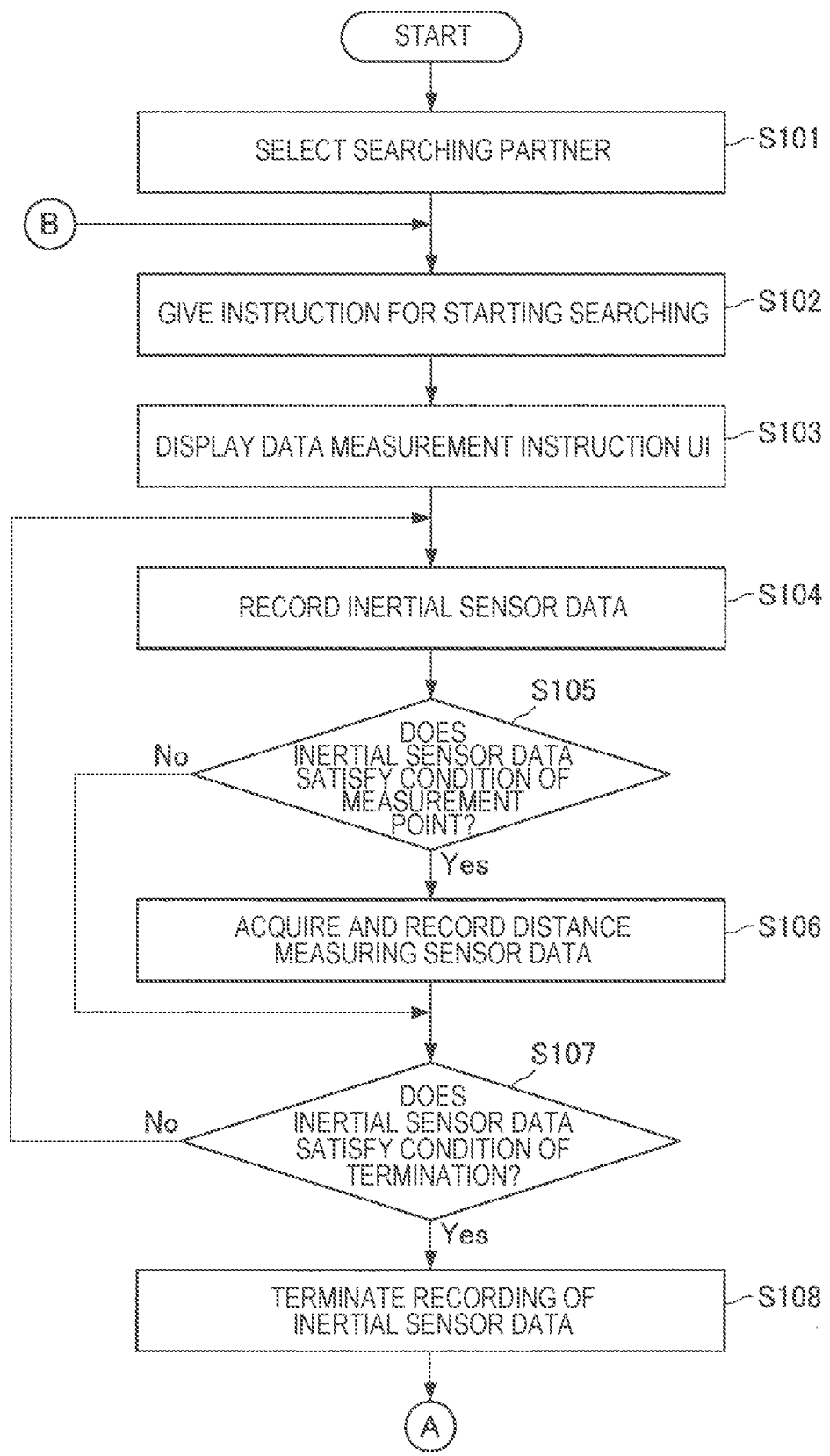

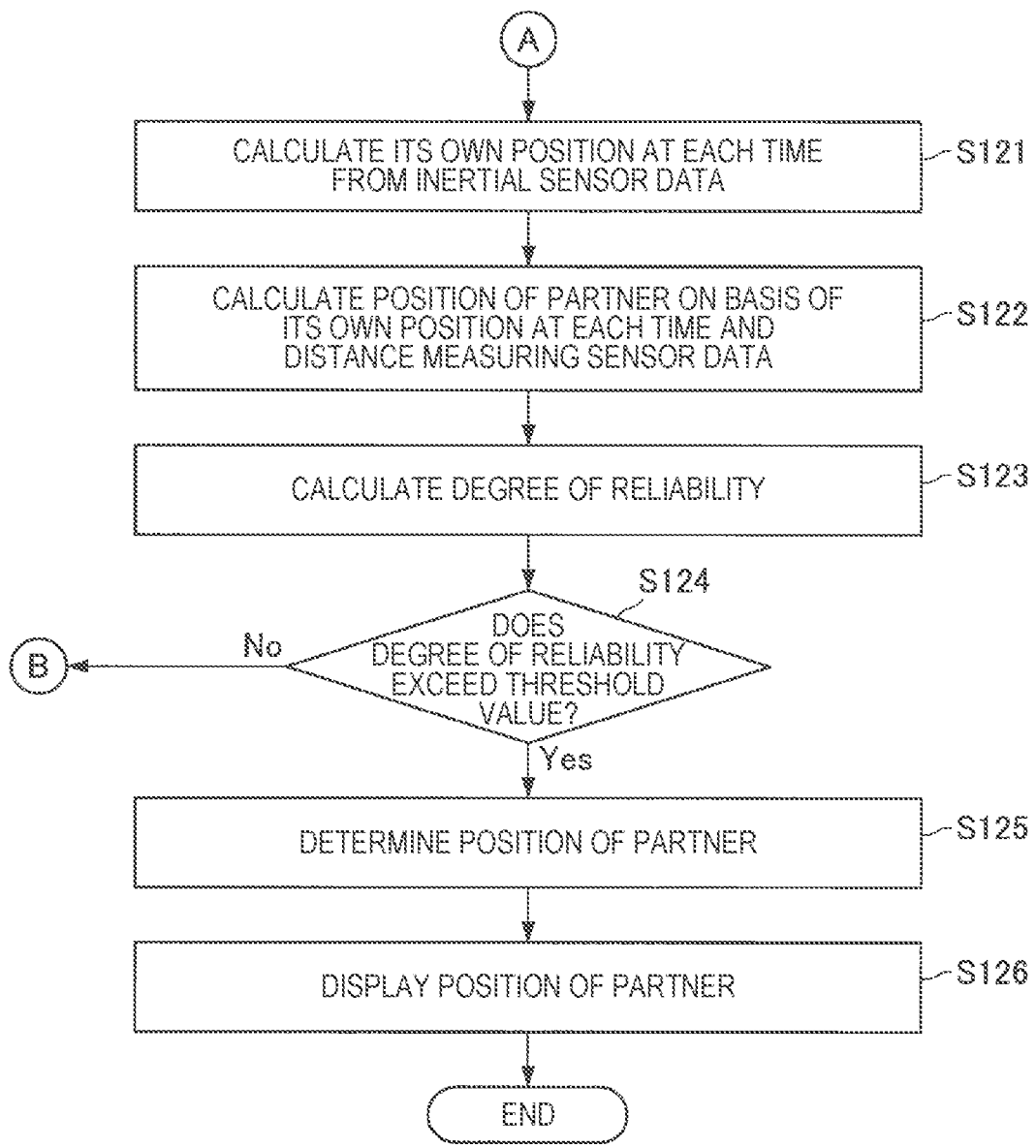

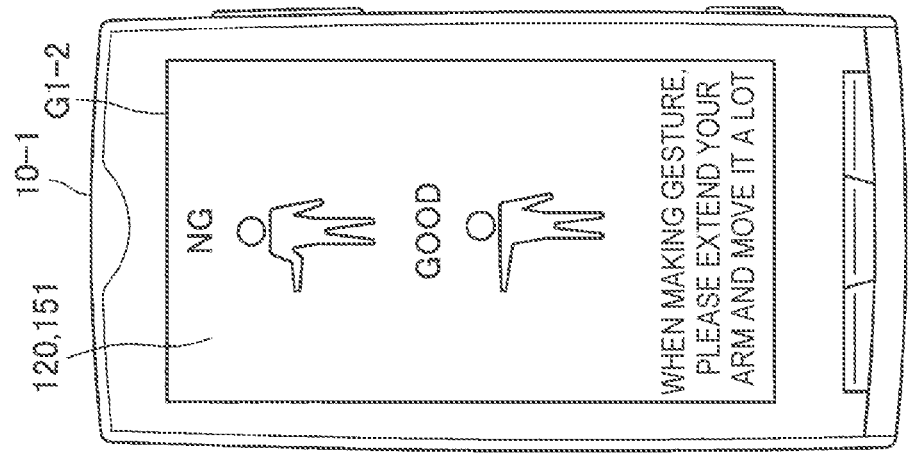
FIG.6
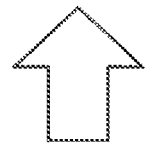
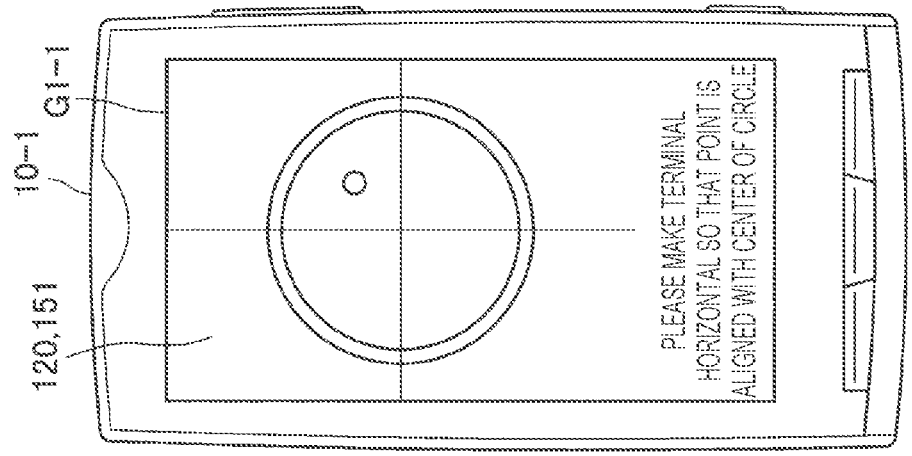

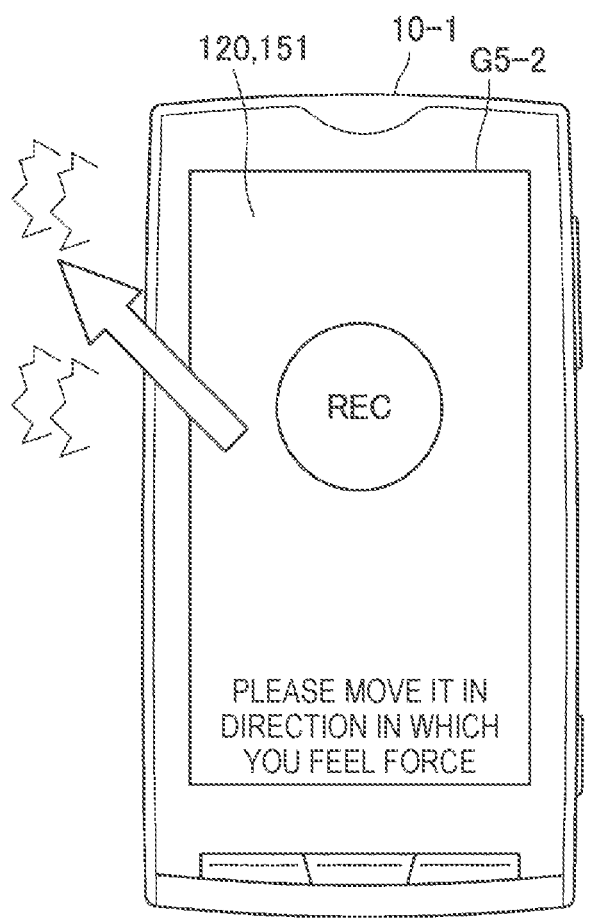

FIG. 11B

|    | Vx | Vy |
|----|----|----|
| t0 | 0  | 0  |
| t1 | 0  | +  |
| t2 | +  | 0  |
| t3 | 0  | −  |

FIG.11C
X-AXIS ACCELERATION
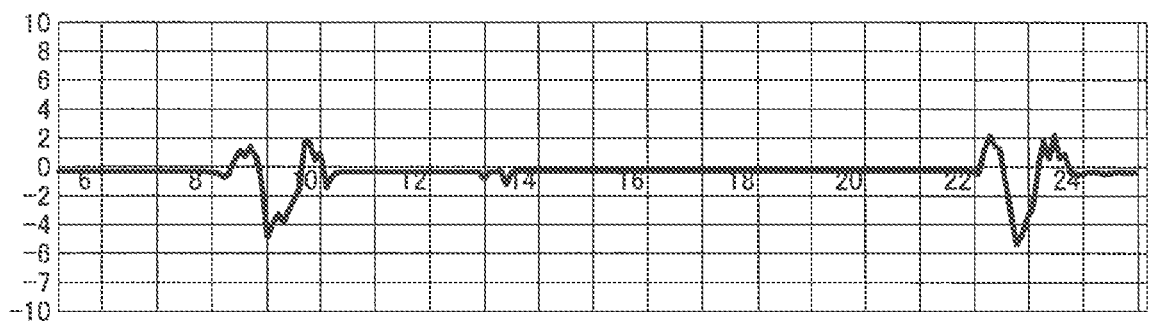
Y-AXIS ACCELERATION
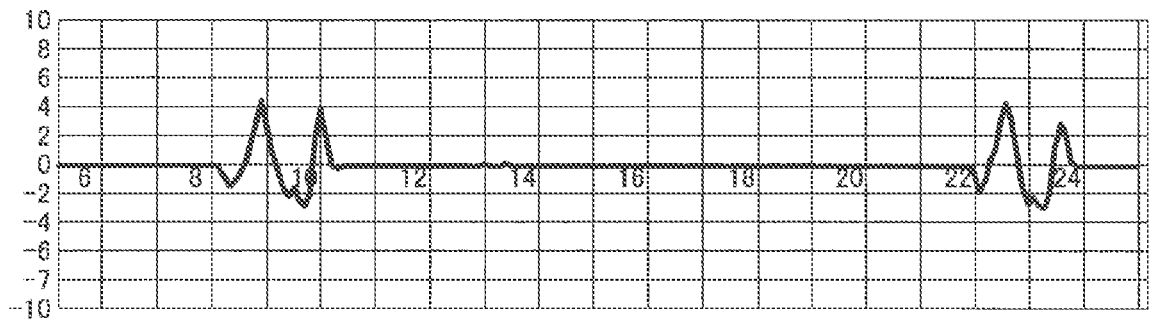

FIG. 12B
X-AXIS ACCELERATION
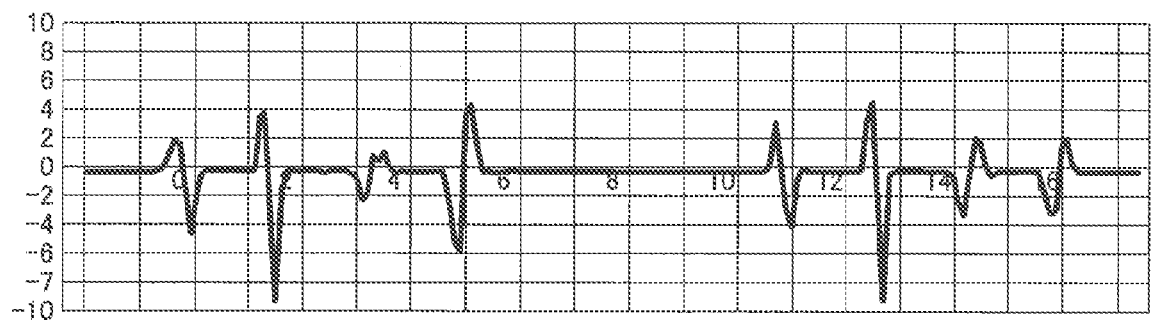
Y-AXIS ACCELERATION
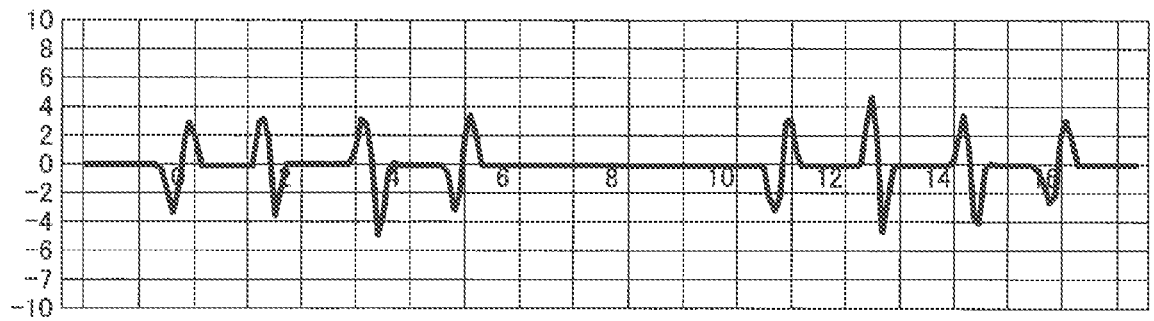

FIG. 13B
X-AXIS ACCELERATION
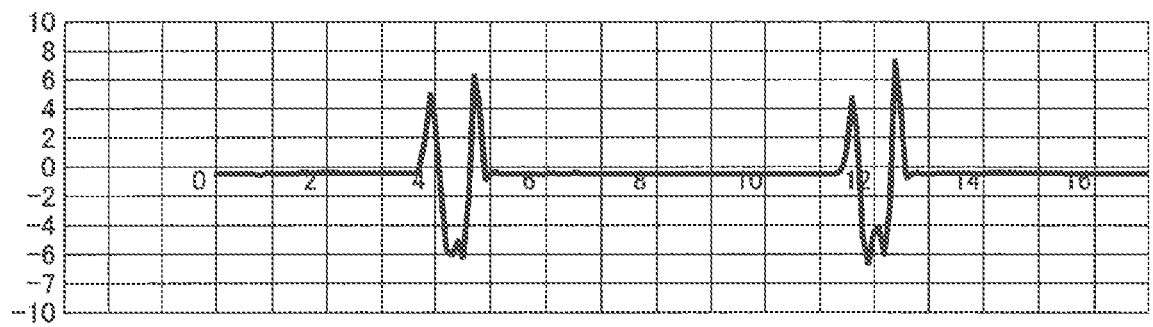
Y-AXIS ACCELERATION
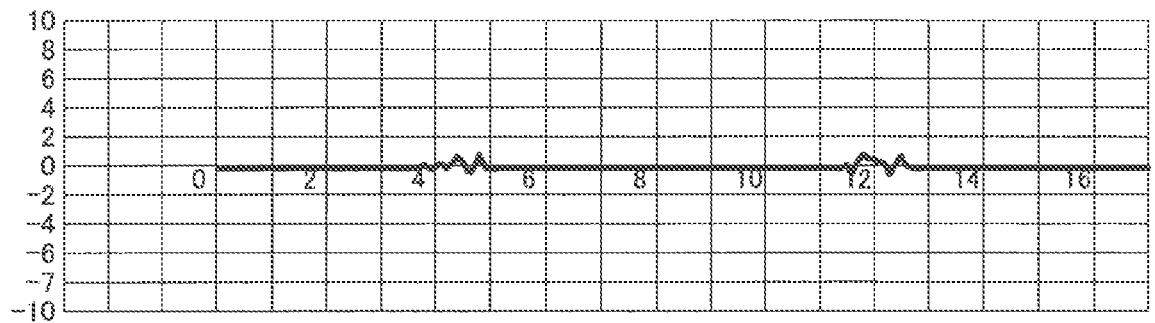

FIG. 14B

|    | X  | Y  | R    |
|----|----|----|------|
| t0 | 0  | 0  | 3.35 |
| t1 | -1 | +2 | 2.69 |
| t2 | +1 | +2 | 1.12 |

FIG. 25
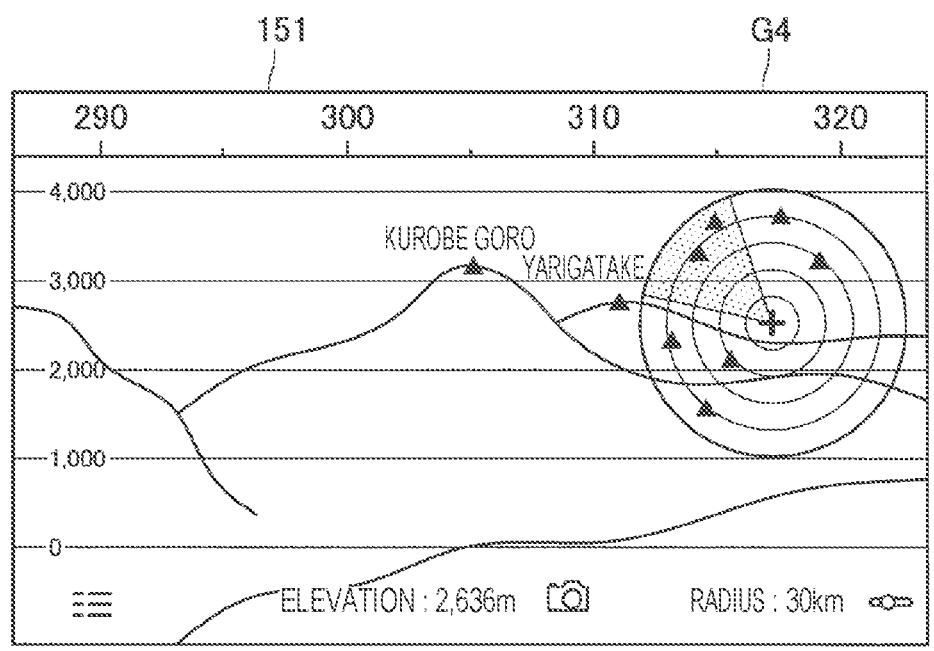
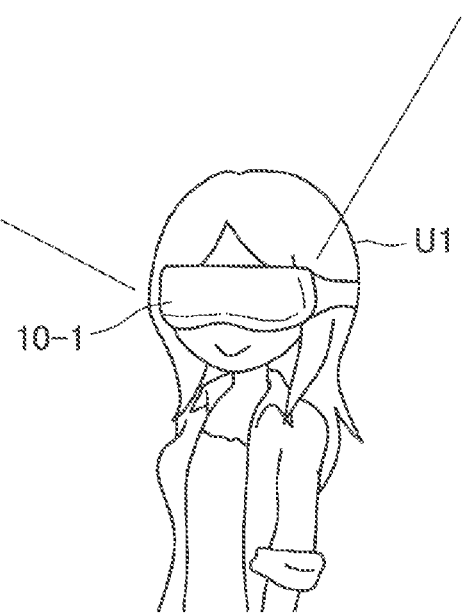

FIG. 31

| DEGREE OF PRIORITY | EXAMPLE OF TYPE OF ERROR | REASON OF ERROR |
|---|---|---|
| 1 (HIGH) | OUT OF DISTANCE MEASUREMENT RANGE | PARTNER IS FARTHER THAN MEASURABLE DISTANCE (OR DISTANCE CANNOT BE MEASURED BECAUSE THERE ARE TOO MANY OBSTACLES) |
| 2 | DURING MOVEMENT OF OBJECT | PARTNER (PARTNER TERMINAL) IS MOVING [SUPPLEMENTATION] - INTERSECTION POINT IS NOT FIXED TO ONE POINT WHEN POSITION OF PARTNER CHANGES DURING MEASUREMENT, AND THUS ESTIMATION CANNOT BE PERFORMED ACCURATELY - WHEN IT IS DETERMINED IN PARTNER TERMINAL WHETHER OR NOT PARTNER IS MOVING, ON BASIS OF INERTIAL SENSOR DATA OR POSITIONING INFORMATION OBTAINED BY GNSS, THE INFORMATION IS RECEIVED - RELIABILITY INSUFFICIENCY ERROR IS FLICKED OUT IN A CASE WHERE PARTNER IS MOVING, AND THUS THERE IS NO PROBLEM IN RESULTS EVEN WHEN PARTNER TERMINAL DOES NOT HAVE FUNCTION OF DETERMINING WHETHER OR NOT PARTNER IS MOVING (DIFFERENCE IS WHETHER OR NOT USER CAN KNOW REASON OF ERROR) |
| 3 | INSUFFICIENCY OF DISTANCE MEASUREMENT POINTS | GESTURE IS NOT SUFFICIENT, AND NUMBER OF DISTANCE MEASUREMENT POINTS DOES NOT SATISFY DESIRED NUMBER (DESIRED NUMBER IS SET IN ADVANCE AT TIME OF DESIGN) |
| 4 | INSUFFICIENCY OF DEGREE OF RELIABILITY | DEGREE OF RELIABILITY DOES NOT EXCEED THRESHOLD VALUE, AND ONLY LOW ACCURACY RESULT IS OBTAINED |
| 5 (LOW) | TIME OUT | MEASUREMENT MODE IS SET, BUT GESTURE HAS NOT BEEN COMPLETED IN SPITE OF LAPSE OF PREDETERMINED TIME |

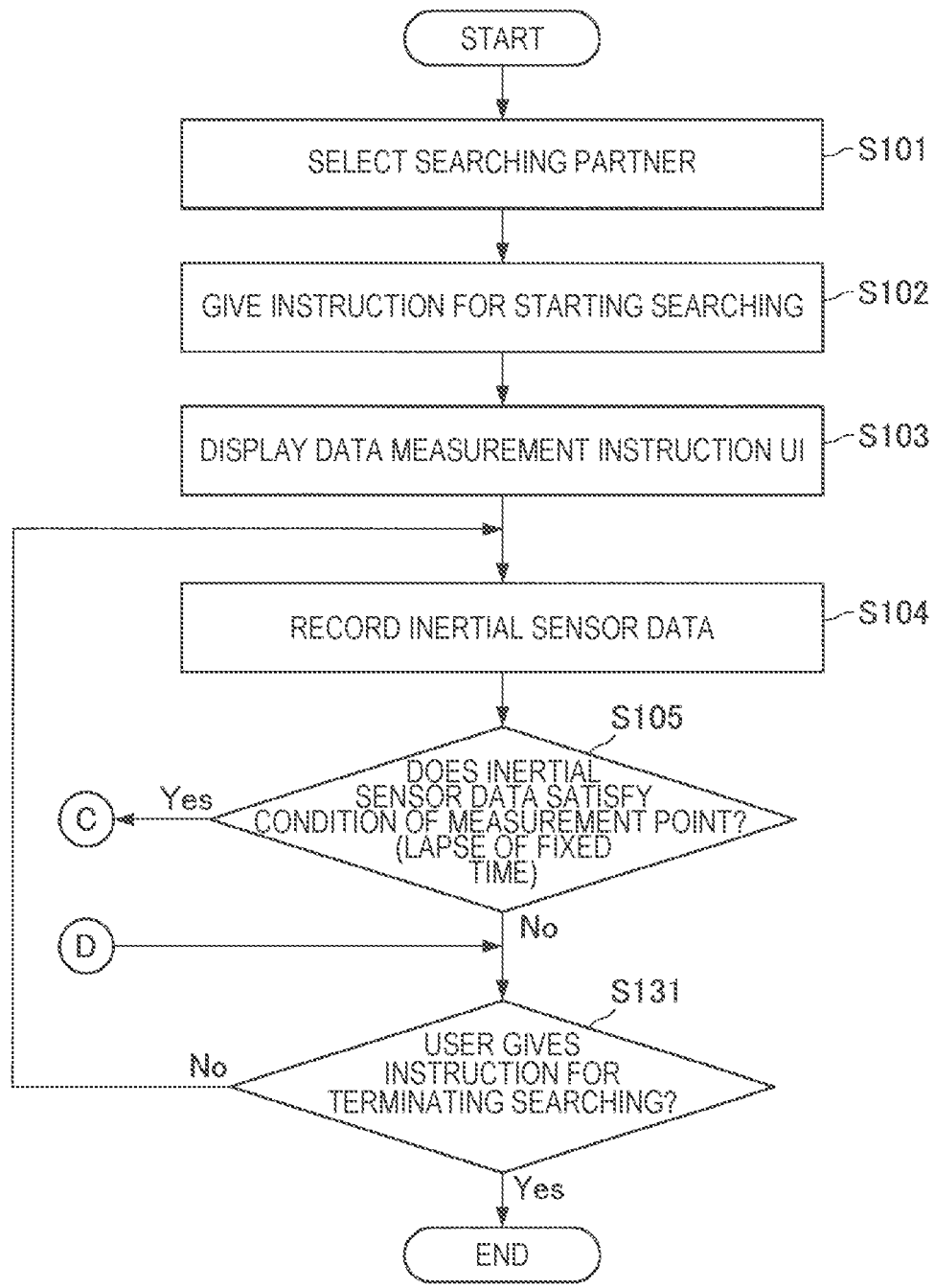

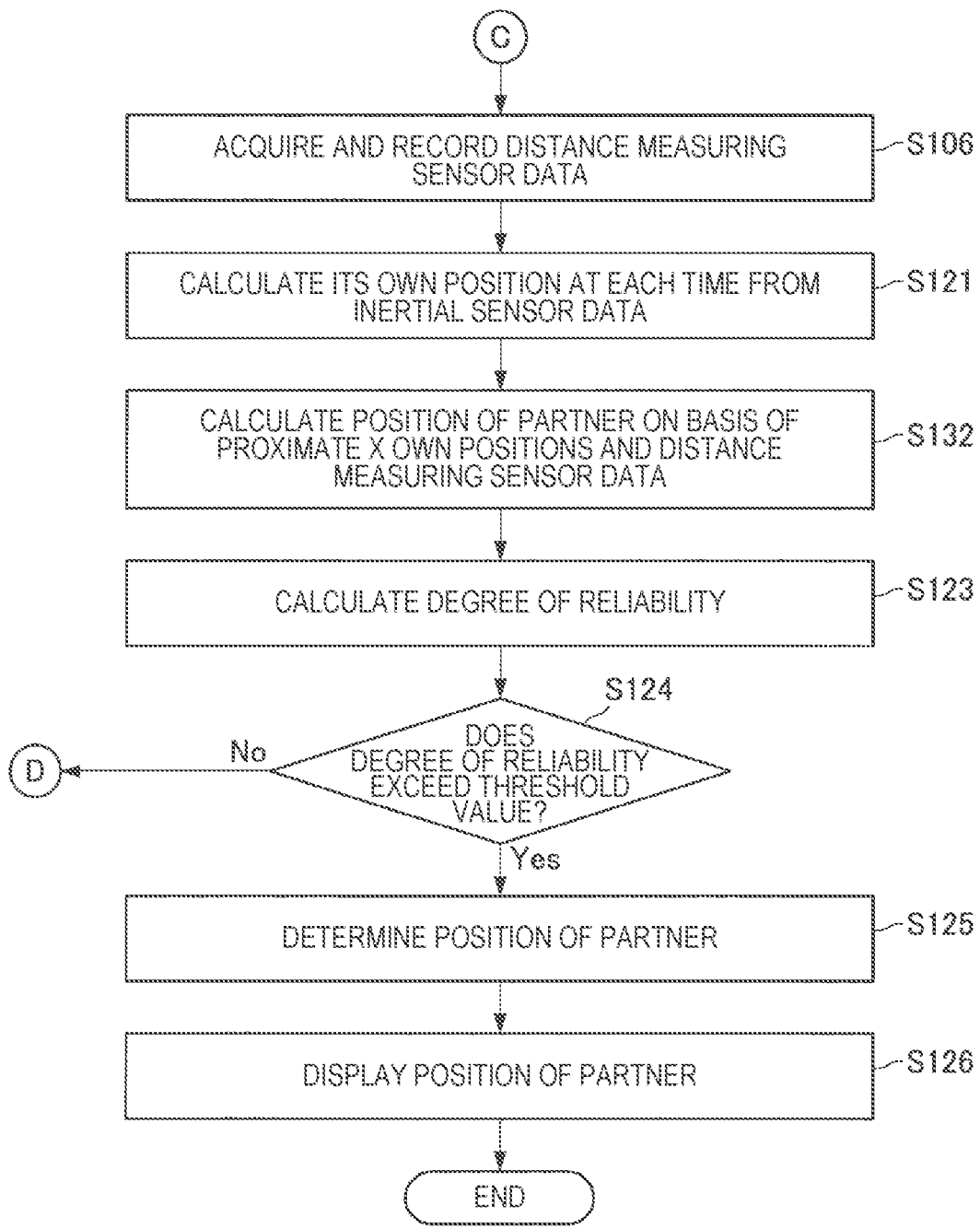

FIG. 38B
X-AXIS ACCELERATION
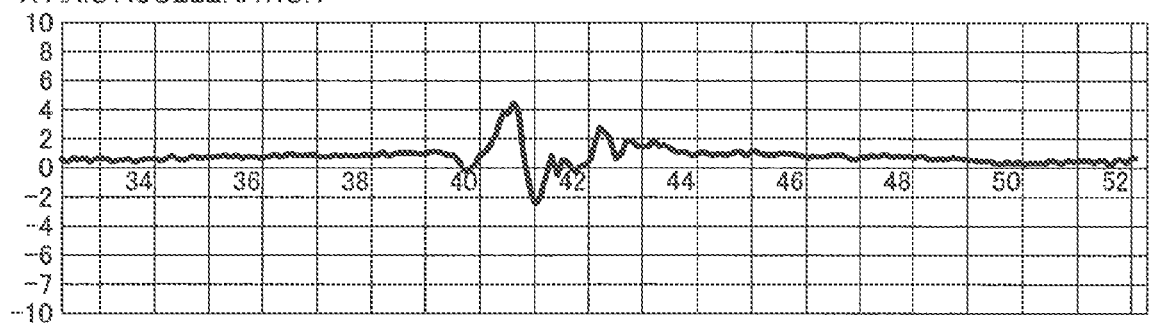
Y-AXIS ACCELERATION
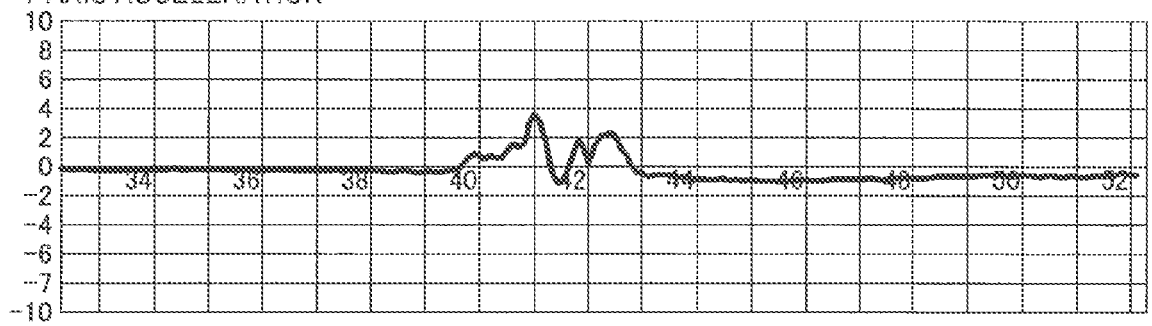

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/004331 filed on Feb. 7, 2017, which claims priority benefit of Japanese Patent Application No. JP 2016-098874 filed in the Japan Patent Office on May 17, 2016. Each of the above-referenced applications is hereby incorporated herein by reference in its entirety.

TECHNICAL FIELD

The present disclosure relates to an information processing device, an information processing method, and a program.

BACKGROUND ART

In recent years, various techniques have become known as techniques for estimating a position. For example, as a technique for estimating the position of an object, an information processing device including a first distance sensor and a second distance sensor is disclosed (see, for example, Patent Literature 1). Such an information processing device estimates the position of an object in the vicinity of the information processing device on the basis of detection results obtained by the first distance sensor and the second distance sensor. However, techniques for estimating the position of an object within a wider area are also known.

For example, a global navigation satellite system (GNSS) such as the Global Positioning System (GPS) is known as a satellite positioning system. In addition, a method of estimating a position using an access point of a wireless local area network (LAN) is also used. Further, a method in which ultra wideband (UWB) receivers are installed in a plurality of indoor places and indoor position estimation is performed using these receivers is also used.

CITATION LIST

Patent Literature

Patent Literature 1: JP 2012-38164A

DISCLOSURE OF INVENTION

Technical Problem

However, it is desirable to provide a technique which is capable of improving the accuracy of position estimation while reducing time and effort for installing facilities in an environment.

Solution to Problem

According to the present disclosure, there is provided an information processing device including: a sensor control unit configured to acquire inertial sensor data detected by an inertial sensor and distance measuring sensor data detected by a distance measuring sensor; and a data processing unit configured to estimate a relative position on a basis of the inertial sensor data and the distance measuring sensor data.

According to the present disclosure, there is provided an information processing method including: acquiring inertial sensor data detected by an inertial sensor and distance measuring sensor data detected by a distance measuring sensor; and estimating a relative position by a processor on a basis of the inertial sensor data and the distance measuring sensor data.

According to the present disclosure, there is provided a program causing a computer to function as an information processing device including: a sensor control unit configured to acquire inertial sensor data detected by an inertial sensor and distance measuring sensor data detected by a distance measuring sensor; and a data processing unit configured to estimate a relative position on a basis of the inertial sensor data and the distance measuring sensor data.

Advantageous Effects of Invention

As described above, according to the present disclosure, a technique capable of improving the accuracy of position estimation while reducing time and effort for installing facilities in an environment is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5A is a flowchart illustrating an example of the overall operation of a host terminal 10-1 according to the first embodiment of the present disclosure.

FIG. 5B is a flowchart illustrating an example of the overall operation of the host terminal 10-1 according to the first embodiment of the present disclosure.

FIG. 6 is a diagram illustrating an example of a data measurement instruction UI.

FIG. 10 is a diagram illustrating another example of a gesture instruction UI.

FIG. 11B is a diagram illustrating an example of speeds at four measurement points in an X-axis direction and in a Y-axis direction in a case where a track has a circular shape.

FIG. 11C is a diagram illustrating an example of accelerations of a terminal in an X-axis direction and in a Y-axis direction in a case where a user moves the terminal twice along a circle in a horizontal direction.

FIG. 12B is a diagram illustrating an example of accelerations of a terminal in an X-axis direction and in a Y-axis direction in a case where a user moves the terminal twice along a rectangle in a horizontal direction.

FIG. 13B is a diagram illustrating an example of accelerations of a terminal in an X-axis direction and in a Y-axis direction in a case where a user moves the terminal twice in a horizontal front-back direction.

FIG. 14B is a diagram illustrating an example of specific values of coordinates and a distance at each measurement point.

FIG. 25 is a diagram illustrating an example of the form of a host terminal.

FIG. 31 is a diagram illustrating an example of information in which the type of error, the reason for the error, and the degree of priority of the error are associated with each other.

FIG. 36A is a flowchart illustrating an example of the overall operation of a host terminal in a case where sequential processing is performed.

FIG. 36B is a flowchart illustrating an example of the overall operation of a host terminal in a case where sequential processing is performed.

FIG. 38B is a diagram illustrating an example of accelerations of a terminal in an X-axis direction and a Y-axis direction in a case where a user moves the terminal as illustrated in FIG. 38A.

MODE(S) FOR CARRYING OUT THE INVENTION

Figure 1:
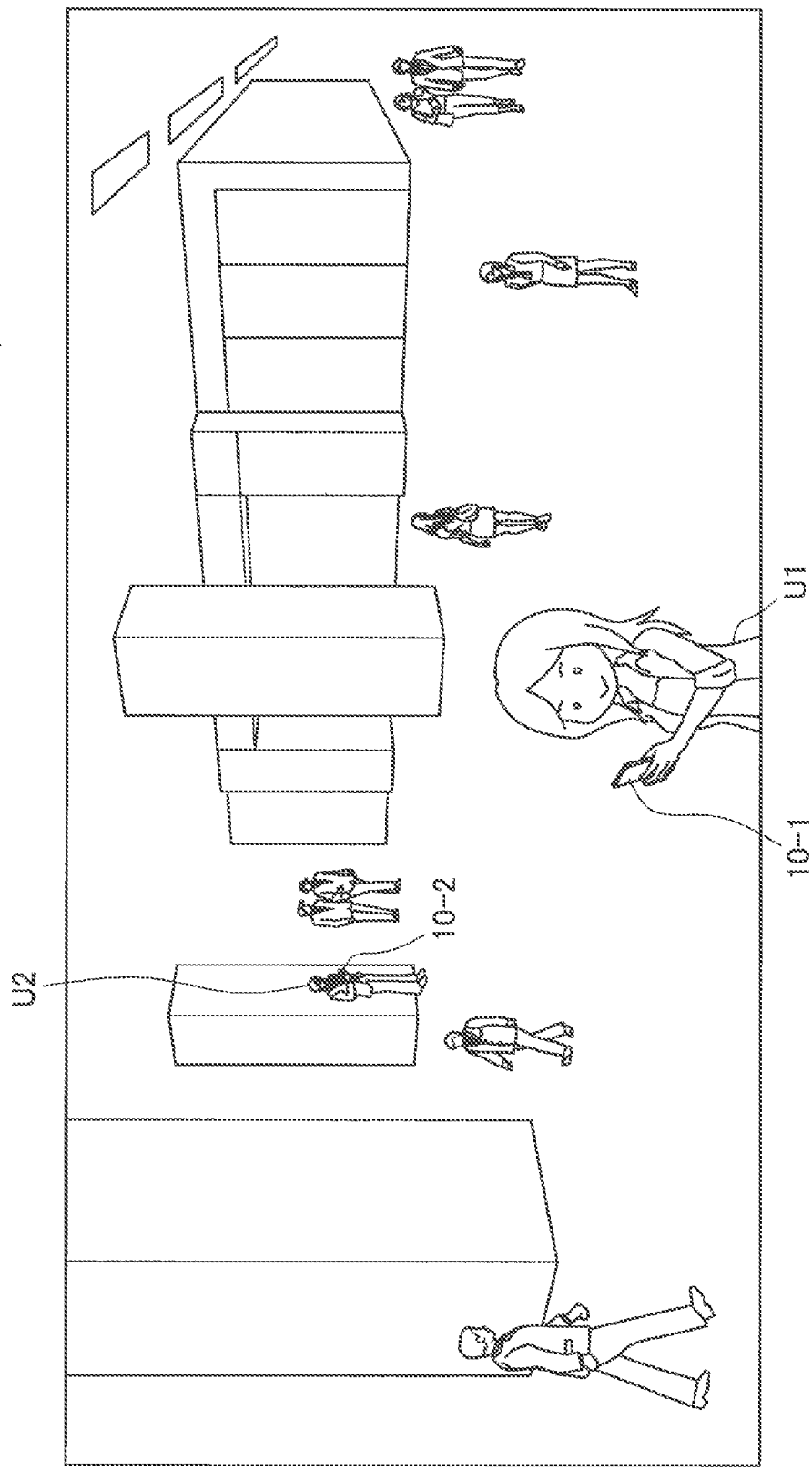
FIG. 1 is a diagram illustrating an image of a first embodiment of the present disclosure.

Hereinafter, (a) preferred embodiment (s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in the present specification and the drawings, structural elements that have substantially the same function and structure are sometimes distinguished from each other using different numbers after the same reference sign. However, when there is no need in particular to distinguish structural elements that have substantially the same function and structure, the same reference sign alone is attached. Further, there are cases in which similar structural elements of different embodiments are distinguished by adding the same reference numeral followed by different letters. However, in a case where it is not necessary to particularly distinguish each of similar structural element, only the same reference signs are attached.

Note that a description will be given in the following order.

0. Background
1. First embodiment (gesture)
1.1. Outline
1.2. Functional configuration example
1.3. Overall operation
1.4. Data measurement instruction UI
1.5. Example of gesture
1.6. Calculation of position of partner
1.7. Calculation of degree of reliability
1.8. Determination of position of partner
1.9. Feedback of position of partner
1.10. Type of error and UI
1.11. Use case
1.12. Sequential processing
2. Second embodiment (PDR)
2.1. Calculation of position of partner
2.2. Use case
3. Hardware configuration example
4. Conclusion 0. Background First, the background of an embodiment of the present disclosure will be described. In recent years, various techniques have become known as techniques for estimating a position. For example, as a technique for estimating the position of an object, an information processing device including a first distance sensor and a second distance sensor is disclosed (see, for example, JP 2012-38164A). Such an information processing device estimates the position of an object in the vicinity of the information processing device on the basis of detection results obtained by the first distance sensor and the second distance sensor. However, a technique for estimating the position of an object in a wider area has been desired.

For example, a GNSS, such as the GPS, and the like are known as a satellite positioning system. However, position estimation using such a satellite positioning system does not improve the accuracy of indoor position estimation. Further, in position estimation using a satellite positioning system, a user's terminal receives radio waves from a satellite, performs positioning on the basis of the received radio waves, and uploads positioning results to a server in order to estimate the relative position of the user with respect to another user. The uploaded positioning results are processed on the server side, and are shared with the other user as position information. In this case, it may be difficult to perform privacy management for the sharing of position information with other users (or a complicated structure may be required for privacy management).

In addition, a method of estimating a position using an access point of a wireless LAN is also used. However, in such a method, time and effort for installing facilities in an environment in advance are required, and the accuracy of position estimation is not that high. In addition, a method in which UWB receivers are installed in a plurality of indoor places and indoor position estimation is performed using these receivers is also used. However, in such a method, time and effort for installing facilities in an environment in advance are required.

Consequently, in the present specification, a technique capable of improving the accuracy of position estimation while reducing time and effort for installing facilities in an environment is mainly proposed. Further, in the present specification, a technique that enables privacy management by eliminating the necessity to upload positional information of a user to a server and by reducing the possibility of the position of the user becoming known to another user in a completely different place (outside a measurement range of a distance measuring sensor) will be mainly described.

The background of an embodiment of the present disclosure has been described above.

<1. First Embodiment (Gesture)>

Next, a first embodiment of the present disclosure will be described. In the first embodiment of the present disclosure, a case where a user performs a gesture of moving a terminal in order to cause the terminal to estimate the position of a partner based on the position of the user himself or herself will be described.

1.1. Outline

First, an outline of the first embodiment of the present disclosure will be described. FIG. 1 is a diagram illustrating an image of the first embodiment of the present disclosure. As a specific example, a case in which a user U1 and a user U2 are a couple, and the user U1 and the user U2 respectively own a terminal 10-1 and a terminal 10-2 which are paired in advance is assumed. The terminal 10-1 and the terminal 10-2 constitute an information processing system 1. A situation is assumed in which the user U1 has promised to meet at a station on the day of a date with the user U2, but the user U1 cannot ascertain where the user U2 is.

In this case, the user U1 takes out the terminal 10-1 and displays a search start button on the terminal 10-1. When the user U1 presses the search start button, a circular track is displayed on the terminal 10-1. When the user U1 performs a gesture of moving the terminal 10-1 in accordance with the circular track, an indicator indicating the direction of the user U2 and a distance between the user U1 and the user U2 based on the user U1 is displayed on a display surface of the terminal 10-1. The user U1 can easily find the user U2 with reference to the displayed indicator.

Figure 2:
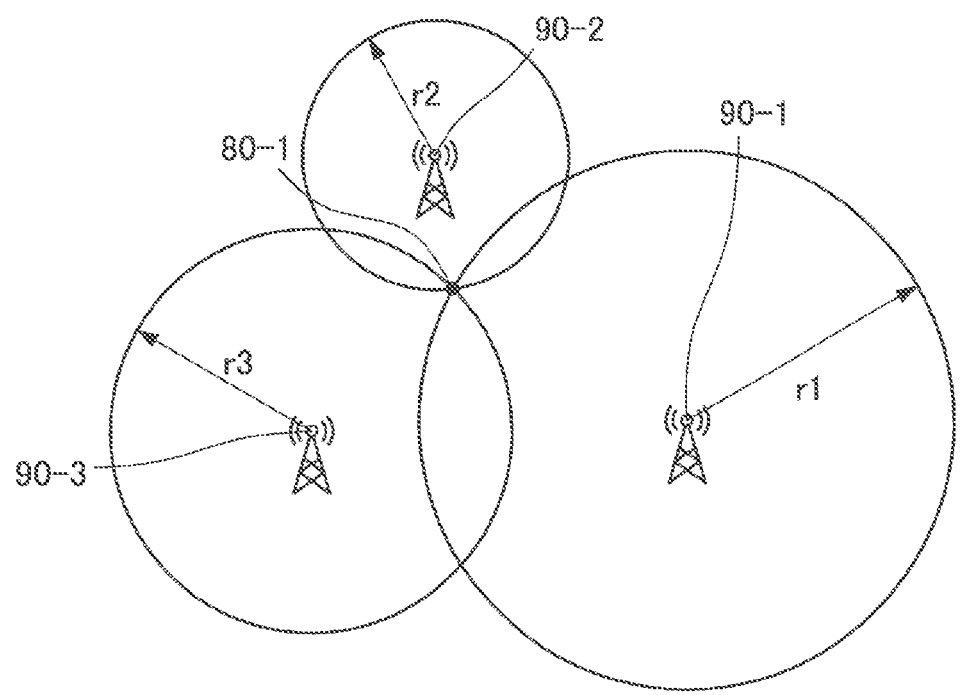
FIG. 2 is a diagram illustrating general positioning technology using fixed stations.

FIG. 2 is a diagram illustrating general positioning technology using fixed stations. As illustrated in FIG. 2, three fixed stations 90 (a fixed station 90-1, a fixed station 90-2, and a fixed station 90-3) are installed in an environment. Here, a case in which the presence of a moving object 80-1 is detected in a place separated from the fixed station 90-1 at a distance r1, from the fixed station 90-2 at a distance r2, and from the fixed station 90-3 at a distance r3 is assumed.

In such a case, the moving object 80-1 is positioned at an intersection point between a circle having a radius r1 centered on the position of the fixed station 90-1, a circle having a radius r2 centered on the position of the fixed station 90-2, and a circle having a radius r3 centered on the position of the fixed station 90-3. However, as ascertained from this example, the fixed stations 90 are required. On the other hand, a technique for performing position estimation using a received signal in an antenna array is also assumed. However, when it becomes necessary to accommodate the antenna array in a device, the designability of the device is deteriorated.

Figure 3:
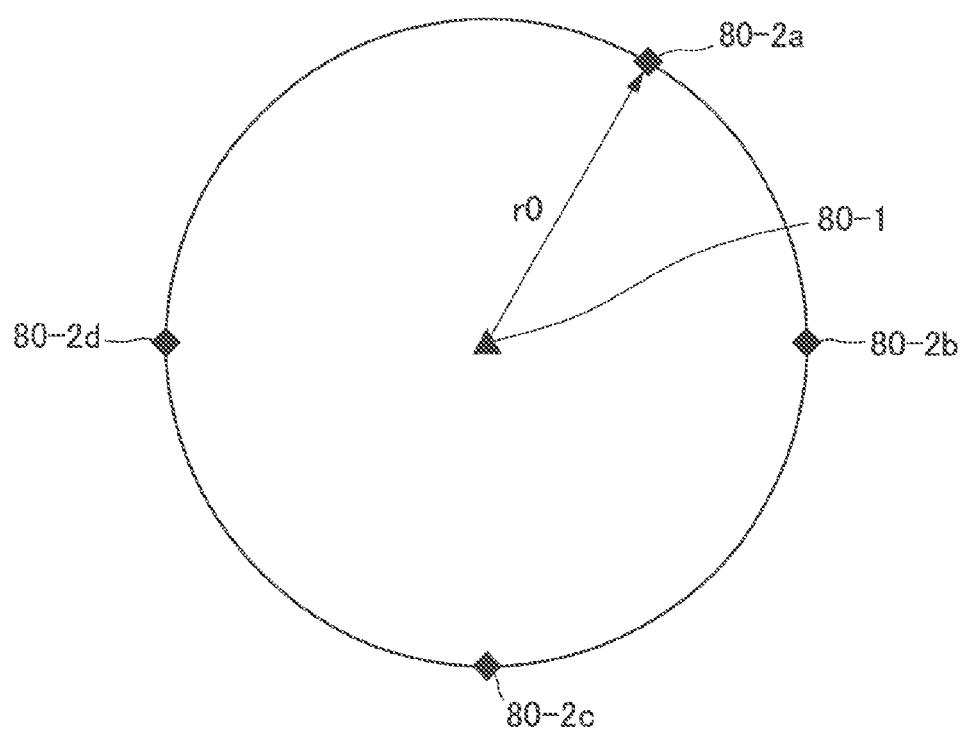
FIG. 3 is a diagram illustrating a case where only a host terminal and a partner terminal can be used for positioning.

FIG. 3 is a diagram illustrating a case where only a host terminal and a partner terminal can be used for positioning. As illustrated in FIG. 3, in a case where it is known that a host terminal 80-1 and a partner terminal 80-2 are separated from each other at a distance r0, it is specified that the partner terminal 80-2 is somewhere on a circle having the radius r0 centered on the host terminal 80-1. However, the direction in which the partner terminal 80-2 is located with the host terminal 80-1 as a reference is not known (for example, the correct positions of the partner terminals 80-2a to 80-2d are not known).

In the embodiment of the present disclosure, an active motion of a host terminal is captured by an inertial sensor, and changes in the position of the host terminal with time are calculated on the basis of the motion of the host terminal which is captured by the inertial sensor. In addition, the same situation occurs as when distances from a plurality of points to a partner terminal are simultaneously measured in a pseudo manner, on the basis of the changes in the position of the host terminal with time. Thereby, the relative position of the partner terminal based on the host terminal is estimated on the basis of the distances from the plurality of points to the partner terminal.

The outline of the first embodiment of the present disclosure has been described above.

1.2. Functional Configuration Example

Figure 4:
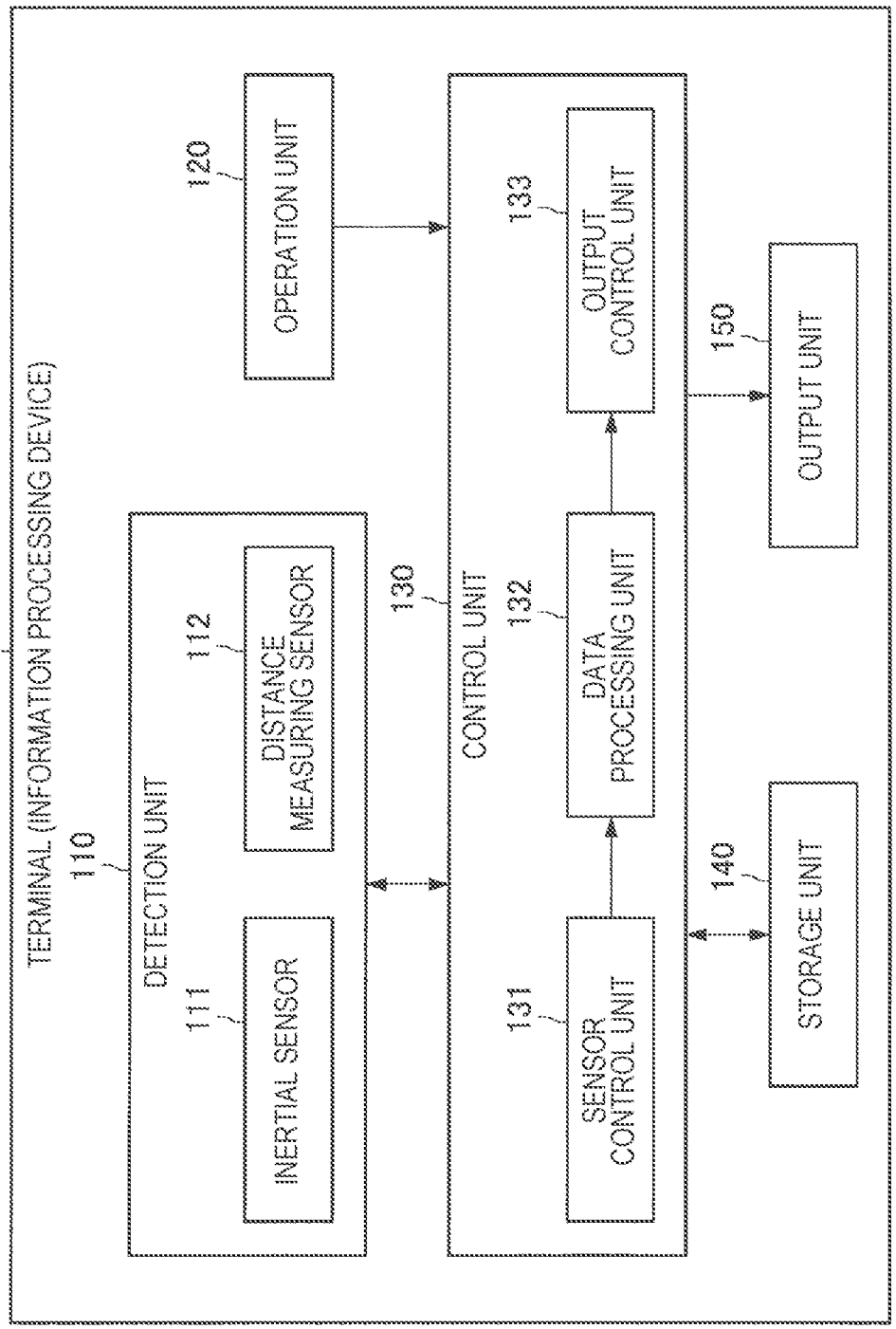
FIG. 4 is a diagram illustrating a functional configuration example of a terminal.

Next, a functional configuration example of a terminal (hereinafter, also referred to as an "information processing device") 10 according to the first embodiment of the present disclosure will be described. Note that the terminal 10 may include a host terminal 10-1 used by the user U1 and a partner terminal 10-2 (a searching target) used by the user U2. FIG. 4 is a diagram illustrating a functional configuration example of the terminal 10. As illustrated in FIG. 4, the terminal 10 includes a detection unit 110, an operation unit 120, a control unit 130, a storage unit 140, and an output unit 150.

Note that, in this specification, an example in which blocks other than the detection unit 110 (the operation unit 120, the control unit 130, the storage unit 140, and the output unit 150) are in the same device (for example, a smartphone or the like) as the detection unit 110 will be mainly described. However, the positions of the blocks other than the detection unit 110 are not particularly limited. For example, some or all of the blocks other than the detection unit 110 may be in a server or the like.

The detection unit 110 includes various sensors, and can acquire sensor data obtained by sensing of the various sensors. In the first embodiment of the present disclosure, the detection unit 110 includes an inertial sensor 111 and a distance measuring sensor 112. Note that, while one inertial sensor 111 is shown in the example illustrated in FIG. 4, the inertial sensor 111 actually includes a plurality of sensors such as an acceleration sensor and a gyroscope sensor.

The distance measuring sensor 112 includes a transmitter and a receiver. The transmitter transmits a signal, and the receiver receives a signal from a distance measuring sensor 112 of another terminal. In this case, the distance measuring sensor 112 can measure a distance from another terminal on the basis of a signal received from a distance measuring sensor 112 of the other terminal.

In this specification, a case is mainly assumed in which a signal to be transmitted from the transmitter to the receiver is based on an ultra wideband (UWB), but the type of signal is not particularly limited. For example, the type of signal to be transmitted from the transmitter to the receiver may be light, sound waves, or radio waves. A method of measuring a distance is not particularly limited either. For example, the distance measuring sensor 112 may measure a distance from the distance measuring sensor 112 of another terminal on the basis of a time for which a signal propagates, or may measure a distance from the distance measuring sensor 112 of another terminal on the basis of the intensity of a received signal.

Note that, in a case where the distance measuring sensors not required to measure a distance come into contact with each other in a way in which the user did not intend, there is a possibility of a distance between the distance measuring sensors between which a distance is not required to be measured being measured. Consequently, distance measuring sensors between which a distance is required to be measured may be paired. Thus, the measurement of a distance may be performed only between the paired distance measuring sensors.

Pairing may be completed at the time of shipment of the distance measuring sensors, but it is preferable that the pairing be performed through a predetermined pairing operation performed by the user in consideration of a case where the distance measuring sensors need to be replaced, or the like. For example, the user may perform pairing by registering identification information regarding another distance measuring sensor as a pairing partner with respect to the distance measuring sensor, in accordance with a pairing operation (for example, an operation of pressing a pairing start button of the distance measuring sensor to bring the distance measuring sensors close to each other, or the like) for each of the distance measuring sensors.

Alternatively, the user may perform pairing by registering identification information regarding the distance measuring sensor of another terminal as a pairing partner with respect to the distance measuring sensor through near field communication or the like, in accordance with a predetermined pairing operation for a mobile terminal (for example, a smartphone or the like) (for example, an operation of pressing the pairing start button and bringing the distance measuring sensor close to a mobile terminal). Thus, it may not be necessary to attach the pairing start button to the distance measuring sensor, and the durability of the distance measuring sensor may not be deteriorated.

Alternatively, the user may be able to designate the plurality of distance measuring sensors to be paired on the Web. For example, in this case, the pairing may be performed by registering identification information regarding the distance measuring sensor of another terminal as a pairing partner with respect to the distance measuring sensor through near field communication or the like of a mobile terminal (for example, a smartphone or the like).

In addition, a case is also assumed in which the plurality of distance measuring sensors are dispersively attached to the user and an object related to the user's action. In this case, when the distance measuring sensor attached to the user is registered in a mobile terminal (for example, a smartphone or the like) and a predetermined code given to the object is read by the mobile terminal, pairing between the distance measuring sensor attached to the object and the distance measuring sensor attached to the user may be started.

The operation unit 120 detects a user's operation and outputs the detected operation to the control unit 130. For example, in a case where the operation unit 120 is constituted by a touch panel, the user's operation may be equivalent to an operation performed on the touch panel (for example, a tap operation, a drag operation, or the like). However, the operation unit 120 may be constituted by hardware other than a touch panel (for example, a button or the like). Alternatively, the operation unit 120 may be constituted by a microphone, and voice may be detected as an operation by the microphone.

The control unit 130 controls each of the units of the terminal 10. As illustrated in FIG. 4, the control unit 130 includes a sensor control unit 131, a data processing unit 132, and an output control unit 133. These functional blocks will be described later in detail. Note that the control unit 130 may be constituted by, for example, a central processing unit (CPU) or the like. In a case where the control unit 130 is constituted by a processing device such as CPU, the processing device may be constituted by an electronic circuit.

The storage unit 140 is a recording medium that stores programs to be executed by the control unit 130 and stores data necessary for the execution of the programs. In addition, the storage unit 140 transitorily stores data to perform computation by the control unit 130. The storage unit 140 may be a magnetic storage device, a semiconductor storage device, an optical storage device, or a magneto-optical storage device.

The output unit 150 outputs various types of information. For example, the output unit 150 includes a display unit capable of displaying information. The display unit may be a display capable of performing display which is visually recognizable by the user, and may be a projector, a liquid crystal display, or an organic electro-luminescence (EL) display. Alternatively, the output unit 150 may include a vibrator that vibrates the terminal 10-1.

In addition, the output unit 150 may include a sound output unit capable of outputting a sound. For example, the sound output unit includes a speaker, and outputs a sound using the speaker. The number of speakers included in the sound output unit is not particularly limited as long as the number is one or more. A position where each of one or more speakers included in the sound output unit is provided is not particularly limited either. Note that the sound output unit may include a sound output device in a form other than a speaker (for example, earphones, a headset, or the like), as long as the sound output device has a sound output function.

Note that the terms "voice" (or "speech") and "sound" are used distinctively in this specification. That is, "voice" (or "speech") includes sounds uttered by the user among sounds collected by the microphone. In addition, "voice" (or "speech") includes sounds uttered by the terminal 10 among sounds that are output from the terminal 10. "Sound" includes noise and the like, in addition to the sounds uttered by the user and the sounds uttered by the terminal 10.

In the present embodiment, the sensor control unit 131 acquires inertial sensor data detected by the inertial sensor 111 and distance measuring sensor data detected by the distance measuring sensor 112. The data processing unit 132 estimates a relative position on the basis of the inertial sensor data and the distance measuring sensor data. According to such a configuration, it is possible to improve the accuracy of position estimation while reducing time and effort for installing facilities in an environment.

The functional configuration example of the terminal 10 according to the first embodiment of the present disclosure has been described above.

1.3. Overall Operation

Next, an example of the overall operation of the host terminal 10-1 according to the first embodiment of the present disclosure will be described. FIGS. 5A and 5B are flowcharts illustrating an example of the overall operation of the host terminal 10-1 according to the first embodiment of the present disclosure. First, an output control unit 133 controls the display of a user interface (UI) for selecting a searching partner. In addition, as illustrated in FIG. 5A, the searching partner is selected from a screen by the user U1 (S101). When an instruction for starting searching is given (S102), the output control unit 133 controls the display of a data measurement instruction UI (S103). The data measurement instruction UI will be described later in detail.

In addition, the data processing unit 132 starts to record the inertial sensor data acquired by the sensor control unit 131 (S104). In a case where the inertial sensor data satisfies a condition of a measurement point ("Yes" in S105), the sensor control unit 131 acquires distance measuring sensor data, and the data processing unit 132 records the distance measuring sensor data acquired by the sensor control unit 131 and moves the operation to S107 (S106). On the other hand, in a case where the inertial sensor data does not satisfy the condition of the measurement point ("No" in S105), the data processing unit 132 moves the operation to S107.

Subsequently, in a case where the inertial sensor data does not satisfy a condition of termination ("No" in S107), the data processing unit 132 moves the operation to S104. On the other hand, in a case where the inertial sensor data satisfies the condition of termination ("Yes" in S107), the data processing unit 132 terminates the recording of the inertial sensor data (S108), and moves the operation to S121 (see FIG. 5B).

Subsequently, the data processing unit 132 calculates its own position (the position of the host terminal 10-1) at each time from the inertial sensor data (S121). The calculation of its own position based on the inertial sensor data may be performed in any way. As an example, the data processing unit 132 may calculate its own position using a method in inertial navigation. More specifically, the data processing unit 132 may calculate the amount of movement based on its own initial position by integration of accelerations (more specifically, second-order integration of accelerations), and may calculate a direction based on the initial direction of the host terminal 10-1 by integration of angular velocities. Note that a method for improving the accuracy of calculation of its own position may be further used.

Subsequently, the data processing unit 132 calculates the position of a partner (a relative position of the partner terminal 10-2 based on the position of the host terminal 10-1) on the basis of its own position at each time and the distance measuring sensor data (S122). Note that the calculation of position of the partner will be also described later in detail. In addition, the data processing unit 132 calculates the degree of reliability of the calculated position of the partner (S123). The calculation of the degree of reliability will be also described later in detail. In a case where the degree of reliability does not exceed a threshold value ("No" in S124), the data processing unit 132 moves the operation to S102.

On the other hand, in a case where the degree of reliability exceeds the threshold value ("Yes" in S124), the data processing unit 132 determines the calculated position of the partner to be an object to be output (S125), and the output control unit 133 controls the display of the determined position of the partner (S126), and terminates the operation. Note that the determination of the position of a partner will also be described later in detail. In addition, the display control of the position of a partner will also be described later in detail.

Note that the flowcharts illustrated in FIGS. 5A and 5B merely show an example of the operation of the host terminal 10-1. Therefore, the operation of the host terminal 10-1 is not limited to such an example. For example, in the example illustrated in FIGS. 5A and 5B, a timing when the recording of the inertial sensor data is started and a timing when the recording of the distance measuring sensor data is started are different from each other. However, the recording of the inertial sensor data and the recording of the distance measuring sensor data may be simultaneously started, and both may be used for calculation of the position of a partner.

In addition, for example, FIGS. 5A and 5B illustrate an example in which the inertial sensor data is continuously recorded in a case where an instruction for starting searching is given, and the position of the host terminal 10-1 is calculated on the basis of the continuously recorded inertial sensor data in a case where the inertial sensor data satisfies the condition of termination. However, the position of the host terminal 10-1 may be calculated in real time on the basis of the inertial sensor data. In this case, a memory region (buffer) for recording inertial data may be reduced.

An example of the overall operation of the host terminal 10-1 according to the first embodiment of the present disclosure has been described above.

1.4. Data Measurement Instruction UI

Figure 7:
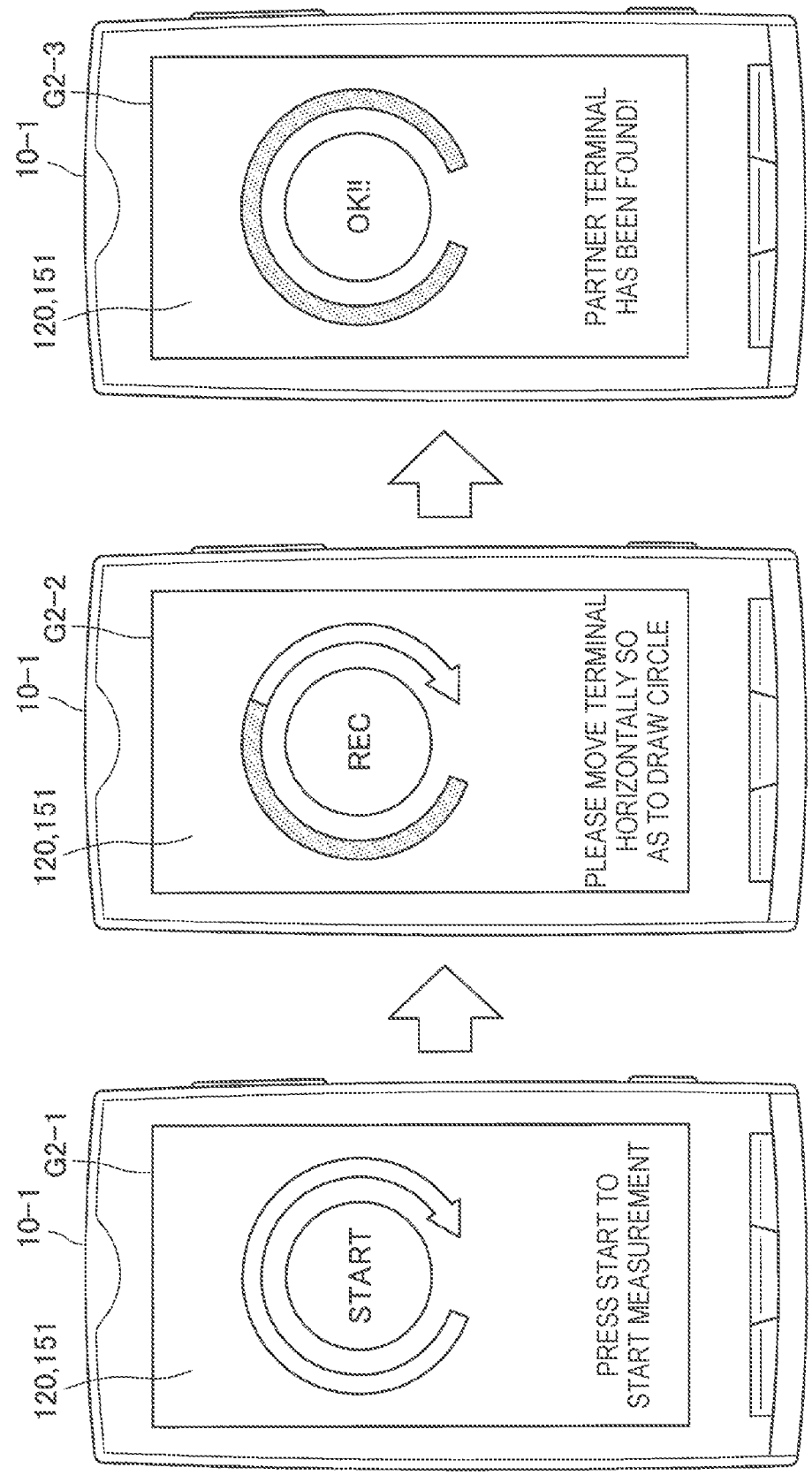
FIG. 7 is a diagram illustrating an example of a data measurement instruction UI.

Next, an example of the above-described data measurement instruction UI will be described. As described above, when a searching partner is selected by the user U1 and an instruction for starting searching is given, the output control unit 133 controls the display of the data measurement instruction UI. FIGS. 6 and 7 are diagrams illustrating an example of the data measurement instruction UI. Note that, although an example in which the data measurement instruction UI is displayed by the display unit 151 will be described below, the data measurement instruction UI may be output by means of another output such as voice or vibration.

First, in a case where the position of a partner is two-dimensionally estimated, it is necessary to secure a plurality of measurement points in a horizontal direction, and thus the terminal 10-1 needs to be moved in the horizontal direction. Consequently, as illustrated in FIG. 6, the output control unit 133 controls the display of an inclination adjustment instruction UI (G1-1) that prompts horizontal orientation of the terminal 10-1 by the display unit 151. Although an example in which the output control unit 133 prompts horizontal orientation of the terminal 10-1 by displaying a point at a position according to an inclination in a case where the terminal 10-1 is inclined with respect to the horizontal direction is described here, a method of prompting horizontal orientation of the terminal 10-1 is not limited to such an example.

Note that, although a case in which the position of a partner is two-dimensionally estimated is mainly assumed in the present specification, a case in which the position of a partner is three-dimensionally estimated in consideration of a vertical direction can also be assumed. In such a case, it is not necessary to secure a plurality of measurement points in the horizontal direction, and thus control of the display of the inclination adjustment instruction UI (G1-1) may not be performed.

Subsequently, as illustrated in FIG. 6, the output control unit 133 controls the display of a before-starting-measurement UI (G1-2). Here, an example in which the output control unit 133 controls the display of the before-starting-measurement UI (G1-2) for prompting a large gesture in order to improve the accuracy of estimation of the position of a partner by increasing distances between the plurality of measurement points is described. As shown in the before-starting-measurement UI (G1-2), the prompting of a large gesture may be displayed by an icon, or may be displayed by text.

Subsequently, as illustrated in FIG. 7, the output control unit 133 controls the display of a measurement start reception UI (G2-1). When an operation of pressing a START button by the user U1 is received by the operation unit 120, the output control unit 133 controls an output for prompting a gesture of moving the terminal 10-1. For example, the output control unit 133 controls display of a track having a predetermined shape and display for prompting a gesture of moving the terminal 10-1 along the track. Here, the shape of the track is not particularly limited.

For example, as shown in a gesture instruction UI (G2-2), the output control unit 133 may control display of a track having a circular shape and display for prompting a gesture of moving the terminal 10-1 along the track. In a case where a gesture of the user U1 is started, the output control unit 133 preferably controls display of a progress state of the gesture (the proportion of the completed gesture to the entire track). Then, the user U1 can confirm the rest of the gesture through the displayed progress state. Note that the displayed progress state may be an indicator as shown in the gesture instruction UI (G2-2), or may be a numerical value.

As a result of the gesture performed by the user U1, in a case where a plurality of measurement points are obtained and the position of a partner is determined on the basis of the plurality of measurement points, the output control unit 133 may control an output indicating that the position of the partner has been determined, as shown in a gesture completion UI (G2-3). In this case, the output control unit 133 preferably controls display indicating that the gesture has been completed as a progress state of the gesture. Then, the user U1 can confirm that the gesture has been performed normally.

Figure 8:
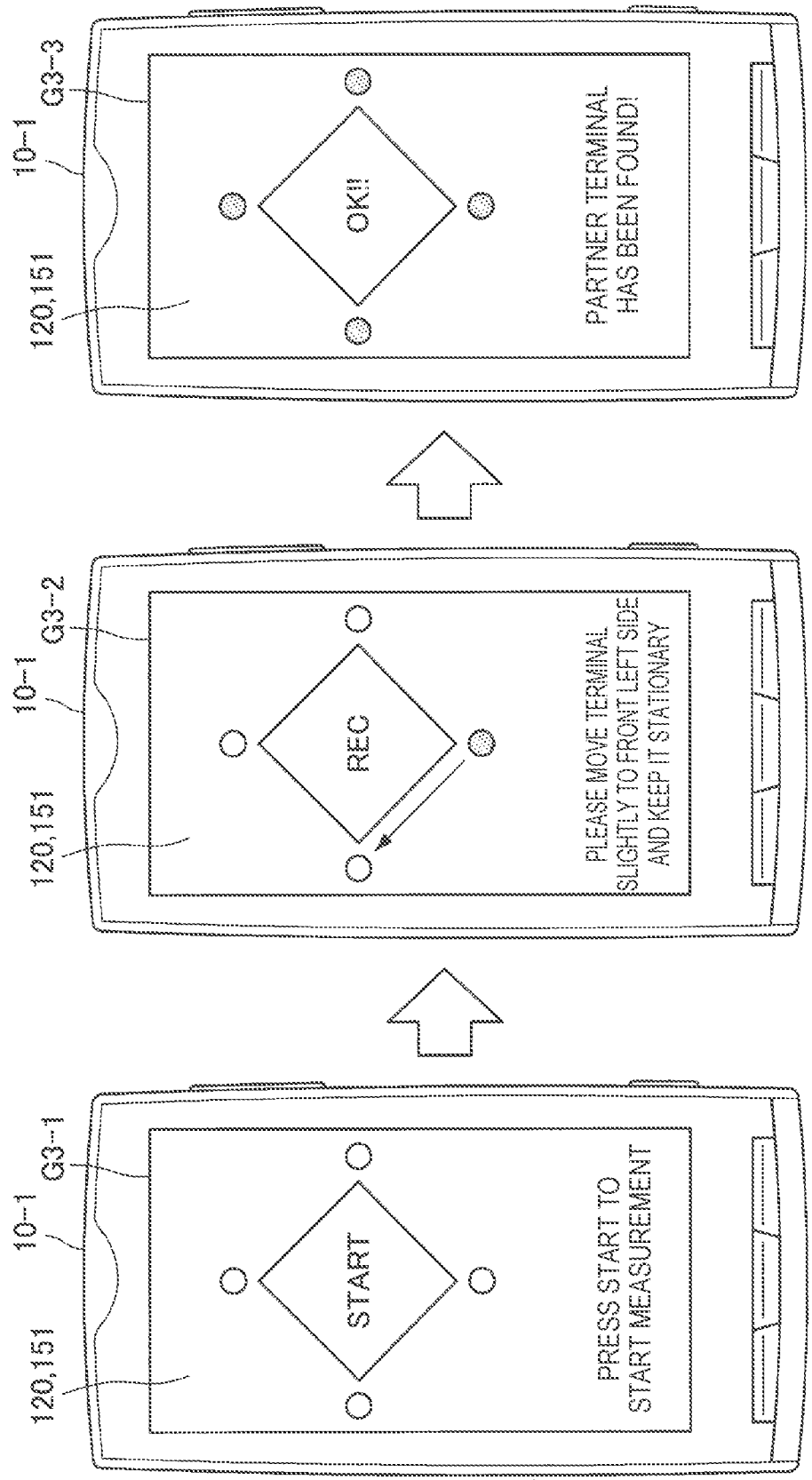
FIG. 8 is a diagram illustrating another example of a data measurement instruction UI.
Figure 9:
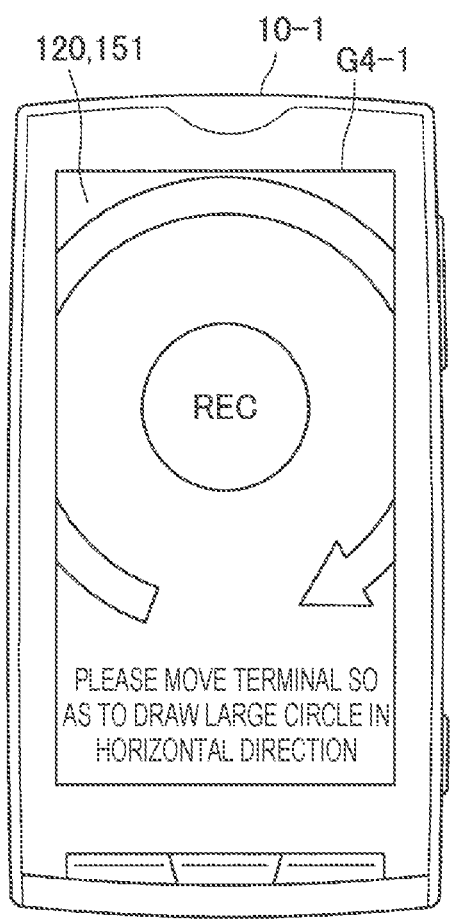
FIG. 9 is a diagram illustrating another example of a data measurement instruction UI.

Subsequently, another example of the above-described data measurement instruction UI will be described. As described above, when a searching partner is selected by the user U1 and an instruction for starting searching is given, the output control unit 133 controls display of the data measurement instruction UI. FIGS. 8 and 9 are diagrams illustrating another example of a data measurement instruction UI. First, similar to the case illustrated in FIG. 6, the output control unit 133 may control display of the inclination adjustment instruction UI (G1-1) that prompts horizontal orientation of the terminal 10-1 by the display unit 151. Subsequently, similar to the case illustrated in FIG. 6, the output control unit 133 controls display of the before-starting-measurement UI (G1-2).

Subsequently, as illustrated in FIG. 8, the output control unit 133 controls display of a measurement start reception UI (G3-1). When an operation of pressing a START button by the user U1 is received by the operation unit 120, the output control unit 133 controls an output for prompting a gesture of moving the terminal 10-1. For example, the output control unit 133 controls display of a track having a predetermined shape and display for prompting a gesture of temporarily keeping the terminal 10-1 stationary at a predetermined position while moving the terminal 10-1 along the track. Here, as described above, the shape of the track is not particularly limited.

For example, as shown in a gesture instruction UI (G3-2), the output control unit 133 may control display of a track having a polygonal shape (for example, a rectangular shape) and display for prompting a gesture of temporarily keeping the terminal 10-1 stationary at each vertex of the polygon while moving the terminal 10-1 along the track. In a case where a gesture of the user U1 is started, the output control unit 133 preferably controls display of a progress state of the gesture (the proportion of the completed gesture to the entire track). Then, the user U1 can confirm the rest of the gesture by the displayed progress state. Note that the displayed progress state may be an indicator as shown in the gesture instruction UI (G3-2), or may be a numerical value.

For example, the output control unit 133 may update the progress state in a case where the gesture of temporarily keeping the terminal 10-1 stationary has been normally made. Here, in a case where the gesture has been normally made, the output control unit 133 may control a predetermined output in order to notify the user U1 that the gesture has been normally made. The predetermined output may be an output of a predetermined sound, or may be a predetermined vibration. In addition, the output control unit 133 may control display of the progress state, and may also control display of a direction in which the terminal 10-1 is to be moved next, as shown in the gesture instruction UI (G3-2).

As a result of the gesture made by the user U1, in a case where a plurality of measurement points are obtained and the position of a partner is determined on the basis of the plurality of measurement points, the output control unit 133 may control an output indicating that the position of the partner has been determined, as shown in a gesture completion UI (G3-3). In this case, the output control unit 133 preferably controls display indicating that a gesture has been completed as a progress state of the gesture. Then, the user U1 can confirm that the gesture has been normally made.

Note that the shape of a track may be determined by a designer or the like, in consideration of sampling rates of various sensors, the amount of calculation of the position of the partner, and the like. Alternatively, the shape of a track may be selected by the user U1. In addition, as described later, it is assumed that the position of the partner is obtained with a higher level of accuracy in a case where a track has a polygonal shape than in a case where a track has a circular shape. Consequently, in a case where the position of the partner is not determined for some reason when a track has a circular shape (for example, when a calculated degree of reliability of the position of the partner is lower than a threshold value), the output control unit 133 may change the shape of the track to a polygonal shape.

In the above, a description has been given of an example in which the output control unit 133 controls display of the entire circle or the entire polygon as a track having a predetermined shape. However, in a case where a display region is small, and the like, the output control unit 133 may control display of a portion of the circle or a portion of the polygon so that the display region protrudes. Thereby, in spite of the small display region, there is an increasing possibility that the user U2 makes a large gesture. FIG. 9 is a diagram illustrating another example of a gesture instruction UI. As shown in a gesture instruction UI (G4-1), the output control unit 133 may control display of a portion of a circle so that a display region protrudes, and may control display for prompting a gesture of moving the terminal 10-1 along the circle.

Further, in a case where the display region is small, and the like, the output control unit 133 may indicate a direction in which the terminal 10-1 is to be moved by kinesthetic sense feedback using a vibrator, instead of controlling display of a track. Thereby, there is an increasing possibility that the user U1 makes a large gesture, in spite of the small display region. FIG. 10 is a diagram illustrating another example of a gesture instruction UI. As shown in a gesture instruction UI (G5-2), the output control unit 133 may indicate a direction in which the terminal 10-1 is to be moved by kinesthetic sense feedback, and may control display for prompting a gesture of moving the terminal 10-1 in a direction in which a force is sensed.

As described above, the data measurement instruction UI has been described.

1.5. Example of Gesture

Figure 11A:
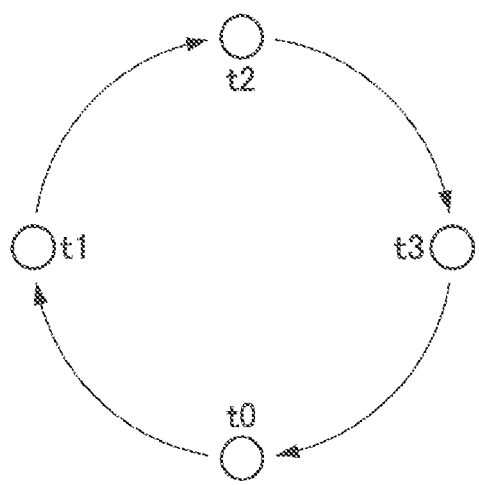
FIG. 11A is a diagram illustrating an example of four measurement points in a case where a track has a circular shape.

Subsequently, an example of the above-described gesture will be described. First, a case is assumed in which a track of which the display is controlled by the output control unit 133 has a circular shape. FIG. 11A is a diagram illustrating an example of four measurement points in a case where a track has a circular shape. When four measurement points are provided at equal intervals in a case where a track has a circular shape, the position of the terminal 10-1 at each of times t0 to t3 (in order of earlier time) is obtained as illustrated in FIG. 11A. Note that the number of measurement points is not limited to four and may be two or more. In addition, the measurement points may not be provided at equal intervals.

Figure 11B:
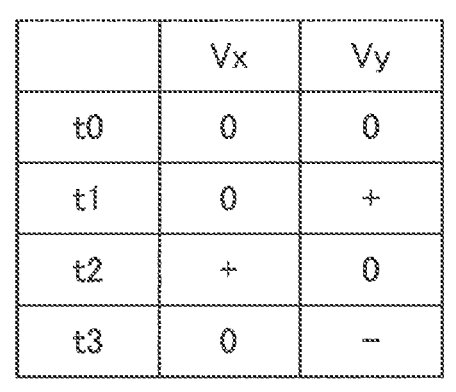

In this case, the data processing unit 132 may determine four times when a speed calculated in accordance with inertial sensor data satisfies a predetermined speed condition, to be four measurement times. FIG. 11B is a diagram illustrating an example of speeds at four measurement points in the X-axis direction and the Y-axis direction in a case where a track has a circular shape. In a case where the user U1 moves the terminal 10-1 along a circle in the horizontal direction, it is assumed that the speed (Vx, Vy) of the terminal 10-1 at each of times t0 to t3 is as illustrated in FIG. 11B. Consequently, the data processing unit 132 may determine times t0 to t3 satisfying the speeds (Vx, Vy) illustrated in FIG. 11B to be four measurement times.

FIG. 11C is a diagram illustrating an example of accelerations of the terminal 10-1 in the X-axis direction and the Y-axis direction in a case where the user U1 moves the terminal 10-1 twice along a circle in the horizontal direction. For example, the speed Vx in the X-axis direction may be obtained by integration of accelerations in the X-axis direction which are detected by an acceleration sensor, and the speed Vy in the Y-axis direction may be obtained by integration of accelerations in the Y-axis direction which are detected by the acceleration sensor. However, the speed Vx in the X-axis direction and the speed Vy in the Y-axis direction may be obtained in any way.

Figure 12A:
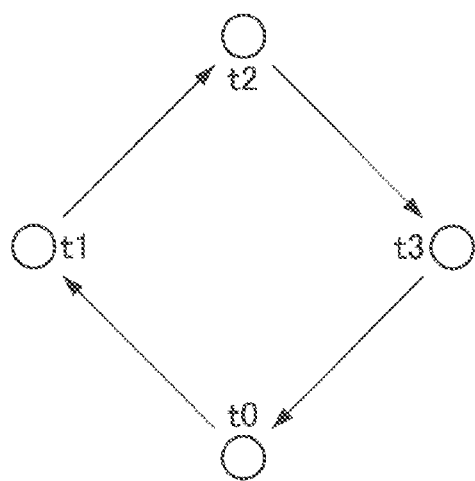
FIG. 12A is a diagram illustrating an example of a plurality of measurement points in a case where a track has a polygonal shape.

Subsequently, a case is assumed in which a track of which the display is controlled by the output control unit 133 has a polygonal shape (for example, a rectangular shape). FIG. 12A is a diagram illustrating an example of a plurality of measurement points in a case where a track has a polygonal shape. When a measurement point is provided at each vertex in a case where a track has a polygonal shape, the position of the terminal 10-1 at each of times t0 to t3 (in order of earlier time) is obtained as illustrated in FIG. 12A. Note that the measurement points may not be provided at equal intervals. That is, the respective lengths of sides of the polygon may not be equal to each other.

In this case, the data processing unit 132 may determine a plurality of times when an acceleration indicated by inertial sensor data satisfies a predetermined acceleration condition, to be a plurality of measurement times. For example, an acceleration should be zero at each vertex when the terminal 10-1 is temporarily kept stationary. Therefore, the acceleration condition may be a condition that an acceleration in the horizontal direction is set to zero. Note that a speed in the horizontal direction should also be zero at each vertex when the terminal 10-1 is temporarily kept stationary. Therefore, a condition that a speed in the horizontal direction is set to zero may be used instead of or in addition to the acceleration condition.

FIG. 12B is a diagram illustrating an example of accelerations of the terminal 10-1 in the X-axis direction and the Y-axis direction in a case where the user U1 rotates the terminal 10-1 twice along a rectangle in the horizontal direction. For example, a speed in the X-axis direction may be obtained by integration of accelerations in the X-axis direction which are detected by an acceleration sensor, and a speed in the Y-axis direction may be obtained by integration of accelerations in the Y-axis direction which are detected by the acceleration sensor. However, the speed in the X-axis direction and the speed in the Y-axis direction may be obtained in any way.

Figure 13A:
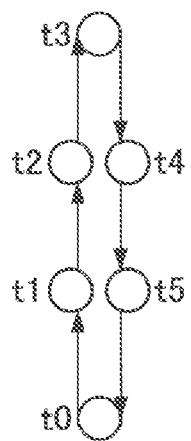
FIG. 13A is a diagram illustrating an example of a plurality of measurement points in a case where the moving direction of a terminal is a horizontal front-back direction.

Subsequently, a case is assumed in which the moving direction of the terminal 10-1 is a horizontal front-back direction. FIG. 13A is a diagram illustrating an example of a plurality of measurement points in a case where the moving direction of the terminal 10-1 is a horizontal front-back direction. When the moving direction of the terminal 10-1 is set to be a horizontal front-back direction and a plurality of measurement points are taken at predetermined time intervals, the position of the terminal 10-1 at each of times t0 to t5 (in order of earlier time) is obtained as illustrated in FIG. 13A. In a case where the moving direction of the terminal 10-1 is a horizontal front-back direction, accuracy is not that improved due to a small motion of the terminal 10-1, but the load of the user U1 moving the terminal 10-1 is reduced.

FIG. 13B is a diagram illustrating an example of accelerations of the terminal 10-1 in the X-axis direction and the Y-axis direction in a case where the user U1 moves the terminal 10-1 twice in a horizontal front-back direction. Referring to FIG. 13B, changes in the acceleration in the X-axis direction (horizontal front-back direction) are shown, but changes in the acceleration in the Y-axis direction (horizontal right-left direction) are not shown. Note that the moving direction of the terminal 10-1 is not limited to the horizontal front-back direction. For example, the moving direction of the terminal 10-1 may be a horizontal right-left direction.

As described above, examples of gestures have been described, but the type of gesture is not limited thereto. For example, the moving direction of the terminal 10-1 may not be particularly determined, but this will be described later in detail. In addition, the type of acceleration sensor is not limited to the above-described two-axis acceleration sensor. For example, the type of acceleration sensor may be a one-axis acceleration sensor or may be a three-axis acceleration sensor. In addition, it is possible to more accurately obtain the relative coordinates of a measurement point by using a combination of the acceleration sensor and another sensor (for example, a gyroscope sensor or the like).

1.6. Calculation of Position of Partner

Subsequently, calculation of the above-described position of a partner will be described. When a plurality of measurement points are obtained in the above-described manner, the data processing unit 132 calculates the position of the host terminal 10-1 at each of a plurality of measurement times on the basis of inertial sensor data. In this case, the position of the host terminal 10-1 may be calculated using a method in inertial navigation. On the other hand, the data processing unit 132 calculates a distance between the host terminal 10-1 and the partner terminal 10-2 at each of a plurality of measurement times on the basis of distance measuring sensor data.

In addition, the data processing unit 132 estimates the relative position of the partner terminal 10-2 based on the position of the host terminal 10-1, on the basis of the position of the host terminal 10-1 and the distance. In the present specification, a case is mainly assumed in which the position of the partner is two-dimensionally estimated, and thus the number of measurement points may be three or more. However, a case is also assumed in which the relative position of the partner terminal 10-2 is three-dimensionally estimated in consideration of a vertical direction as described above. In such a case, the number of measurement points may be four or more.

Figure 14A:
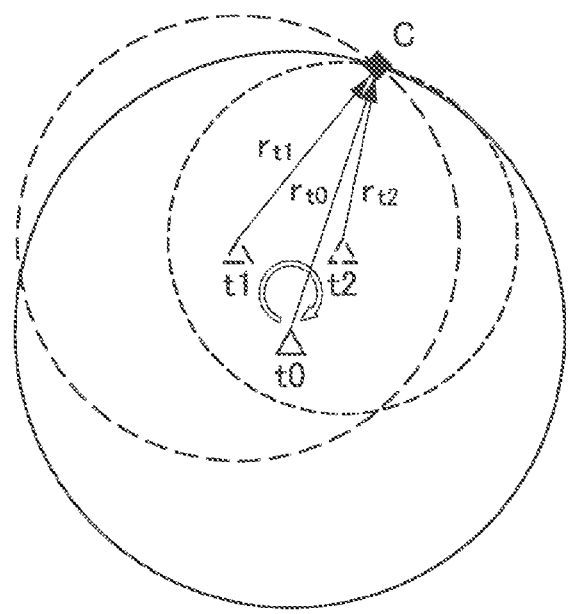
FIG. 14A is a diagram illustrating calculation of the position of a partner in a case where it is assumed that there is no error.

FIG. 14A is a diagram illustrating calculation of the position of a partner in a case where it is assumed that there is no error. As illustrated in FIG. 14A, it is assumed that the position of the terminal 10-1 at each of measurement times t0 to t2 (in order of earlier time) has been obtained. In addition, it is assumed that distances $r_{r0}$ to $r_{r2}$ between the host terminal 10-1 and the partner terminal 10-2 at the respective measurement times t0 to t2 have been obtained. In this case, the relative position of the partner terminal 10-2 is an intersection point C between a circle having the radius $r_{r0}$ centering on the measurement point (time t0), a circle having the radius $r_{r1}$ centering on the measurement point (time t1), and a circle having the radius re centering on the measurement point (time t2).

A method of obtaining the intersection point C (the relative coordinates of the partner terminal 10-2) will be described in more detail. When the relative coordinates of the partner terminal 10-2 are set to be (x, y), the coordinates of the measurement point (time ti) are set to be ($x_i$, $y_i$), and a distance between the host terminal 10-1 and the partner terminal 10-2 at the measurement time ti is set to be $r_{ti}$, a circle having the radius $r_{ti}$ centering on the measurement point (time ti) is expressed as the following (Expression 1).

$$(x-x_i)^2+(y-y_i)^2=r_i^2 (i=0 \text{ to } N) \quad \text{(Expression 1)}$$

Here, when an angle with respect to the x-axis in a direction toward the intersection point C (the relative coordinates of the partner terminal 10-2) from the initial position (time t0) is set to be θ and a distance from the initial position (time t0) to the intersection point C (the relative coordinates of the partner terminal 10-2) is set to be D, an angle θ is expressed by the following (Expression 2) using x and y by an inverse trigonometric function.

$$\theta=\arctan(y/x), D=r_{t0} \quad \text{(Expression 2)}$$

Figure 14B:
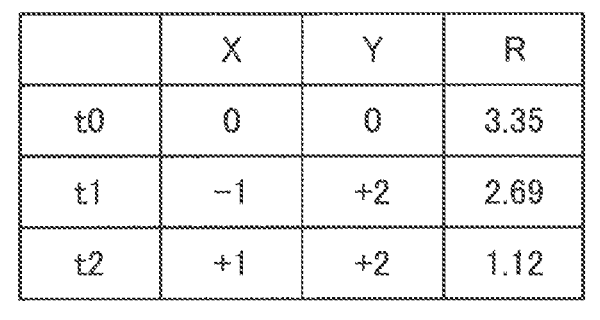

FIG. 14B is a diagram illustrating an example of specific values of coordinates (X, Y) and a distance R at each measurement point (time ti). When the specific values illustrated in FIG. 14B are substituted for (Expression 1) and arranged, the relation of the relative coordinates (x, y) of the partner terminal 10-2~(1.5, 3.0) is calculated. In addition, when the relative coordinates (x, y) of the partner terminal 10-2, which are set to (1.5, 3.0), are substituted for (Expression 2) and arranged, the relation of the angle θ=63.4 [deg] is calculated. In addition, as illustrated in FIG. 14B, the distance R is 3.35 when the relation of the distance D=the measurement point (time ti) is established.

Note that the relative position of the partner terminal 10-2 based on the position of the host terminal 10-1 may be the intersection point C (the relative coordinates of the partner terminal 10-2). That is, the relative position of the partner terminal 10-2 based on the position of the host terminal 10-1 may include both the distance D and the angle θ. Alternatively, only the angle θ may be provided as the relative position of the partner terminal 10-2 based on the position of the host terminal 10-1.

As described above, in a case where it is assumed that there is no error, the number of intersection points C between the circle having the radius $r_{t0}$ centering on the measurement point (time t0), the circle having the radius $r_{t1}$ centering on the measurement point (time t1), and the circle having the radius $r_{t2}$ centering on the measurement point (time t2) is determined to be one. However, the number of intersection points C is not actually determined to be one due to an error of the sensor, or the like. Therefore, the final relative position of the partner terminal 10-2 may be determined by a method to be described below.

Figure 15:
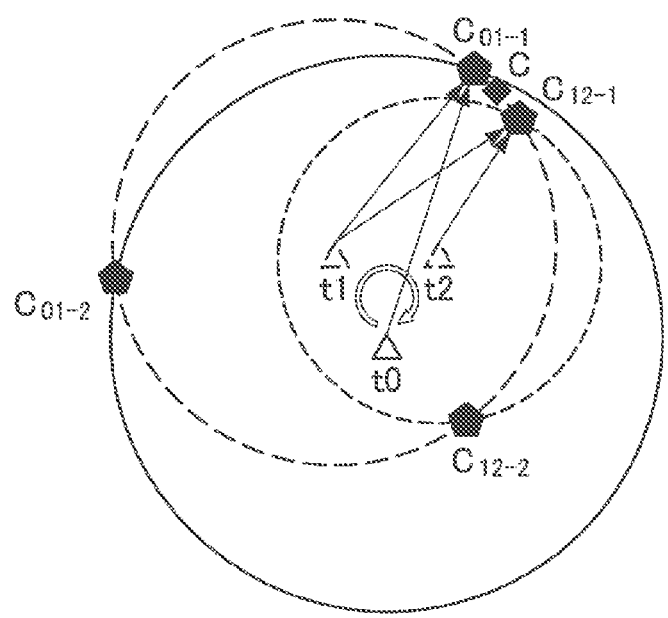
FIG. 15 is a diagram illustrating calculation of the position of a partner in a case where it is assumed that there is an error.

FIG. 15 is a diagram illustrating calculation of the position of a partner in a case where it is assumed that there is an error. As illustrated in FIG. 15, it is assumed that the position of the terminal 10-1 at each of measurement times t0 to t2 (in order of earlier time) has been obtained. In addition, a distance between the host terminal 10-1 and the partner terminal 10-2 at each of the measurement times t0 to t2 is obtained, and a circle having the corresponding distance centering on each of the measurement points (times t0 to t2) as a radius is drawn in FIG. 15.

Here, the data processing unit 132 determines whether or not there is an intersection point between tracks each having the corresponding distance centering on the position of the host terminal 10-1 as a radius, in each set of two measurement times selected from among the measurement times t0 to t2. In the example illustrated in FIGS. 15, (t0, t1), (t1, t2), and (t2, t0) are sets of two measurement times selected from among the measurement times t0 to t2.

Referring to FIG. 15, there are two intersection points of $C_{01-1}$ and $C_{01-2}$ between the circle centering on the measurement point (time t0) and the circle centering on the measurement point (time t1). There are two intersection points of $C_{12-1}$ and $C_{12-2}$ between the circle centering on the measurement point (time t1) and the circle centering on the measurement point (time t2). On the other hand, there is no intersection point between the circle centering on the measurement point (time t0) and the circle centering on the measurement point (time t1). That is, two intersection points of $C_{01-1}$ and $C_{01-2}$ are present as the first set of intersection points, and two intersection points of $C_{12-1}$ and $C_{12-2}$ are present as the second set of intersection points.

In addition, the data processing unit 132 estimates the relative position of the partner terminal 10-2 on the basis of an intersection point determined to be present. For example, in a case where there are a plurality of sets including an intersection point, the data processing unit 132 estimates the midpoint or the center of gravity of an intersection point group in which the total distance between intersection points respectively selected from the sets is minimized, as the relative position of the partner terminal 10-2.

In the example illustrated in FIG. 15, the data processing unit 132 calculates a distance between $C_{01-1}$ selected from the first set of intersection points and $C_{12-1}$ selected from the second set of intersection points, calculates a distance between $C_{01-1}$ selected from the first set of intersection points and $C_{12-2}$ selected from the second set of intersection points, calculates a distance between $C_{01-2}$ selected from the first set of intersection points and $C_{12-1}$ selected from the second set of intersection points, and calculates a distance between $C_{01-2}$ selected from the first set of intersection points and $C_{12-2}$ selected from the second set of intersection points. Among these, the distance between $C_{01-1}$ selected from the first set of intersection points and $C_{12-1}$ selected from the second set of intersection points is minimized, and thus the data processing unit 132 may estimate the midpoint C between $C_{01-1}$ and $C_{12-1}$ as the relative position of the partner terminal 10-2.

Alternatively, the relative position of the partner terminal 10-2 may not be the midpoint or the center of gravity of the intersection point group in which the total distance between the intersection points is minimized. For example, in a case where there are a plurality of sets including an intersection point, the data processing unit 132 may estimate any one intersection point position in the intersection point group in which the total distance between the intersection points respectively selected from the sets is minimized, as the relative position. In the example illustrated in FIG. 15, the distance between $C_{01-1}$ selected from the first set of intersection points and $C_{12-1}$ selected from the second set of intersection points is minimized, and thus the data processing unit 132 may estimate any one intersection point position between $C_{01-1}$ and $C_{12-1}$ as the relative position of the partner terminal 10-2.

Which intersection point position in the intersection point group having the minimum total distance is estimated as the relative position of the partner terminal 10-2 is not limited. However, it is assumed that the accuracy of calculation of the position of the host terminal 10-1 which is performed by the inertial sensor 111 is deteriorated due to cumulative errors with the lapse of time. Consequently, in order to estimate the relative position of the partner terminal 10-2 with a higher level of accuracy, the data processing unit 132 preferably estimates an intersection point position having the earliest measurement time in the intersection point group having the minimum total distance, as the relative position of the partner terminal 10-2.

In the example illustrated in FIG. 15, the distance between $C_{01-1}$ selected from the first set of intersection points and $C_{12-1}$ selected from the second set of intersection points is minimized, but the data processing unit 132 may estimate $C_{01-1}$ having an earlier measurement time as the relative position of the partner terminal 10-2.

On the other hand, a case is also assumed in which there is a single set including an intersection point. In such a case, the data processing unit 132 may estimate any one position in the set of intersection points as the relative position of the partner terminal 10-2. Which intersection point position in the set including an intersection point is estimated as the relative position is not limited. However, similarly to a case where there are a plurality of sets including an intersection point, the data processing unit 132 preferably estimates an intersection point position having the earliest measurement time in the set of intersection points, as the relative position of the partner terminal 10-2.

As described above, the calculation of the position of a partner has been described, but a method of calculating the position of the partner is not limited thereto. For example, the data processing unit 132 may treat a case where a distance between the host terminal 10-1 and the partner terminal 10-2 exceeds a threshold value, as an error. In addition, the data processing unit 132 may use the distance between the host terminal 10-1 and the partner terminal 10-2 for the weighting of the degree of reliability to be described later. In addition, the data processing unit 132 may reduce the degree of reliability to be described later as the number of intersection points decreases.

In addition, the above-described method of calculating the position of the partner is merely an example, and thus the above-described method of calculating the position of the partner may be interpolated by a statistical method. In addition, here, a description has been given of an example in which the position of the partner is two-dimensionally estimated, but the position of the partner may be three-dimensionally estimated. In this case, the three-dimensional position of the partner may be estimated by the same method as that of the two-dimensional position of the partner.

1.7. Calculation of Degree of Reliability

Subsequently, calculation of the above-described degree of reliability will be described. When the data processing unit 132 estimates the relative position of the partner terminal 10-2 in the above-described manner, the data processing unit may calculate the degree of reliability of the relative position of the partner terminal 10-2. In a case where the degree of reliability exceeds a threshold value, the data processing unit may determine the relative position of the partner terminal 10-2.

More specifically, the data processing unit 132 may calculate the relative position of the partner terminal 10-2 with respect to each set of two or more measurement times selected from among a plurality of measurement points, and may calculate the degree of variation in the calculated relative position of the partner terminal 10-2 as the degree of reliability. This is because it is considered that the degree of variation in the relative position of the partner terminal 10-2 which is calculated with respect to each set of two or more measurement times is low (that is, the accuracy is high) when estimation of the position of the host terminal 10-1 based on the inertial sensor 111 and distance measurement performed by the distance measuring sensor 112 are performed with a high level of accuracy.

Which index is used as the degree of variation is not particularly limited. As an example, the degree of variation may be a standard deviation or a variance. In addition, each set of two or more measurement times selected from among the plurality of measurement points is not particularly limited. For example, all of the sets of two or more measurement times among the plurality of measurement points may be used for calculation of the degree of reliability, or some of all of the sets of two or more measurement times among the plurality of measurement points may be used for calculation of the degree of reliability.

Figure 16:
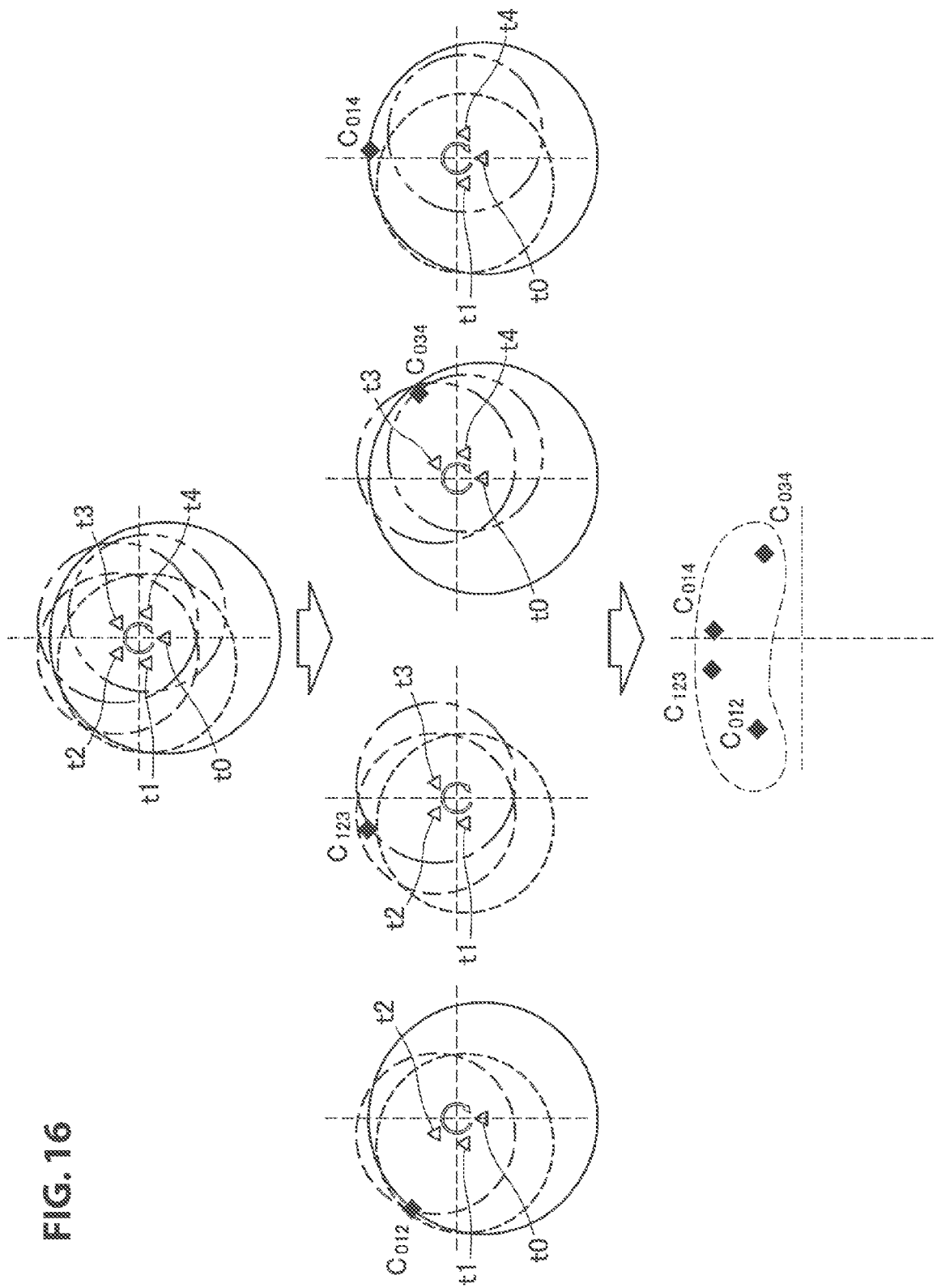
FIG. 16 is a diagram illustrating an example of calculation of the degree of reliability.
Figure 17:
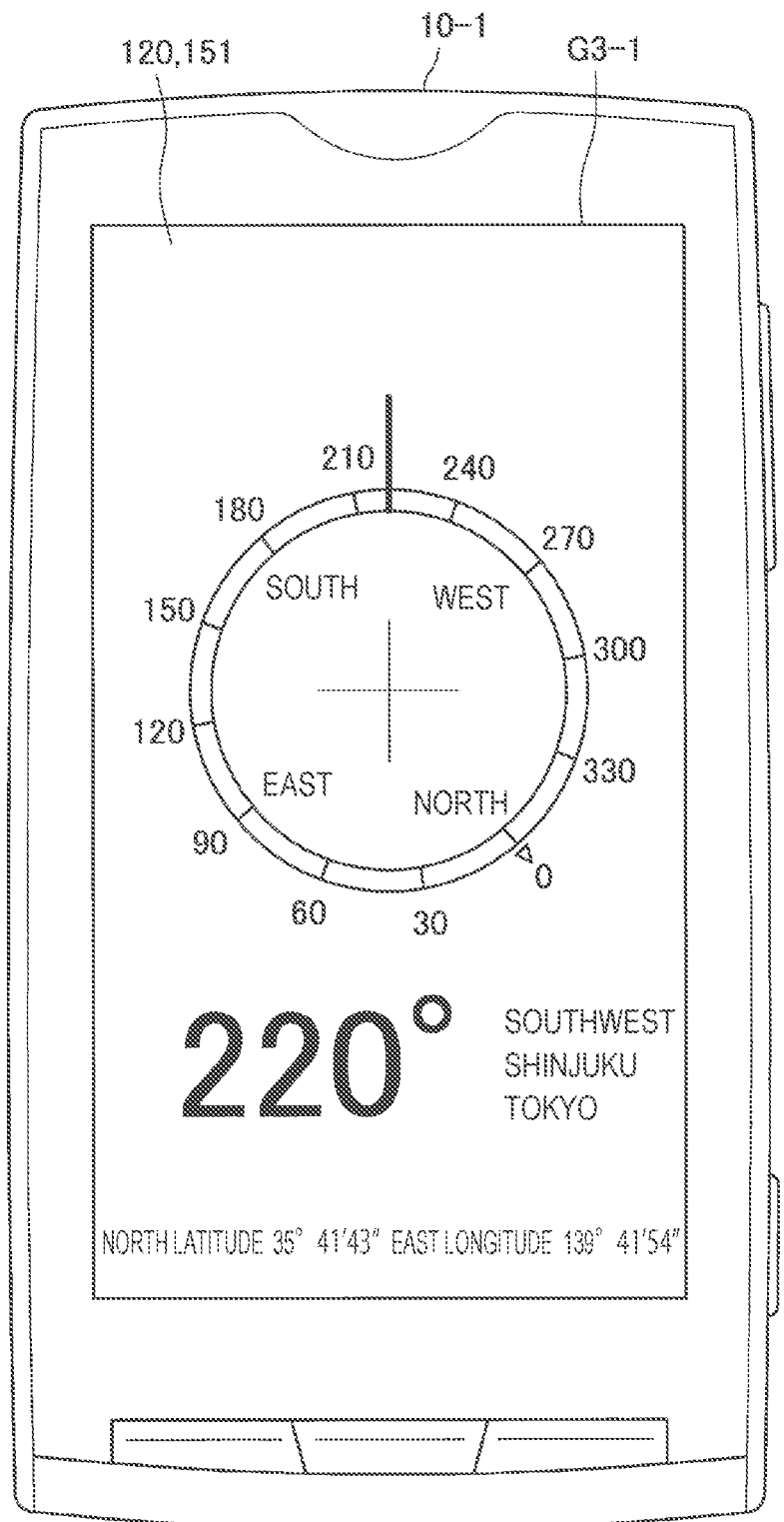
FIG. 17 is a diagram illustrating an output example of the relative position of a partner terminal.

FIG. 16 is a diagram illustrating an example of calculation of the degree of reliability. A description will be given of an example in which all of the sets of two or more measurement times are used for calculation of the degree of reliability in a case where five measurement points (times t0 to t4) are obtained as illustrated in FIG. 16. The data processing unit 132 estimates relative coordinates $C_{012}$ of the partner terminal 10-2 from sets of measurement times t0, t1, and t2 among five measurement points (times t0 to t4) by the above-described method. Similarly, the data processing unit 132 estimates relative coordinates $C_{123}$ of the partner terminal 10-2 from sets of measurement times t1, t2, and t3 among the five measurement points (times t0 to t4).

In addition, the data processing unit 132 estimates relative coordinates $C_{034}$ of the partner terminal 10-2 from sets of measurement times t0, t3, and t4 among the five measurement points (times t0 to t4). In addition, the data processing unit 132 estimates relative coordinates $C_{014}$ of the partner terminal 10-2 from sets of measurement times t0, t1, and t4 among the five measurement points (times t0 to t4). Due to space limitations, a description of other combinations will be omitted. The data processing unit 132 calculates the degree of variation in the relative coordinates $C_{012}$, $C_{123}$, $C_{034}$, $C_{014}$, . . . of the partner terminal 10-2 which are estimated in this manner, as the degree of reliability.

As described above, the calculation of the degree of reliability has been described, but a method of calculating the degree of reliability is not limited thereto. For example, it is assumed that the accuracy of calculation of the position of the host terminal 10-1 which is performed by the inertial sensor 111 is deteriorated due to cumulative errors with the lapse of time. Consequently, the data processing unit 132 may weight the degree of influence on the degree of reliability so that the degree of reliability is lowered with the lapse of time.

In addition, the data processing unit 132 may calculate the degree of reliability after excluding a result having a different tendency from the other results, among the relative coordinates of the partner terminal 10-2 which are calculated from each set of two or more measurement times selected from among the plurality of measurement points.

Further, in a case where the partner terminal 10-2 is also moved, it is assumed that the relative position of the partner terminal 10-2 cannot be calculated with a high level of accuracy. Consequently, in a case where the movement of the partner terminal 10-2 is detected by an action recognition technique, the data processing unit 132 may lower the calculated degree of reliability of the relative position of the partner terminal 10-2, or may not perform calculation of the relative position of the partner terminal 10-2.

1.8. Determination of Position of Partner

Subsequently, determination of the above-described position of a partner will be described. When the data processing unit 132 calculates the relative position of the partner terminal 10-2 with respect to each set of two or more measurement times selected from among a plurality of measurement times in the above-described manner, the midpoint or the center of gravity of the calculated relative position of the partner terminal 10-2 may be determined to be the relative position of the partner terminal 10-2. That is, the data processing unit 132 may determine the midpoint or the center of gravity of the relative position of the partner terminal 10-2 which is calculated from each set used for the calculation of the degree of reliability, to be the relative position of the partner terminal 10-2.

Alternatively, as described above, it is assumed that the accuracy of calculation of the position of the host terminal 10-1 which is performed by the inertial sensor 111 is deteriorated due to cumulative errors with the lapse of time. Consequently, in order to determine the relative position of the partner terminal 10-2 with a higher level of accuracy, the data processing unit 132 may determine the relative position of the partner terminal 10-2 on the basis of a set of earliest measurement times, among the sets of two or more measurement times selected from among the plurality of measurement times.

As described above, the determination of the position of a partner has been described.

1.9. Feedback of Position of Partner

Subsequently, feedback of the above-described relative position of the partner terminal 10-2 to the user U1 will be described. The output control unit 133 controls the output unit 150 so that the relative position of the partner terminal 10-2 is output by the output unit 150. Here, an output destination of the relative position of the partner terminal 10-2 is not particularly limited.

For example, the output control unit 133 may perform control so that the relative position of the partner terminal 10-2 is displayed by the display unit included in the output unit 150, or may perform control so that the relative position of the partner terminal 10-2 is output by the sound output unit included in the output unit 150. Alternatively, the output control unit 133 may perform control so that the relative position of the partner terminal 10-2 is output by the vibrator included in the output unit 150. Alternatively, the output control unit 133 may perform control so as to perform transmission to another device different from the host terminal 10-1.

FIGS. 17 to 22 are diagrams illustrating an output example of the relative position of the partner terminal 10-2. For example, as shown in a feedback UI (G3-1) of FIG. 17, the output control unit 133 may display the direction of the partner terminal 10-2 based on the position of the host terminal 10-1 so as to be superimposed on an azimuth detected by the geomagnetic sensor, or may display the direction of the partner terminal 10-2 based on the position of the host terminal 10-1 by texts (for example, a character string of "220°"). In addition, as shown in the feedback UI (G3-1), the output control unit 133 may display the position of the partner terminal 10-2 by latitude and longitude.

Figure 18:
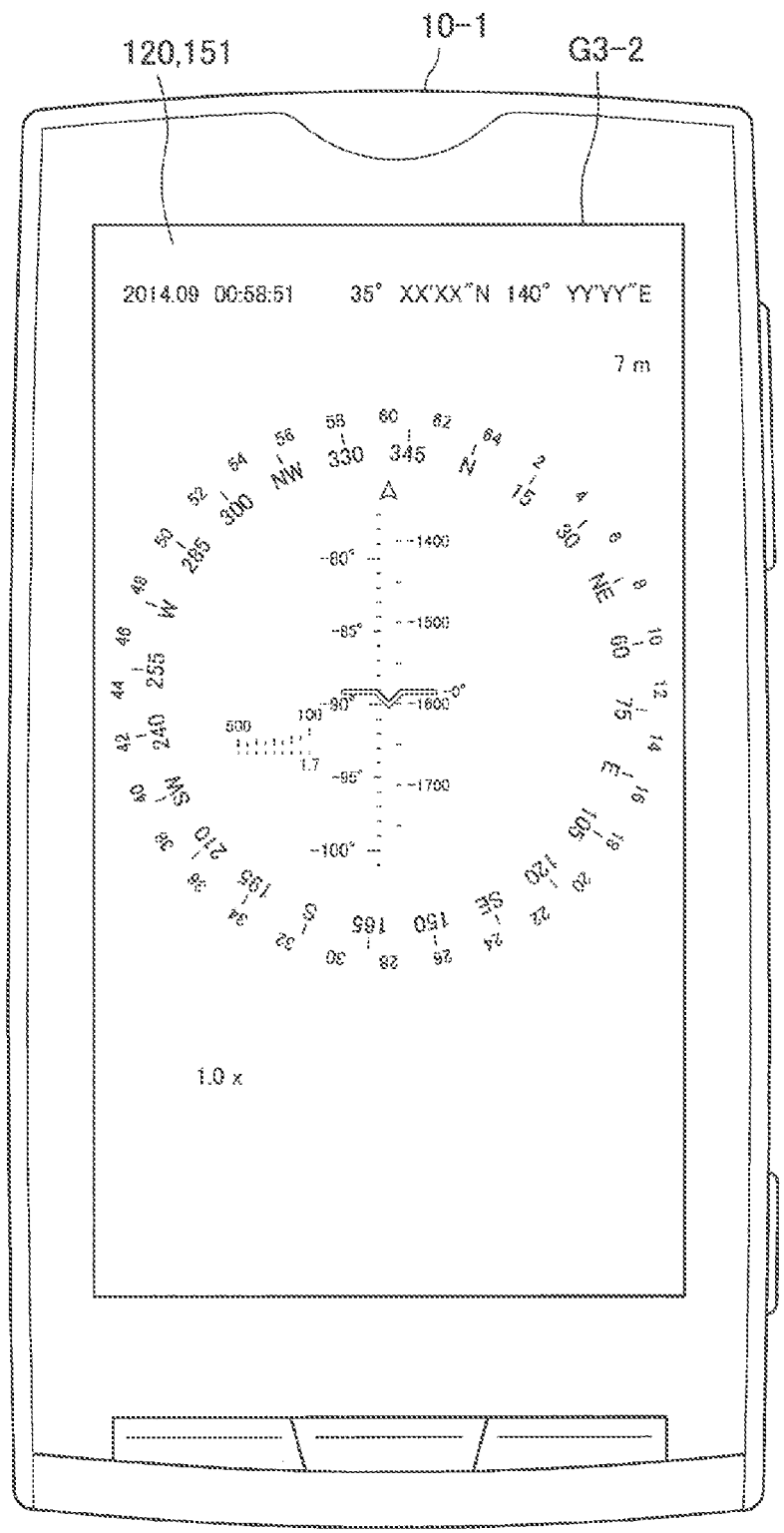
FIG. 18 is a diagram illustrating an output example of the relative position of a partner terminal.
Figure 19:
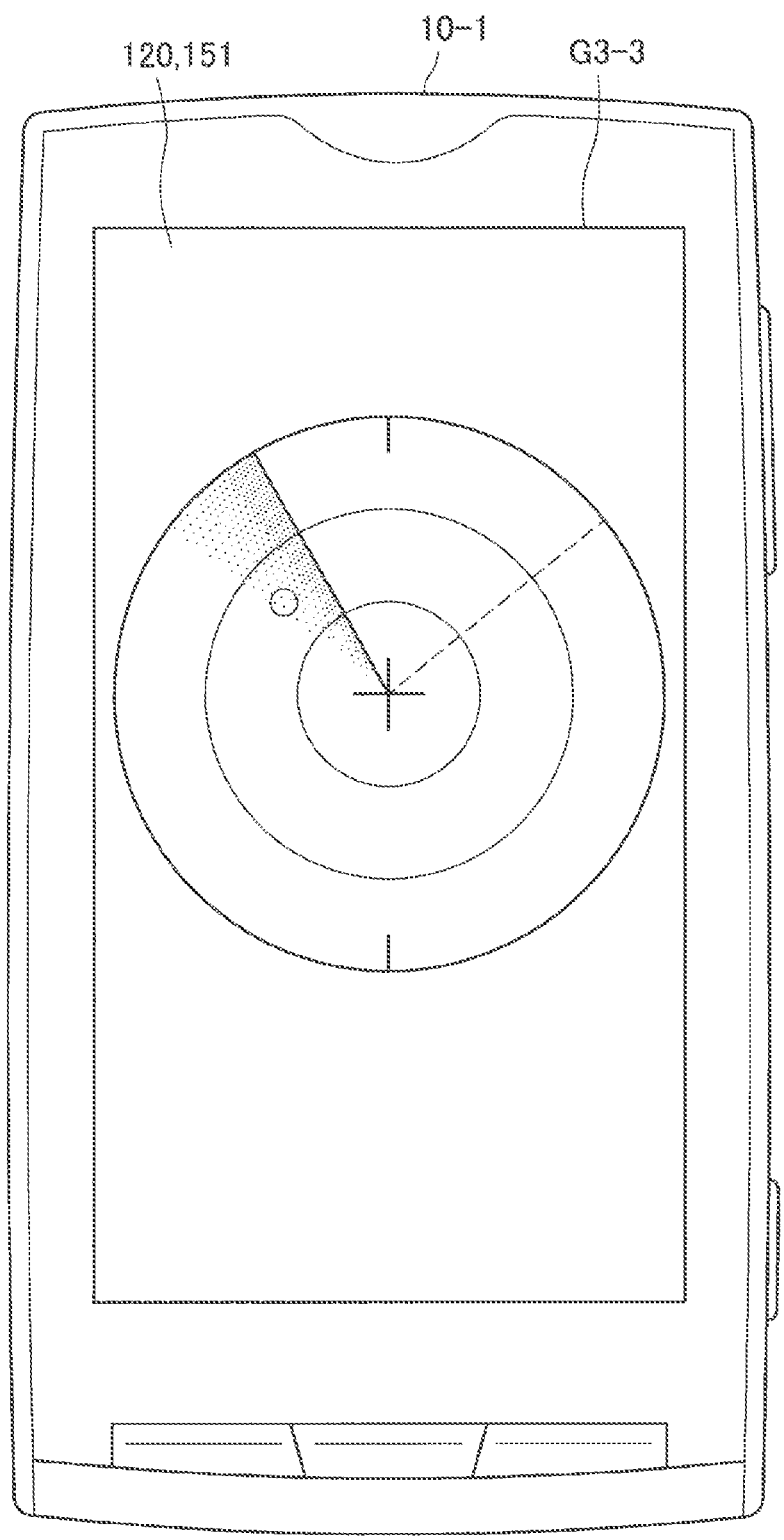
FIG. 19 is a diagram illustrating an output example of the relative position of a partner terminal.

In addition, as shown in a feedback UI (G3-2) of FIG. 18, the output control unit 133 may perform display control of a distance from the host terminal 10-1 to the partner terminal 10-2 by an indicator. In addition, as shown in a feedback UI (G3-3) of FIG. 19, the output control unit 133 may display the direction and distance of the partner terminal 10-2 based on the position of the host terminal 10-1 by a radar display method (for example, plan position indicator scope (PPI scope)).

Figure 20:
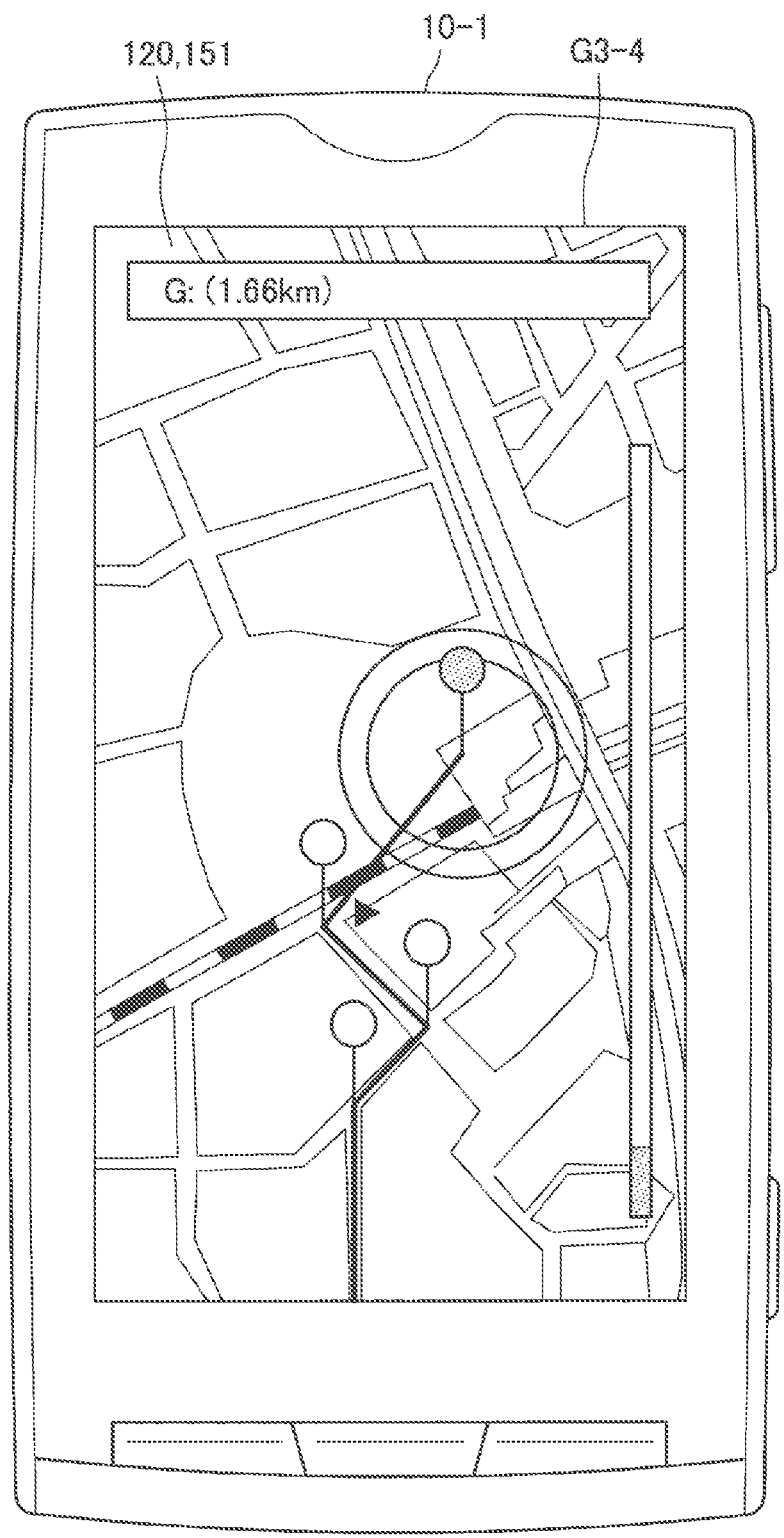
FIG. 20 is a diagram illustrating an output example of the relative position of a partner terminal.

In addition, as shown in a feedback UI (G3-4) of FIG. 20, the output control unit 133 may display the position of the host terminal 10-1 in accordance with the position of an object (for example, a pin) displayed on a map. In addition, as shown in a feedback UI (G3-4) of FIG. 20, the output control unit 133 may display the distance and direction of the partner terminal 10-2 based on the position of the host terminal 10-1 in accordance with the position and direction of an object (for example, an arrow).

Figure 21:
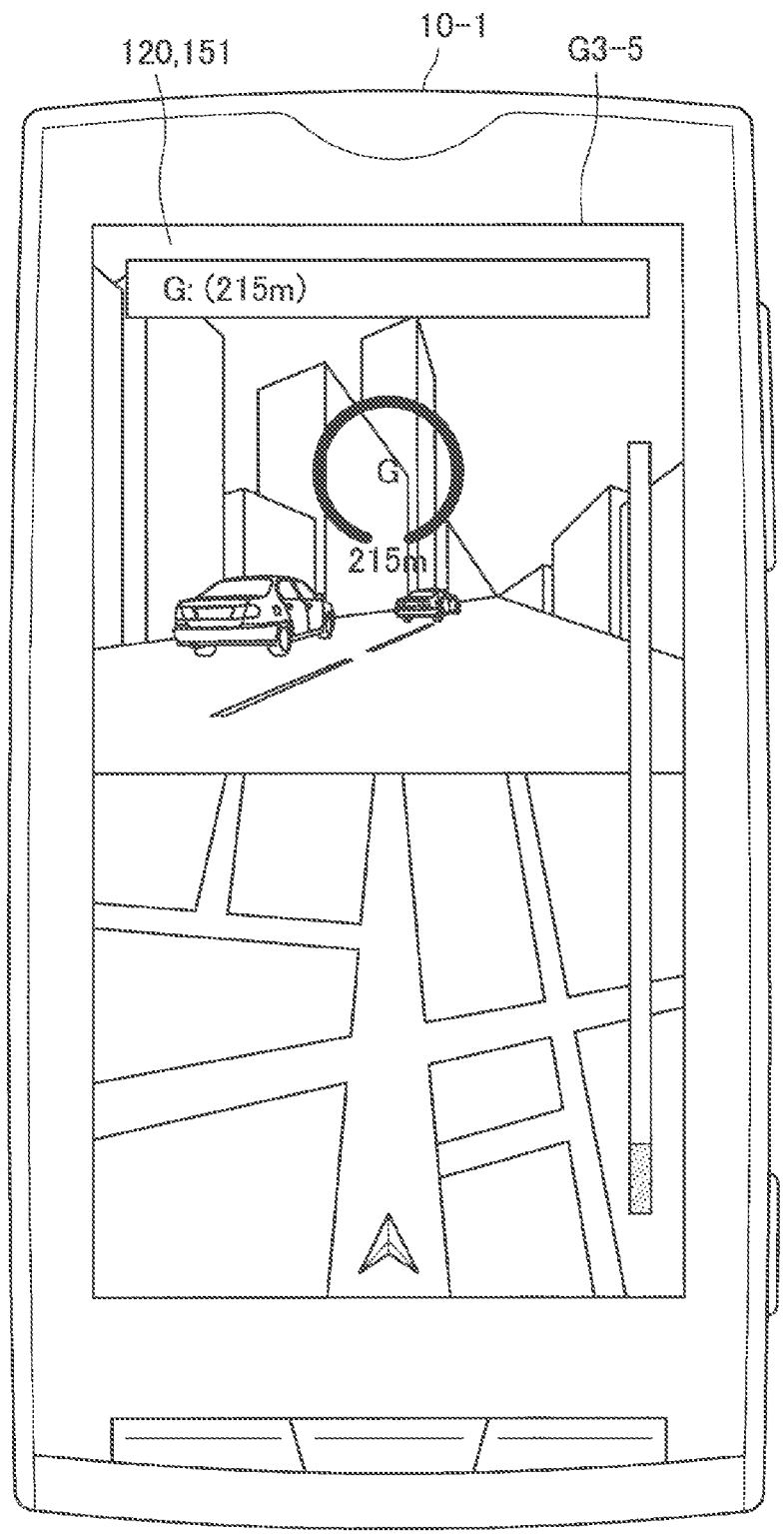
FIG. 21 is a diagram illustrating an output example of the relative position of a partner terminal.

In addition, as shown in a feedback UI (G3-5) of FIG. 21, the output control unit 133 may display the position of the host terminal 10-1 in accordance with the position of an object (for example, an arrow) displayed on a map. In addition, as shown in the feedback UI (G3-5) of FIG. 21, the output control unit 133 may display a captured image of a real space in the direction of the partner terminal 10-2 based on the position of the host terminal 10-1, and may display the distance of the partner terminal 10-2 based on the position of the host terminal 10-1.

In addition, as described above, the output control unit 133 may perform control so that the relative position of the partner terminal 10-2 is output by the sound output unit included in the output unit 150. In this case, the output control unit 133 may control the output of a voice so that the direction and distance of the partner terminal 10-2 based on the position of the host terminal 10-1 are guided by the voice.

Alternatively, the output control unit 133 may output a sound regarding correctness of the direction of the host terminal 10-1 (that is, proximity of the direction of the host terminal 10-1 to the direction of the partner terminal 10-2 based on the position of the host terminal 10-1) and proximity of the position of the host terminal 10-1 to the position of the partner terminal 10-2, in accordance with the frequency of beeps and the length of an interval between the beeps. For example, the output control unit 133 may make the beep higher as the direction of the host terminal 10-1 becomes more correct, or may reduce an interval between the beeps as the position of the host terminal 10-1 and the position of the partner terminal 10-2 become closer to each other.

In addition, as described above, the output control unit 133 may perform control so that the relative position of the partner terminal 10-2 is output by the vibrator included in the output unit 150. In this case, the output control unit 133 may present correctness of the direction of the host terminal 10-1 (that is, proximity of the direction of the host terminal 10-1 to the direction of the partner terminal 10-2 based on the position of the host terminal 10-1) and proximity of the position of the host terminal 10-1 to the position of the partner terminal 10-2, in accordance with the intensity of vibrations and the length of an interval between the vibrations.

Figure 22:
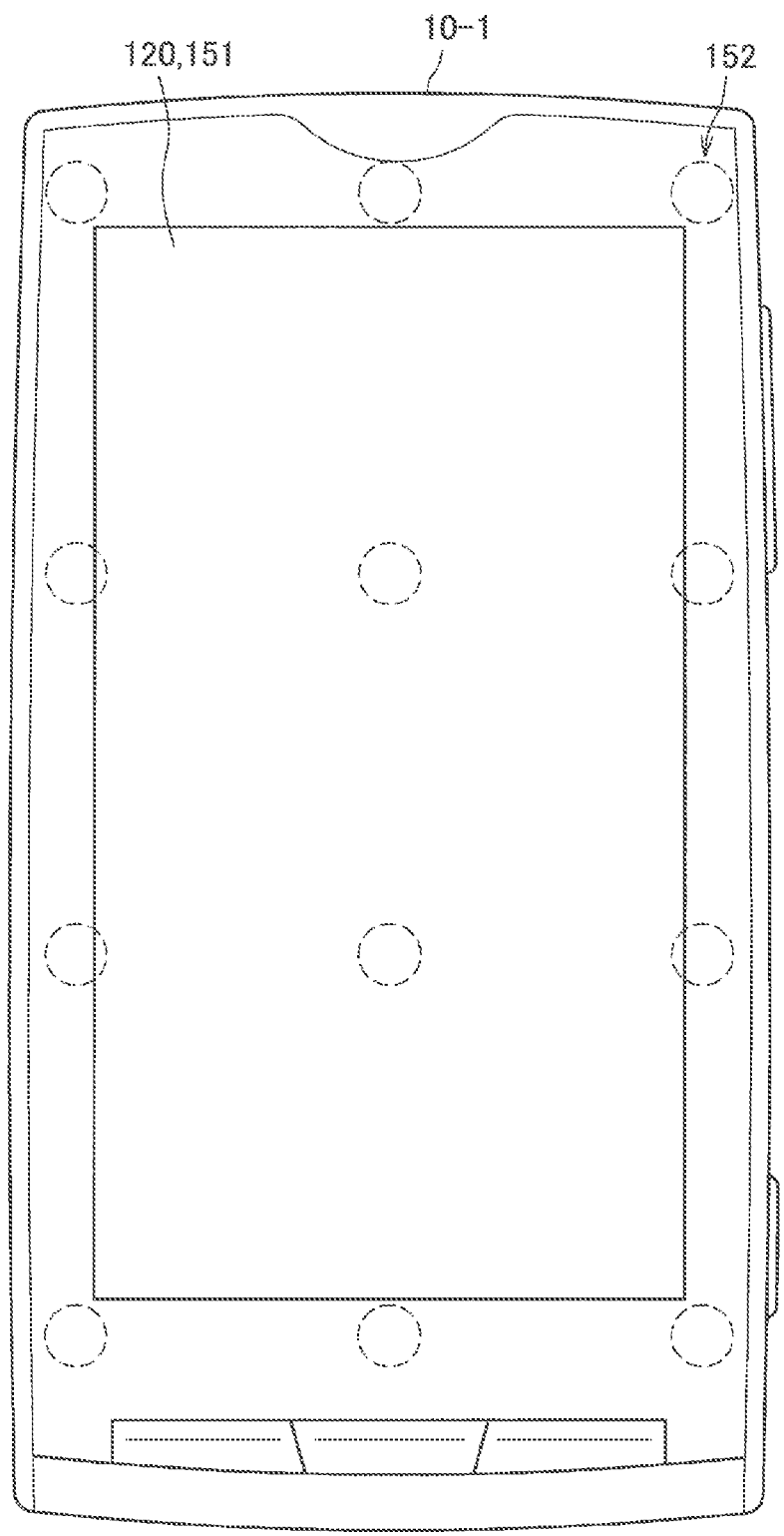
FIG. 22 is a diagram illustrating an output example of the relative position of a partner terminal.

For example, the output control unit 133 may increase the intensity of vibrations as the direction of the host terminal 10-1 becomes more correct, or may reduce an interval between the vibrations as the position of the host terminal 10-1 and the position of the partner terminal 10-2 become closer to each other. For example, as illustrated in FIG. 22, the output control unit 133 may control a plurality of vibrators 152 provided in the host terminal 10-1 so as to give the user U1 a sense that a position according to the direction of the partner terminal 10-2 based on the position of the host terminal 10-1 vibrates.

Further, in the above description, a case has been mainly assumed in which the host terminal 10-1 and the partner terminal 10-2 have a form of a smartphone. However, the forms of the host terminal 10-1 and the partner terminal 10-2 are not limited to the smartphone.

Figure 23:
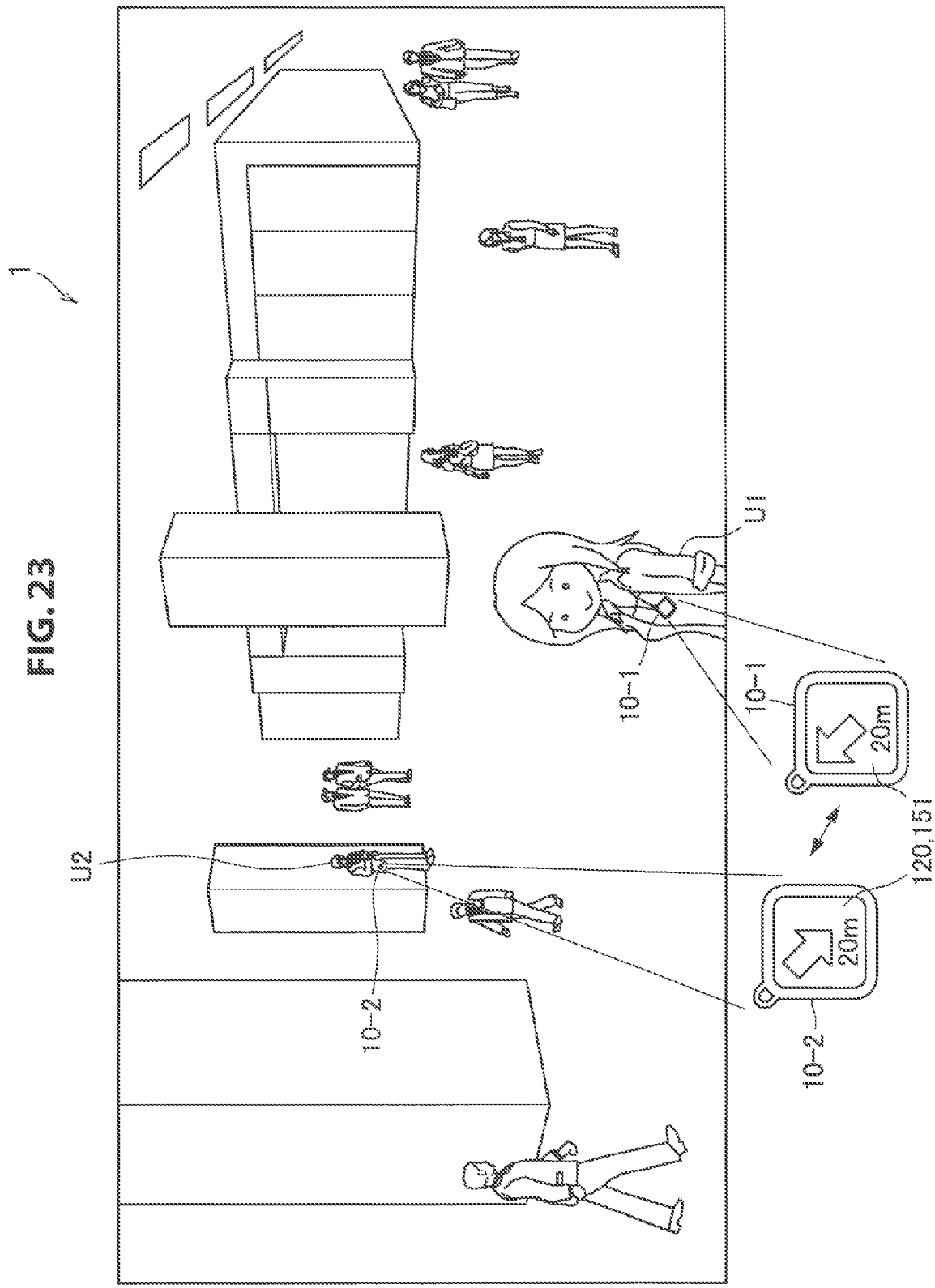
FIG. 23 is a diagram illustrating an example of forms of a host terminal and a partner terminal.

FIG. 23 is a diagram illustrating an example of the forms of the host terminal 10-1 and the partner terminal 10-2. As illustrated in FIG. 23, the host terminal 10-1 and the partner terminal 10-2 may be necklace type terminals. In this case, the host terminal 10-1 may display a distance between the position of the host terminal 10-1 and the position of the partner terminal 10-2, and may display the direction of the partner terminal 10-2 based on the position of the host terminal 10-1 by means of an arrow. Similarly, the partner terminal 10-2 may display a distance between the position of the host terminal 10-1 and the position of the partner terminal 10-2, and may display the direction of the host terminal 10-1 based on the position of the partner terminal 10-2 by means of an arrow.

Figure 24:
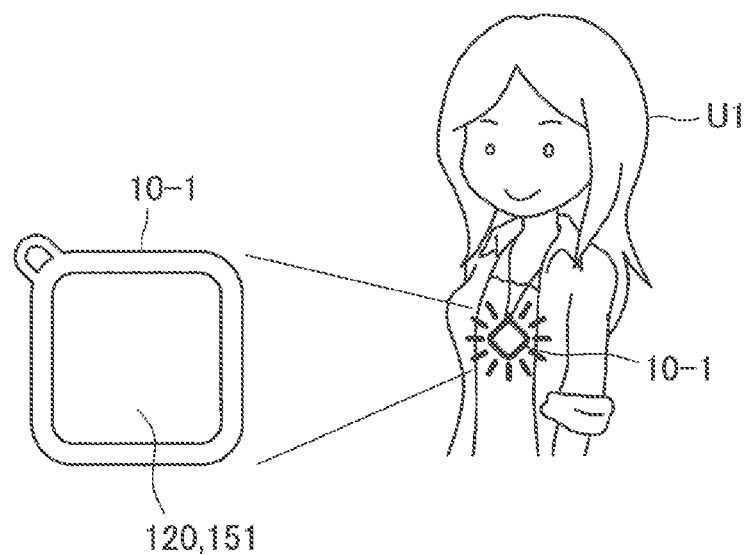
FIG. 24 is a diagram illustrating an example of the form of a host terminal.

FIG. 24 is a diagram illustrating an example of the form of the host terminal 10-1. As illustrated in FIG. 24, in a case where the direction of the host terminal 10-1 is correct (that is, in a case where the direction of the host terminal 10-1 and the direction of the partner terminal 10-2 based on the position of the host terminal 10-1 are consistent with each other), the host terminal 10-1 may notify the user U1 that the direction of the host terminal 10-1 is correct, by emitting light (or by a vibration).

FIG. 25 is a diagram illustrating an example of the form of the host terminal 10-1. As illustrated in FIG. 25, the host terminal 10-1 may be a glass-type terminal. In this case, as illustrated in FIG. 25, the host terminal 10-1 may superimpose the direction of the partner terminal 10-2 based on the position of the host terminal 10-1 on scenery seen through glass (or scenery displayed on glass) G4, or may superimpose a distance between the host terminal 10-1 and the partner terminal on the scenery.

Figure 26:
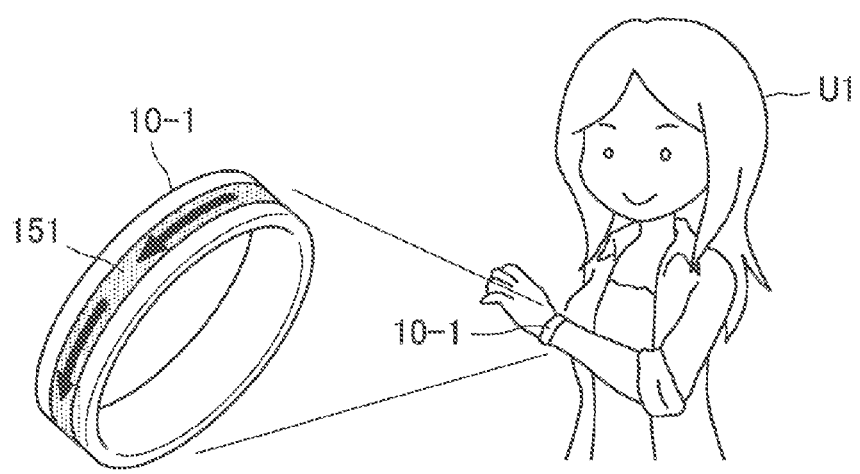
FIG. 26 is a diagram illustrating an example of the form of a host terminal.

FIG. 26 is a diagram illustrating an example of the form of the host terminal 10-1. As illustrated in FIG. 26, the host terminal 10-1 may be a wristband-type terminal. In this case, as illustrated in FIG. 26, the host terminal 10-1 may control display of an arrow performed by the display unit 151 in the direction of the partner terminal 10-2 based on the position of the host terminal 10-1. In addition, the host terminal 10-1 may display the arrow by animation so that the user U1 can easily notice the arrow. For example, as illustrated in FIG. 26, in a case where the partner terminal 10-2 based on the position of the host terminal 10-1 is in front of the user U1, the host terminal 10-1 may control the display of an arrow indicating the front side of the user U1.

Figure 27:
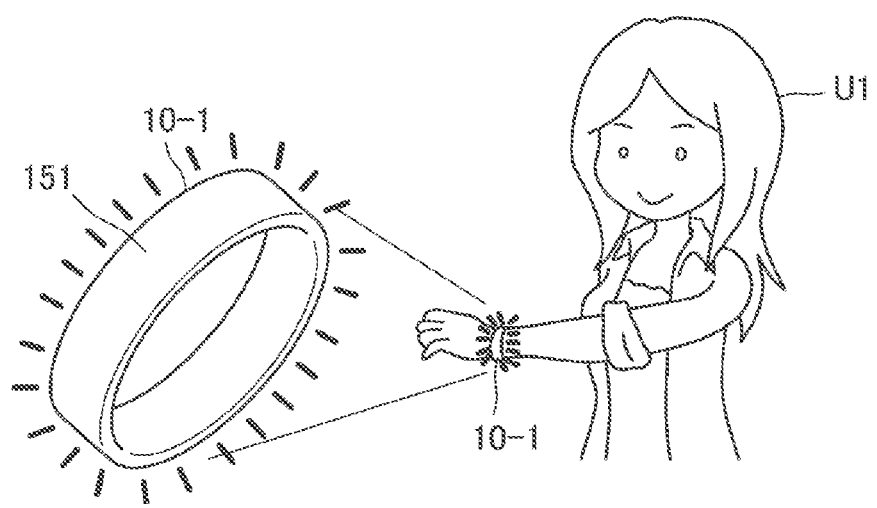
FIG. 27 is a diagram illustrating an example of the form of a host terminal.

FIG. 27 is a diagram illustrating an example of the form of the host terminal 10-1. As illustrated in FIG. 27, in a case where the direction (for example, an extension direction of an arm on which the host terminal 10-1 is worn) of the host terminal 10-1 is correct (that is, in a case where the direction of the host terminal 10-1 and the direction of the partner terminal 10-2 based on the position of the host terminal 10-1 are consistent with each other), the host terminal 10-1 may notify the user U1 that the direction of the host terminal 10-1 is correct, by emitting light (or by a vibration).

Figure 28:
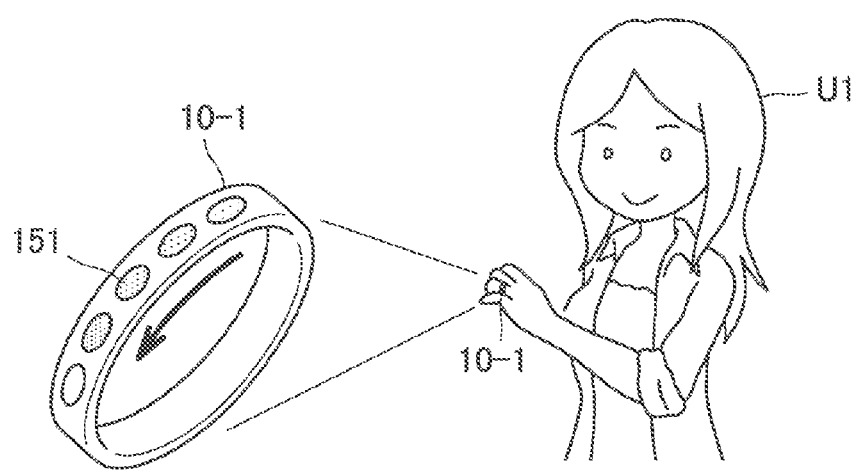
FIG. 28 is a diagram illustrating an example of the form of a host terminal.

FIG. 28 is a diagram illustrating an example of the form of the host terminal 10-1. As illustrated in FIG. 28, the host terminal 10-1 may be a ring-type terminal. In this case, as illustrated in FIG. 28, the host terminal 10-1 may control the display unit 151 so that the position of light emission is moved in the direction of the partner terminal 10-2 based on the position of the host terminal 10-1. For example, as illustrated in FIG. 28, in a case where the partner terminal 10-2 based on the position of the host terminal 10-1 is in front of the user U1, the host terminal 10-1 may control the display unit 151 so that the position of light emission is moved to the front side of the user U1.

Figure 29:
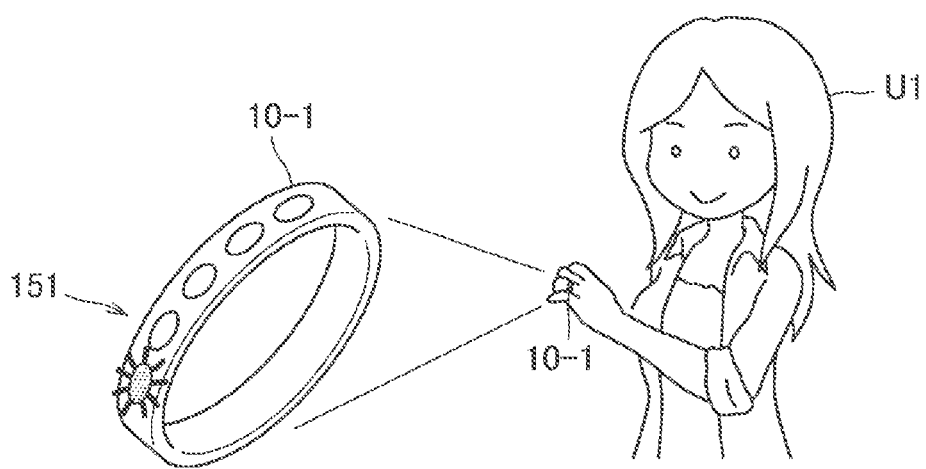
FIG. 29 is a diagram illustrating an example of the form of a host terminal.

FIG. 29 is a diagram illustrating an example of the form of the host terminal 10-1. As illustrated in FIG. 29, the host terminal 10-1 may control the display unit 151 so that light is emitted at a position according to the direction of the partner terminal 10-2 based on the position of the host terminal 10-1. For example, as illustrated in FIG. 29, in a case where the partner terminal 10-2 based on the position of the host terminal 10-1 is in front of the user U1, the host terminal 10-1 may control the display unit 151 so that an end emits light in front of the user U1.

Figure 30A:
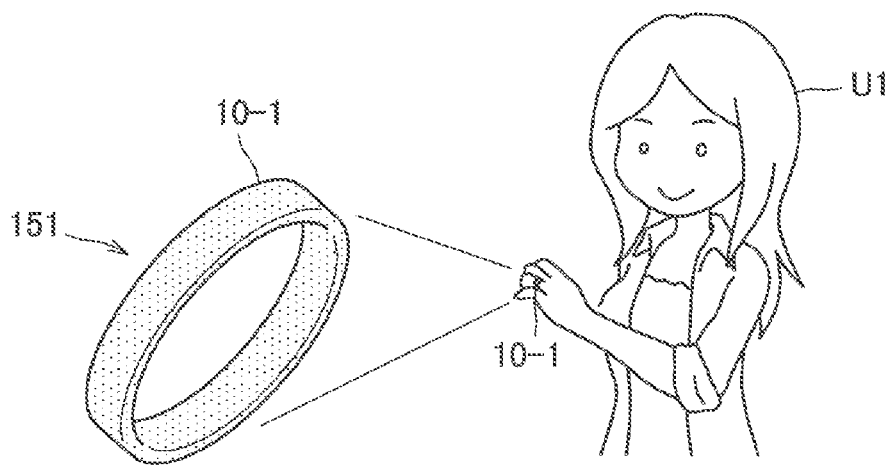
FIG. 30A is a diagram illustrating an example of the form of a host terminal.
Figure 30B:
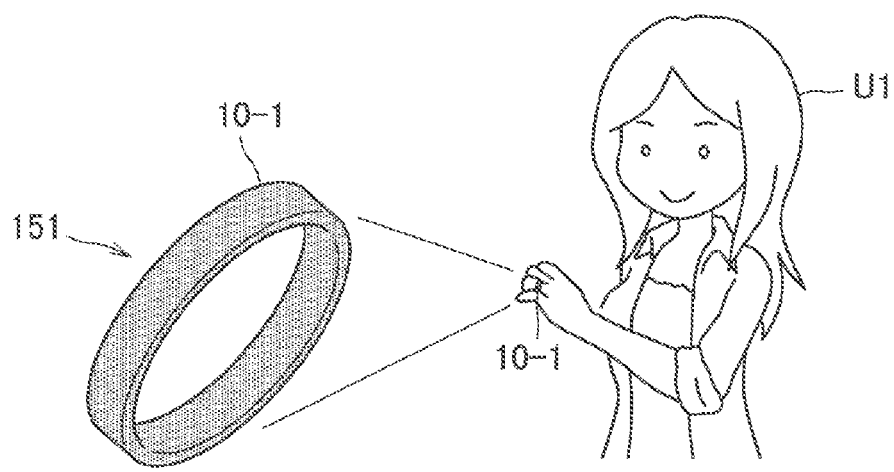
FIG. 30B is a diagram illustrating an example of the form of a host terminal.

FIGS. 30A and 30B are diagrams illustrating an example of the form of the host terminal 10-1. The host terminal 10-1 may control the display unit 151 so that light is emitted with an intensity according to the direction of the partner terminal 10-2 based on the position of the host terminal 10-1. For example, the host terminal 10-1 may control the display unit 151 so that light is emitted with a higher intensity as the direction of the host terminal 10-1 (for example, an extension direction of a finger on which the host terminal 10-1 is worn) becomes more correct (that is, the direction of the host terminal 10-1 and the direction of the partner terminal 10-2 based on the position of the host terminal 10-1 become closer to each other).

In addition, as illustrated in FIGS. 30A and 30B, the host terminal 10-1 may control the display unit 151 so as to emit light in a color according to a distance between the host terminal 10-1 and the partner terminal 10-2. For example, the host terminal 10-1 may cause the display unit 151 to emit light in a first color (for example, red) in a case where the distance between the host terminal 10-1 and the partner terminal 10-2 is smaller than a first threshold value, or may cause the display unit 151 to emit light in a second color (for example, green) in a case where the distance between the host terminal 10-1 and the partner terminal 10-2 is larger than a second threshold value.

As described above, the feedback of the position of a partner has been described.

1.10. Type of Error and UI

Subsequently, examples of the type of error (a failure in estimation of the relative position of the partner terminal 10-2) which occurs in the host terminal 10-1 and an error notice UI will be described. FIG. 31 is a diagram illustrating an example of information in which the type of error, the reason for the error, and the degree of priority of the error are associated with each other. As illustrated in FIG. 31, examples of the type of error include "out of distance measurement range", "during movement of object", "insufficiency of distance measurement points", "insufficiency of degree of reliability", "time out", and the like. In addition, reasons of errors as illustrated in FIG. 31 are assumed. The output control unit 133 controls the output of an error in a case where the error occurs.

As illustrated in FIG. 31, the degree of priority of the type of error of "out of distance measurement range" is set to be highest, and the degree of priority of the type of error of "time out" is set to be lowest. The display region of the host terminal 10-1 is limited. Accordingly, a case is also assumed in which it is difficult to present all errors in a case where a plurality of errors occur. Consequently, in a case where a plurality of errors occur, the output control unit 133 may present an error having the highest degree of priority among the plurality of errors.

FIGS. 32A, 32B, 32C, 32D, and 32E are diagrams illustrating an example of an error notice UI. As shown in an error notice UI (G5-1) of FIG. 32A, when an error of "out of distance measurement range" occurs, the output control unit 133 may cause the display unit 151 to display that there is a possibility that a partner is out of a measurable range. In this case, as shown in the error notice UI (G5-1) of FIG. 32A, the output control unit 133 may display a selection button for selecting whether to request GPS information of the partner terminal 10-2.

Figure 32A:
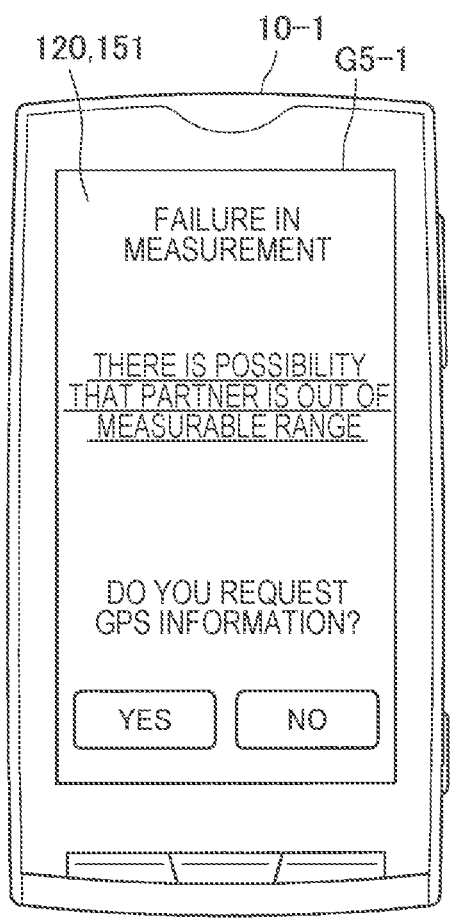
FIG. 32A is a diagram illustrating an example of an error notice UI.

In addition, when the requesting of the GPS information of the partner terminal 10-2 is selected by the user U1 (a "YES" button in FIG. 32A is pressed) and the GPS information of the partner terminal 10-2 is received, the GPS information of the partner terminal 10-2 may be displayed on a map. Then, the user U1 can ascertain the position of the partner terminal 10-2 on the basis of the GPS information of the partner terminal 10-2, even when the estimation of the relative position of the partner terminal 10-2 is not successful.

Figure 32B:
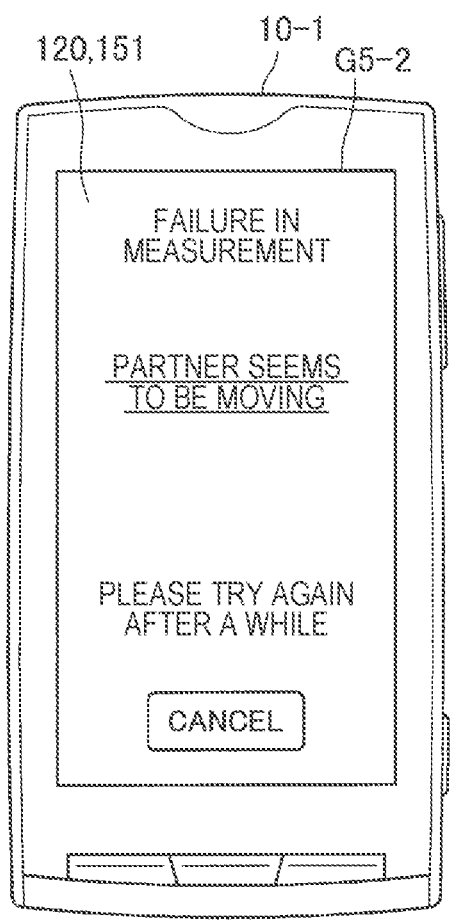
FIG. 32B is a diagram illustrating an example of an error notice UI.

In addition, as shown in an error notice UI (G5-2) of FIG. 32B, when an error of "during movement of object" occurs, the output control unit 133 may cause the display unit 151 to display that there is a possibility that a partner is moving. In this case, as shown in an error notice UI (G5-2) of FIG. 32B, the output control unit 133 may cause the display unit to display a proposal to try measurement again after time lapses for a while.

Figure 32C:
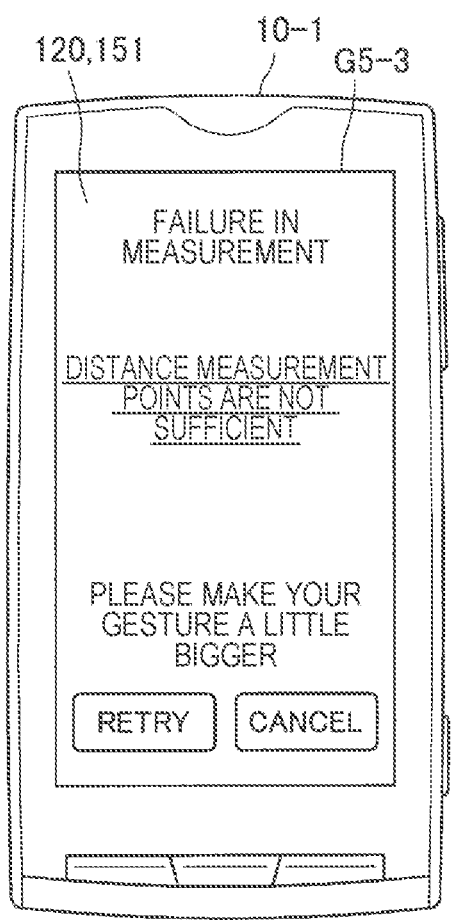
FIG. 32C is a diagram illustrating an example of an error notice UI.

In addition, as shown in an error notice UI (G5-3) of FIG. 32C, in a case where an error of "insufficiency of distance measurement points" occurs, the output control unit 133 may cause the display unit 151 to display that distance measurement points are insufficient. In this case, as shown in the error notice UI (G5-3) of FIG. 32C, the output control unit 133 may cause the display unit to display a proposal to try measurement again with a slightly larger gesture. In addition, the output control unit 133 may cause the display unit to display a retry button. Further, in a case where the retry button is pressed, the data processing unit 132 may execute measurement again.

Figure 32D:
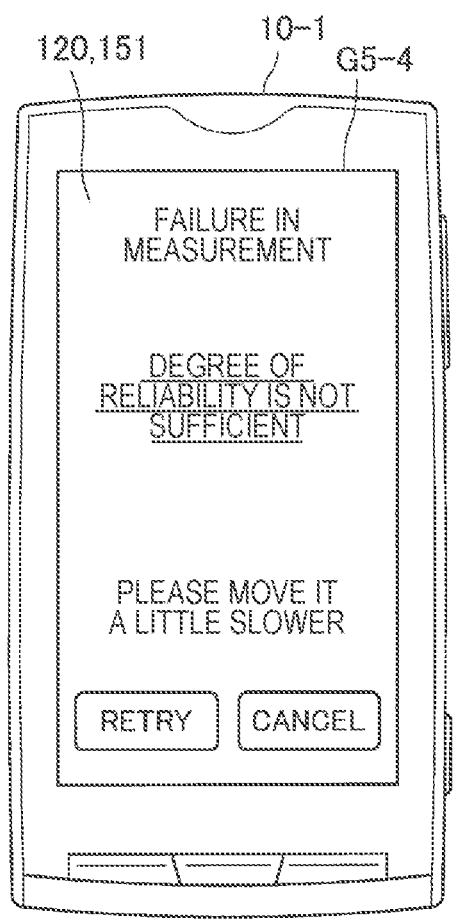
FIG. 32D is a diagram illustrating an example of an error notice UI.

In addition, as shown in an error notice UI (G5-4) of FIG. 32D, in a case where an error of "insufficiency of degree of reliability" occurs, the output control unit 133 may cause the display unit 151 to display that the degree of reliability is insufficient. In this case, as shown in the error notice UI (G5-4) of FIG. 32D, the output control unit 133 may cause the display unit to display a proposal to try measurement again with a slightly larger gesture. In addition, the output control unit 133 may cause the display unit to display a retry button. Further, in a case where the retry button is pressed, the data processing unit 132 may execute measurement again.

Figure 32E:
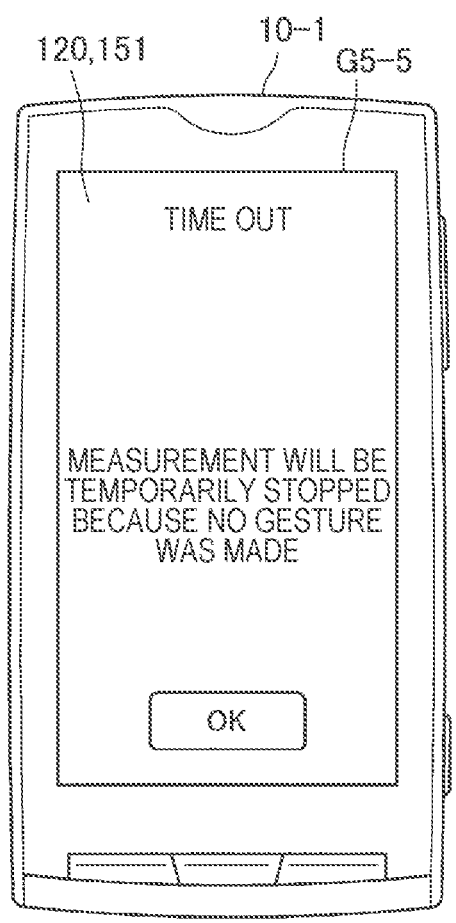
FIG. 32E is a diagram illustrating an example of an error notice UI.

In addition, as shown in an error notice UI (G5-5) of FIG. 32E, in a case where an error of "time out" occurs, the output control unit 133 may cause the display unit 151 to display that a gesture has not been executed. In this case, as shown in the error notice UI (G5-5) of FIG. 32E, the output control unit 133 may cause the display unit to display that the measurement is temporarily stopped, and the data processing unit 132 may temporarily stop the measurement.

As described above, the types of errors and UI have been described.

1.11. Use Case

Subsequently, a specific use case of the present embodiment will be described. In the above-described example, a description has been given of an example in which the present embodiment is applied to a case where the user U1 and the user U2 meet. However, various other scenes are assumed as a scene to which the present embodiment is applied. For example, the present embodiment may be used to prevent a child from getting lost.

Figure 33:
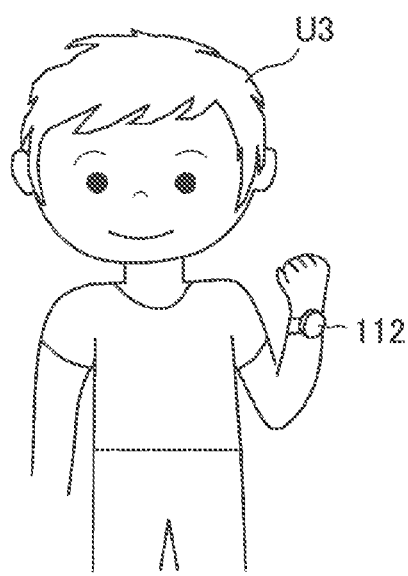
FIG. 33 is a diagram illustrating a case where the present embodiment is used to prevent a child from getting lost.

FIG. 33 is a diagram illustrating a case where the present embodiment is used to prevent a child from getting lost. As illustrated in FIG. 33, a case is assumed in which a user U3 who is a child wears a distance measuring sensor 112, and the child's parent owns a host terminal 10-1. In this case, the output control unit 133 of the host terminal 10-1 may control the output of a notice to be given to the parent in a case where a distance between the host terminal 10-1 and the distance measuring sensor 112 of the child exceeds a predetermined distance.

Further, in a case where the child cannot be found around, the parent given the notice may perform an operation of starting up an application for estimating the relative position of the distance measuring sensor 112 of the child based on the host terminal 10-1. Then, the parent gives a plurality of measurement points by a gesture, and thus can know the relative position of the distance measuring sensor 112 of the child using the host terminal 10-1 based on the plurality of measurement points as a reference.

Figure 34:
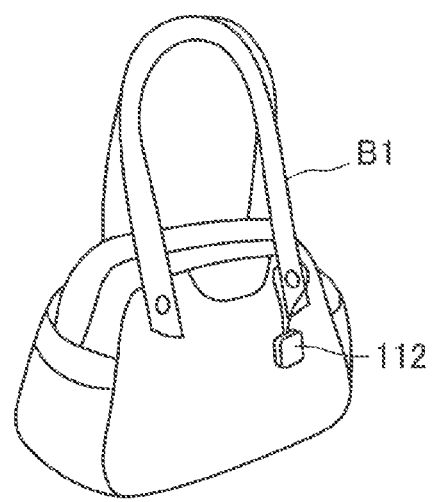
FIG. 34 is a diagram illustrating a case where the present embodiment is used for search of a lost article.

For example, the present embodiment may be used for search of a lost article. FIG. 34 is a diagram illustrating a case where the present embodiment is used for search of a lost article. As illustrated in FIG. 34, a case is assumed in which a distance measuring sensor 112 is attached to a bag B1, and the owner of the bag B1 owns a host terminal 10-1. In this case, the owner gives a plurality of measurement points by a gesture, and thus can know the relative position of the distance measuring sensor 112 of the bag B1 using the host terminal 10-1 based on the plurality of measurement points as a reference.

Note that, here, a description has been given of an example in which the distance measuring sensor 112 is attached to the bag B1, but the distance measuring sensor 112 may be attached to any object other than the bag B1. For example, the distance measuring sensor 112 may be attached to objects that are easy to lose (for example, a key, a wallet, a remote controller, and the like).

Figure 35:
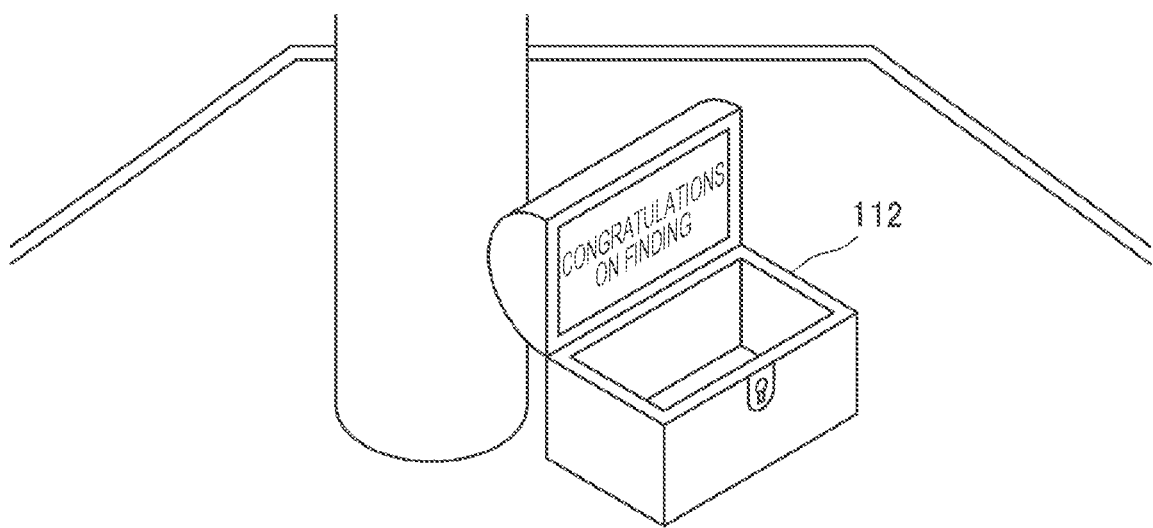
FIG. 35 is a diagram illustrating a case where the present embodiment is used for an item search game.

In addition, the present embodiment may be used for an item search game. FIG. 35 is a diagram illustrating a case where the present embodiment is used for an item search game. Here, the item search game is a game in which a user can increase his or her points when finding a hidden item. As illustrated in FIG. 35, a case is assumed in which a game providing company installs a distance measuring sensor 112 in a hidden place of an item, and a user owns a host terminal 10-1. In this case, the user gives a plurality of measurement points by a gesture, and thus can know the relative position of the hidden place of the item using the host terminal 10-1 based on the plurality of measurement points as a reference.

As described above, the use case of the present embodiment has been described.

1.12. Sequential Processing

In the above, a description has been given of an example in which a plurality of measurement points are obtained by a gesture determined in advance. However, the plurality of measurement points are obtained even when the gesture determined in advance is not performed, and thus it is possible to calculate the position of the host terminal 10-1 by inertial navigation on the basis of the plurality of measurement points. Consequently, hereinafter, a description will be given of an example in which a user may not perform a gesture determined in advance.

Specifically, the output control unit 133 of the host terminal 10-1 may instruct the user U1 to appropriately move the host terminal 10-1. Further, in this example, both a gesture determined in advance and a termination point of the gesture are not present, and thus the relative position of the partner terminal 10-2 based on the position of the host terminal 10-1 may be sequentially estimated. In addition, the data processing unit 132 may determine a plurality of measurement times at fixed time intervals.

FIGS. 36A and 36B are flowcharts illustrating an example of the overall operation of the host terminal 10-1 in a case where sequential processing is performed. First, the output control unit 133 controls display of UI for selecting a searching partner. In addition, as illustrated in FIG. 36A, when the searching partner is selected from a screen by the user U1 (S101) and an instruction for starting searching is given (S102), the output control unit 133 controls display of a data measurement instruction UI (S103). The data measurement instruction UI will be described later in detail.

In addition, the data processing unit 132 starts to record inertial sensor data acquired by the sensor control unit 131 (S104), and determines whether or not the inertial sensor data satisfies a condition of a measurement point at fixed time intervals. In a case where the inertial sensor data satisfies the condition of the measurement point ("Yes" in S105), the sensor control unit 131 acquires distance measuring sensor data (FIG. 36B), and the data processing unit 132 records the distance measuring sensor data acquired by the sensor control unit 131 and moves the operation to S121 (S106). On the other hand, in a case where the inertial sensor data does not satisfy the condition of the measurement point ("No" in S105), the data processing unit 132 moves the operation to S131.

Subsequently, in a case where the user does not give an instruction for terminating the searching ("No" in S131), the data processing unit 132 moves the operation to S104. On the other hand, in a case where the user gives an instruction for terminating the searching ("Yes" in S131), the data processing unit 132 terminates the operation.

Subsequently, the data processing unit 132 calculates its own position (the position of the host terminal 10-1) at each time from the inertial sensor data (S121). The calculation of its own position based on the inertial sensor data may be performed in any way. As an example, the data processing unit 132 may calculate its own position using a method in inertial navigation. More specifically, the data processing unit 132 may calculate the amount of movement based on the initial position of its own position by integration of accelerations, and may calculate a direction based on the initial direction of the host terminal 10-1 by integration of angular velocities. Note that a method for improving the accuracy of calculation of its own position may be further used.

Subsequently, the data processing unit 132 calculates the position of the partner (the relative position of the partner terminal 10-2 based on the position of the host terminal 10-1) on the basis of proximate X own positions and the distance measuring sensor data (S132). Note that distance measurement is performed at fixed time intervals, and thus data of an old measurement point is not used (may be erased from a buffer). In addition, the data processing unit 132 calculates the degree of reliability of the calculated position of the partner (S123). In a case where the degree of reliability does not exceed a threshold value ("No" in S124), the data processing unit 132 moves the operation to S131.

On the other hand, in a case where the degree of reliability exceeds the threshold value ("Yes" in S124), the data processing unit 132 determines the calculated position of the partner to be an object to be output (S125), and the output control unit 133 controls display of the determined position of the partner (S126) and terminates the operation.

Figure 37A:
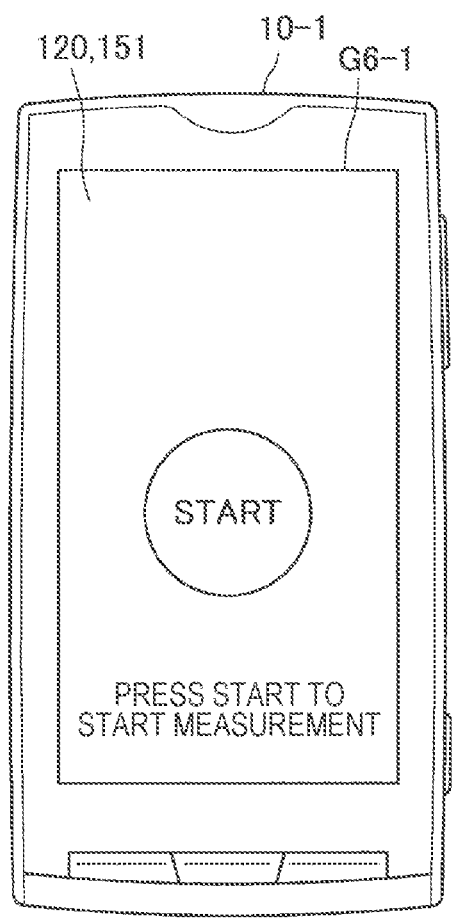
FIG. 37A is a diagram illustrating an example of a measurement start reception UI in a case where sequential processing is executed.
Figure 37B:
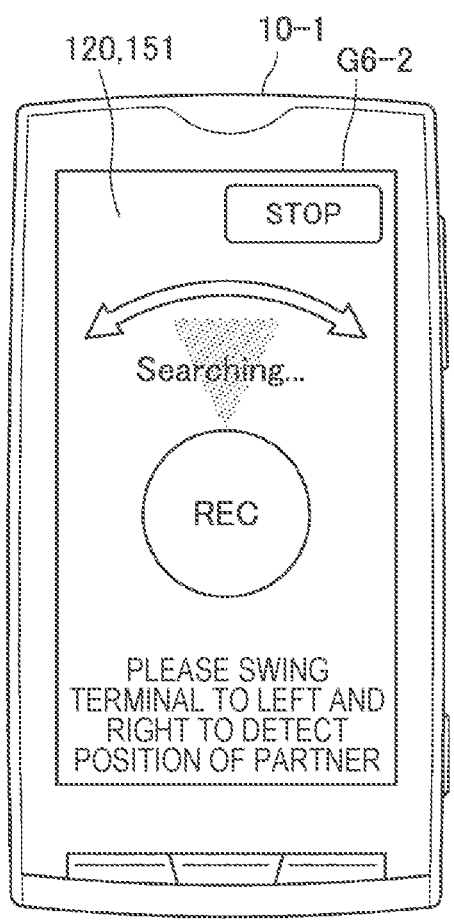
FIG. 37B is a diagram illustrating an example of a gesture instruction UI in a case where sequential processing is executed.

FIG. 37A is a diagram illustrating an example of a measurement start reception UI in a case where sequential processing is executed. In addition, FIG. 37B is a diagram illustrating an example of a gesture instruction UI in a case where sequential processing is executed. The output control unit 133 controls display of a measurement start reception UI (G6-1) in the sequential processing. When an operation of pressing a START button by the user U1 is received by the operation unit 120, the output control unit 133 controls an output for prompting a gesture of appropriately moving the terminal 10-1, as shown in a gesture instruction UI (G6-2).

Figure 38A:
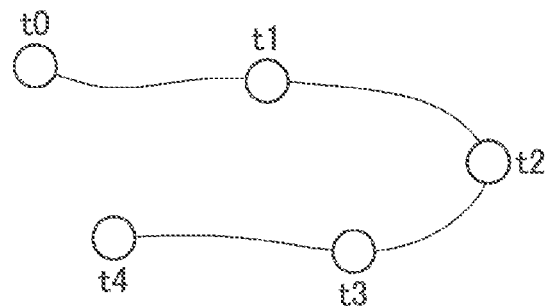
FIG. 38A is a diagram illustrating an example of a plurality of measurement points in a case where sequential processing is executed.

FIG. 38A is a diagram illustrating an example of a plurality of measurement points in a case where sequential processing is executed. In the example illustrated in FIG. 38A, the position of the terminal 10-1 at each of times t0 to t4 (in order of earlier time) is obtained as a result of the determination of measurement times at fixed time intervals. Note that the number of measurement points is not limited to five, and may be two or more. FIG. 38B is a diagram illustrating an example of accelerations of the terminal 10-1 in the X-axis direction and the Y-axis direction in a case where the user U1 moves the terminal 10-1 as illustrated in FIG. 38A.

As described above, a description has been given of a case where sequential processing is executed. In addition, the first embodiment of the present disclosure has been described.

2. Second Embodiment (PDR)

Subsequently, a second embodiment of the present disclosure will be described. In the first embodiment of the present disclosure, a description has been given of a case where a user performs a gesture of moving the terminal 10-1 in order to obtain a plurality of measurement points. In the second embodiment of the present disclosure, a description will be given of a case where a plurality of measurement points are obtained by pedestrian dead reckoning (PDR) for specifying the position of a pedestrian by adding a length obtained by multiplying the initial position by a step size and the number of steps.

2.1. Calculation of Position of Partner

Figure 39:
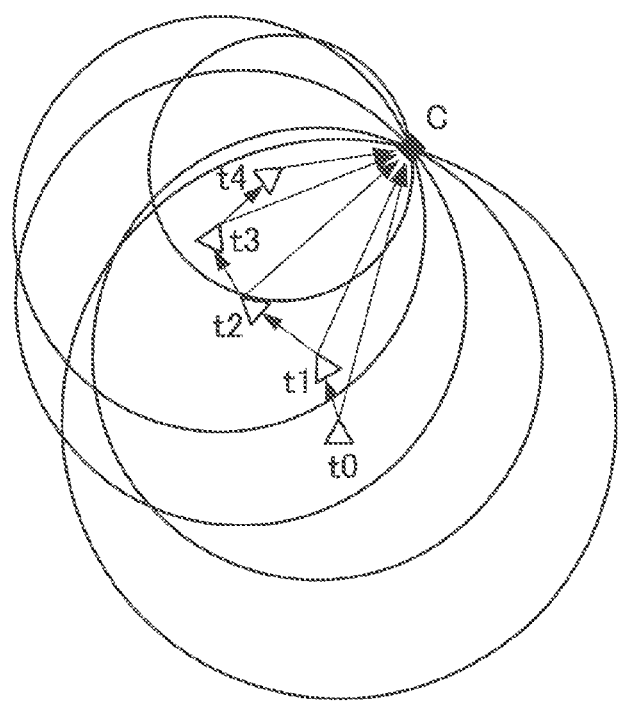
FIG. 39 is a diagram illustrating calculation of the position of a partner according to a second embodiment of the present disclosure.

A description will be given of calculation of the position of a partner according to the second embodiment of the present disclosure. FIG. 39 is a diagram illustrating calculation of the position of a partner according to the second embodiment of the present disclosure. In the second embodiment of the present disclosure, the data processing unit 132 calculates the position of a host terminal 10-1 at each of a plurality of measurement times by pedestrian dead reckoning, and calculates a distance between the host terminal 10-1 and a partner terminal 10-2 at each of the plurality of measurement times.

In the example illustrated in FIG. 39, the data processing unit 132 calculates the initial position (measurement time t0) of the host terminal 10-1 and the subsequent positions (measurement times t1 to t4) of the host terminal 10-1 by pedestrian dead reckoning. In addition, the data processing unit 132 calculates a distance between the host terminal 10-1 and the partner terminal 10-2 at each measurement time (measurement times t0 to t4). The data processing unit 132 can estimate an intersection point C between circles each having the corresponding distance from the position of the host terminal 10-1 at each measurement time (measurement times t0 to t4) as a radius, as the relative position of the partner terminal 10-2.

Also in the second embodiment of the present disclosure, it is possible to estimate the relative position of the partner terminal 10-2 by the same method as in the first embodiment of the present disclosure. Note that it is possible to estimate not only the relative position of the partner terminal 10-2 based on the movement of the host terminal 10-1, but also the relative position of the partner terminal 10-2 in consideration of the movement of the partner terminal 10-2. However, in this case, communication for sharing movement information of the partner terminal 10-2 is additionally required.

As described above, the calculation of the position of a partner according to the second embodiment of the present disclosure has been described.

2.2. Use Case

Subsequently, a specific use case of the present embodiment will be described. Various scenes are assumed as a scene to which the present embodiment is applied. For example, the present embodiment may be used for drones illuminating a night road.

Figure 40:
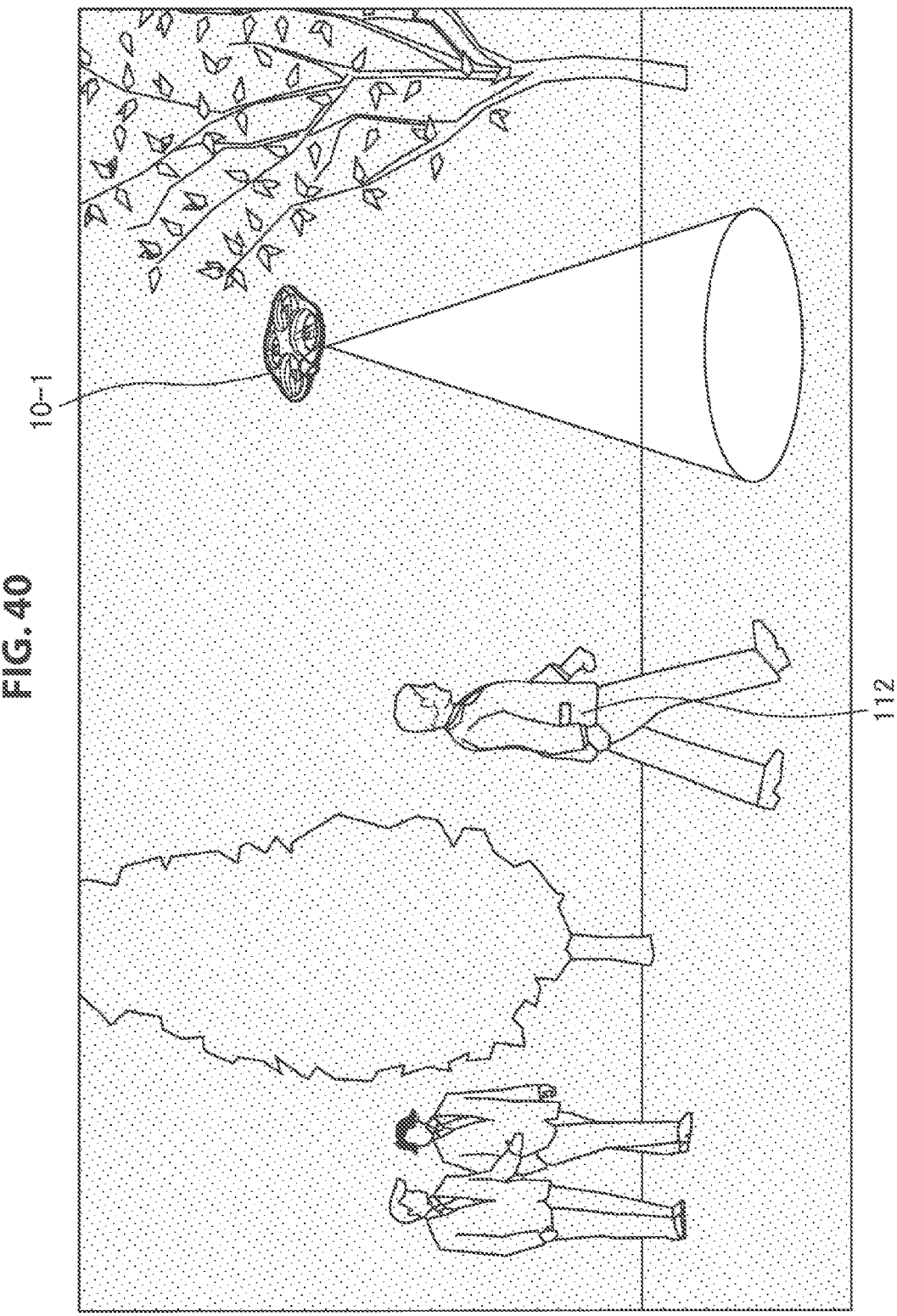
FIG. 40 is a diagram illustrating a case where the present embodiment is used for a drone illuminating a night road.

FIG. 40 is a diagram illustrating a case where the present embodiment is used for a drone illuminating a night road. As illustrated in FIG. 40, a user owns a distance measuring sensor 112, and the host terminal 10-1 is attached to the drone. In this case, the host terminal 10-1 attached to the drone estimates the relative position of the distance measuring sensor 112 of the user based on the position of the host terminal 10-1 in real time, and controls a light so as to illuminate the front side of the user.

Figure 41:
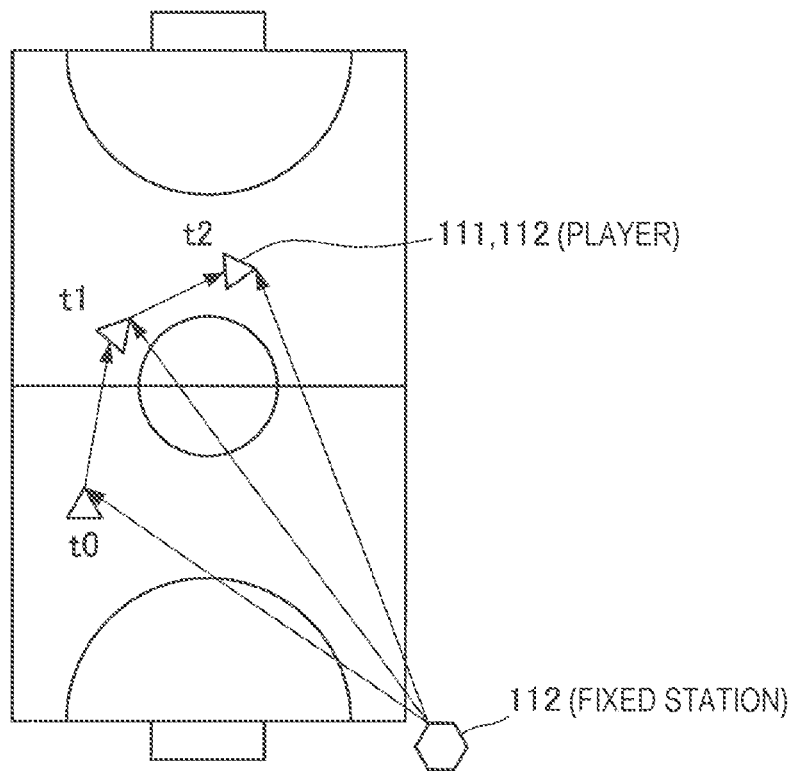
FIG. 41 is a diagram illustrating a case where the present embodiment is used for position tracking in futsal.

In addition, the present embodiment may also be used for position tracking in sports. Here, futsal is mainly assumed as an example of sports, but the sports may be basketball, volleyball, or other sports. FIG. 41 is a diagram illustrating a case where the present embodiment is used for position tracking in futsal. As illustrated in FIG. 41, the distance measuring sensor 112 is attached to a fixed station installed at one point of a court. Here, the position of the fixed station is arbitrary, but the relative position of the fixed station with respect to the court needs to be known.

In addition, an inertial sensor 111 and the distance measuring sensor 112 are attached to each player (hereinafter, it is assumed that a tag including the inertial sensor 111 and the distance measuring sensor 112 is attached to the player). The fixed station may be installed for each player of each team, or one fixed station may be installed for one team in a group. In a case where the fixed station is installed for each player of each team, data may be transmitted to a server through a smartphone paired with a tag or the fixed station. Alternatively, the tag or fixed station itself is connected to Wi-Fi (registered trademark), and data may be transmitted to the server through Wi-Fi (registered trademark), or a communication module of 3G or LTE (registered trademark) is mounted, and data may be transmitted to the server by the communication module. The transmission from the smartphone to the server may be performed during charging of the smartphone.

On the other hand, in a case where one fixed station is installed for each team in a group, sensor data may be transmitted to the fixed station paired with a tag of each player, and sensor data of each player may be transmitted to the server through a smartphone of any one player. Position tracking of each player based on the sensor data of each player may be executed in the server. In addition, each screen to be described below may be displayed in a smartphone. In the example illustrated in FIG. 41, a moving track (times t0 to t2) of a player is calculated by PDR on the basis of inertial sensor data detected by the inertial sensor 111.

In addition, the relative position of the player with respect to the fixed station is estimated on the basis of the moving track of the player and distance measuring sensor data measured during the movement of the player. The relative position of the player which is calculated in this manner is sequentially updated, and thus the relative position of the player in the court is drawn while being tracked in real time. In addition, when the relative position of the player in the court is recorded as a history, it is also possible to look back the relative position of the player with reference to the history later.

Figure 42:
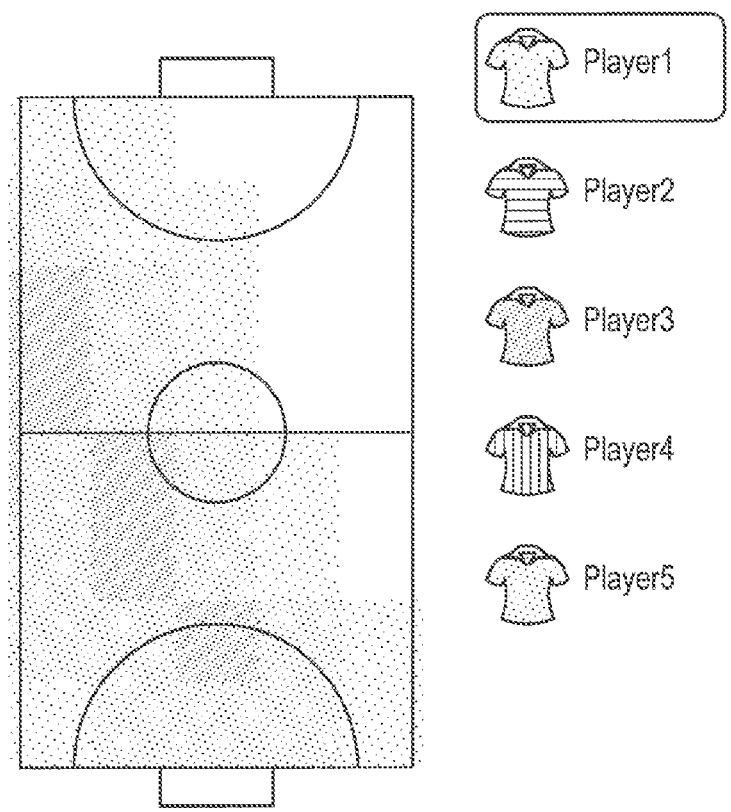
FIG. 42 is a diagram illustrating a display example of position tracking results of a player.
Figure 43:
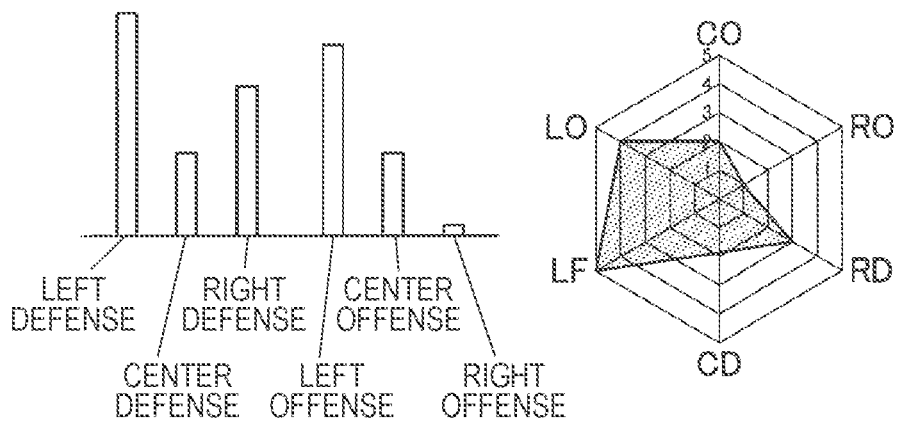
FIG. 43 is a diagram illustrating a display example of position tracking results of a player.

FIGS. 42 to 47 are diagrams illustrating a display example of position tracking results of a player. As illustrated in FIG. 42, a play area of a selected player ("player1" in the example illustrated in FIG. 42) may be displayed by a heat map, on the basis of the relative position of the player in a court. In addition, as illustrated in FIG. 43, a period of play time for each area of a selected player may be displayed by a bar graph and a radar chart, on the basis of the relative position of the player in the court.

Figure 44:
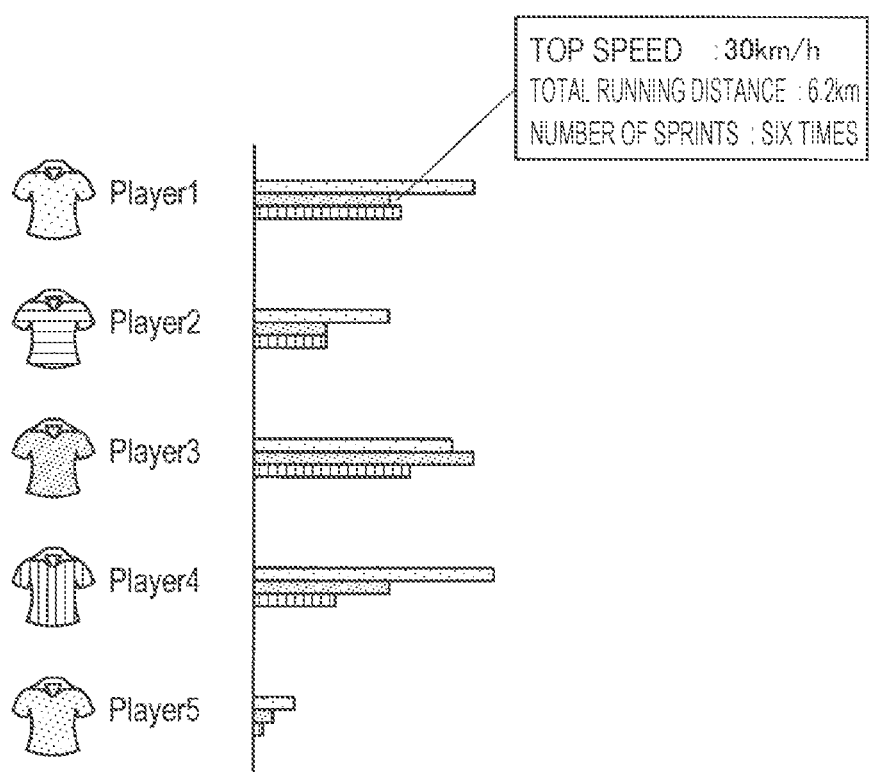
FIG. 44 is a diagram illustrating a display example of position tracking results of a player.

In addition, as illustrated in FIG. 44, the top speed, the total running distance, and the number of sprints of each player may be displayed (so as to be visualized for comparison between players), on the basis of the relative position of each player in the court. Note that the sprint may mean running at a speed equal to or higher than 24 kilometers (15 miles) per hour.

Figure 45:
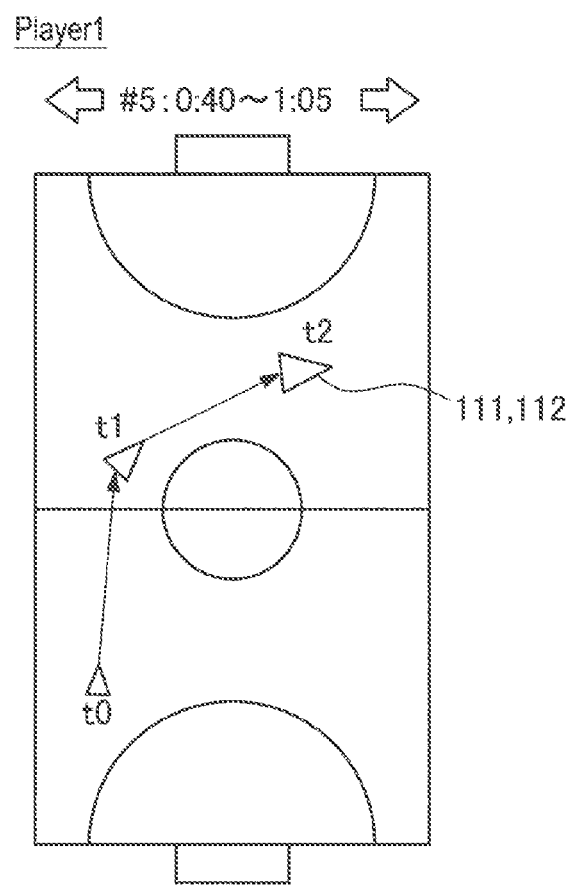
FIG. 45 is a diagram illustrating a display example of position tracking results of a player.

In addition, as illustrated in FIG. 45, the position and the direction of a selected player ("player1" in the example illustrated in FIG. 45) at a timing of stop or switching (direction change) may be displayed. In the example illustrated in FIG. 45, the position and the direction of the player1 at time t0 (0 minutes 40 seconds after the start of a game), time t1, and time t2 (1 minute 5 seconds after the start of the game) are displayed. In addition, as illustrated in FIG. 45, a line connecting the positions of the player at a plurality of times may be displayed so that a moving track of the player can be seen.

Figure 46:
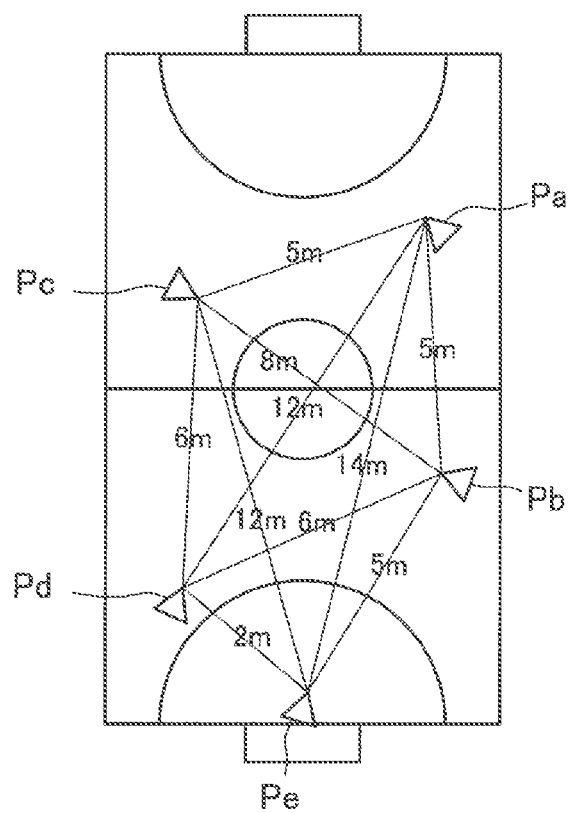
FIG. 46 is a diagram illustrating a display example of position tracking results of a player.

In addition, as illustrated in FIG. 46, the positions and directions of respective players Pa to Pe may be displayed. In addition, as illustrated in FIG. 46, distances between the players are displayed, and thus it is possible to easily confirm the positional relationship between the players and the balance of positioning. In addition, the distance may be displayed by the color of a line rather than the numerical value. In addition, the position and the direction of each of the players Pa to Pe may be displayed in real time, or may be logged later.

Figure 47:
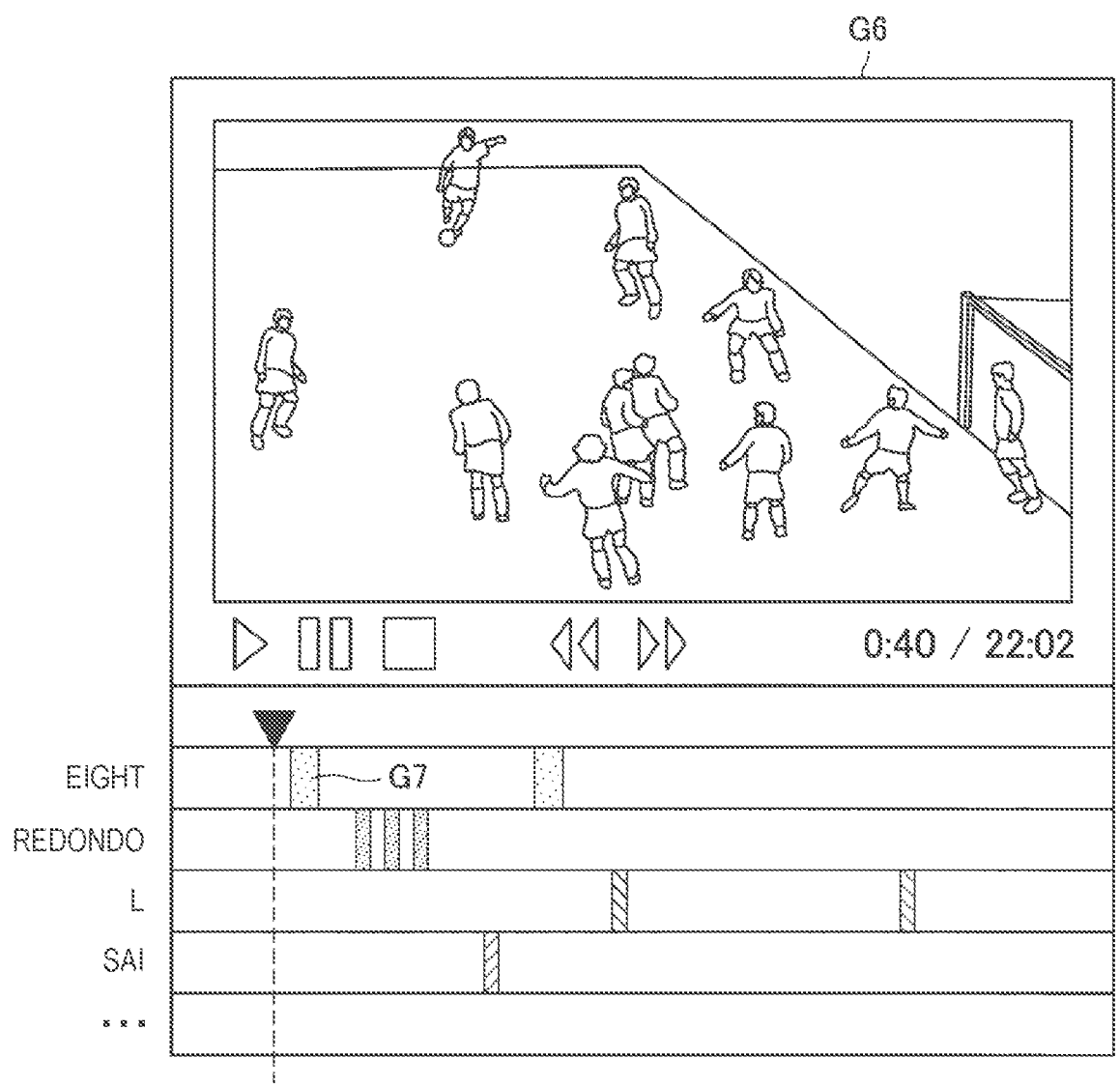
FIG. 47 is a diagram illustrating a display example of position tracking results of a player.

In addition, as illustrated in FIG. 47, in a case where a specific pattern (tactics) in futsal is detected from changes in a positional relationship between players, the detected pattern may be displayed on a timeline (a screen G6). Then, it is possible to confirm a position where the pattern is detected, along with reproduction of a video. In addition, a pattern detection position (for example, a position G7) in the timeline is selected, and thus the video may be sought to the position.

As described above, the use case of the present embodiment has been described. In addition, the second embodiment of the present disclosure has been described.

3. Hardware Configuration Example

Figure 48:
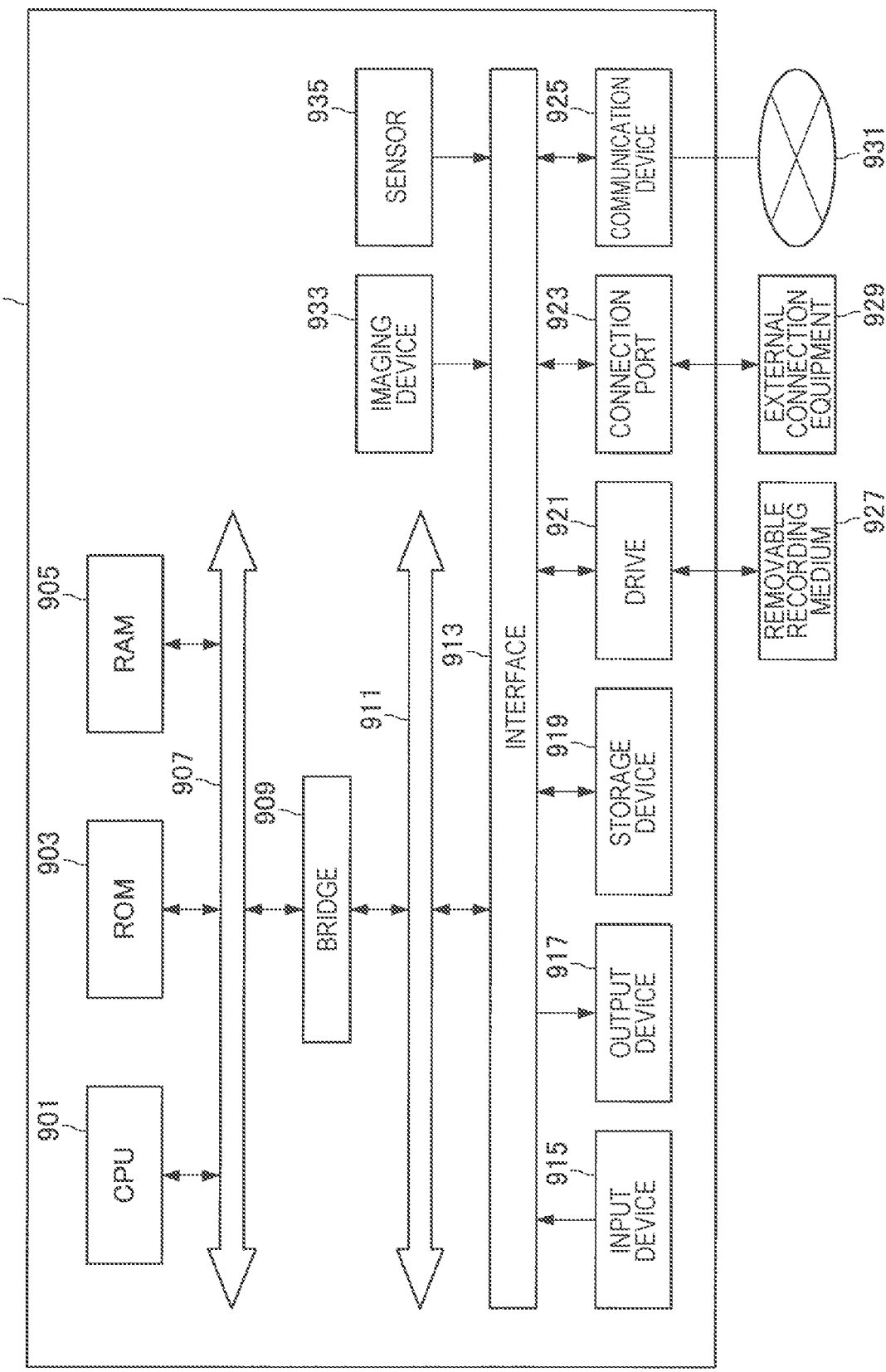
FIG. 48 is a block diagram illustrating a hardware configuration example of an information processing device.

Next, with reference to FIG. 48, a hardware configuration of the information processing device 10 according to the embodiment of the present disclosure will be described. FIG. 48 is a block diagram illustrating the hardware configuration example of the information processing device 10 according to the embodiment of the present disclosure.

As illustrated in FIG. 48, the information processing device 10 includes a central processing unit (CPU) 901, read only memory (ROM) 903, and random access memory (RAM) 905. In addition, the information processing device 10 may include a host bus 907, a bridge 909, an external bus 911, an interface 913, an input device 915, an output device 917, a storage device 919, a drive 921, a connection port 923, and a communication device 925. Moreover, the information processing device 10 may include an imaging device 933 and a sensor 935, as necessary. The information processing device 10 may include a processing circuit such as a digital signal processor (DSP) or an application specific integrated circuit (ASIC), alternatively or in addition to the CPU 901.

The CPU 901 serves as an arithmetic processing device and a control device, and controls the overall operation or a part of the operation of the information processing device 10 according to various programs recorded in the ROM 903, the RAM 905, the storage device 919, or a removable recording medium 927. The ROM 903 stores programs, operation parameters, and the like used by the CPU 901. The RAM 905 temporarily stores programs used when the CPU 901 is executed, and parameters that change as appropriate when executing such programs. The CPU 901, the ROM 903, and the RAM 905 are connected with each other via the host bus 907 configured from an internal bus such as a CPU bus. In addition, the host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the information processing device 10. The input device 915 includes an input control circuit that generates input signals on the basis of information which is input by a user to output the generated input signals to the CPU 901. A user inputs various types of data and indicates a processing operation to the information processing device 10 by operating the input device 915. In addition, the imaging device 933 (to be described later) may function as the input device by capturing an image of movement of hands of a user or capturing a finger of a user. In this case, a pointing position may be decided in accordance with the movement of the hands or a direction of the finger.

The output device 917 includes a device that can visually or audibly report acquired information to a user. The output device 917 may be, for example, a display device such as a liquid crystal display (LCD), a plasma display panel (PDP), an organic electro-luminescence (EL) display, a projector, or a hologram display device, a sound output device such as a speaker or a headphone, or a printer. The output device 917 outputs a result obtained through a process performed by the information processing device 10, in the form of text or video such as an image, or sounds such as voice and audio sounds. In addition, the output device 917 may include a light or the like to light the surroundings.

The storage device 919 is a device for data storage that is an example of the storage unit of the information processing device 10. The storage device 919 includes, for example, a magnetic storage unit device such as a hard disk drive (HDD), a semiconductor storage device, an optical storage device, or a magneto-optical storage device. The storage device 919 stores therein various data and programs executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the information processing device 10. The drive 921 reads out information recorded on the mounted removable recording medium 927, and outputs the information to the RAM 905. The drive 921 writes the record into the mounted removable recording medium 927.

The connection port 923 is a port used to directly connect equipment to the information processing device 10. The connection port 923 may be a USB (Universal Serial Bus) port, an IEEE1394 port, and a Small Computer System Interface (SCSI) port, or the like. In addition, the connection port 923 may be an RS-232C port, an optical audio terminal, an HDMI (registered trademark) (High-Definition Multimedia Interface) port, and so on. The connection of the external connection equipment 929 to the connection port 923 makes it possible to exchange various kinds of data between the information processing device 10 and the external connection equipment 929.

The communication device 925 is a communication interface including, for example, a communication device for connection to the communication network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transmits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio communication, or satellite communication.

The imaging device 933 is a device that captures images of a real space by using an image sensor such as a charge coupled device (CCD) or a complementary metal oxide semiconductor (CMOS), and various members such as a lens for controlling image formation of a subject image onto the image sensor, and generates the captured images. The imaging device 933 may capture a still image or a moving image.

The sensor 935 is various sensors such as a ranging sensor, an acceleration sensor, a gyro sensor, a geomagnetic sensor, a vibration sensor, an optical sensor, and a sound sensor. The sensor 935 acquires information regarding a state of the information processing device 10 such as a posture of a housing of the information processing device 10, and information regarding an environment surrounding the information processing device 10 such as luminous intensity and noise around the information processing device 10. The sensor 935 may include a global positioning system (GPS) sensor that receives GPS signals to measure latitude, longitude, and altitude of the device.

4. Conclusion

As described above, according to the embodiments of the present disclosure, there is provided an information processing device including a sensor control unit that acquires inertial sensor data detected by an inertial sensor and distance measuring sensor data detected by a distance measuring sensor, and a data processing unit that estimates a relative position on the basis of the inertial sensor data and the distance measuring sensor data. According to such a configuration, it is possible to improve the accuracy of position estimation while reducing time and effort for installing facilities in an environment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the position of each component is not particularly limited as long as the operation of the information processing device 10 described above is realized. As a specific example, as described above, some or all of the blocks other than the detection unit 110 may be present outside the information processing device 10. That is, some or all of the blocks other than the detection unit 110 may be present in a mobile terminal (for example, a smartphone or the like) or the like, or may be present in a server or the like. The information processing device 10 may be achieved by so-called cloud computing.

In addition, it is also possible to create a computer program for causing hardware such as CPU, ROM, and RAM, which are embedded in a computer, to execute functions equivalent to the functions of the control unit 130. Moreover, it may be possible to provide a computer-readable recording medium having the program recorded thereon.

Further, the effects described in this specification are merely illustrative or exemplified effects, and are not limitative. That is, with or in the place of the above effects, the technique according to the present disclosure may achieve other effects that are clear to those skilled in the art from the description of this specification.

Additionally, the present technology may also be configured as below.

(1)

An information processing device including:

a sensor control unit configured to acquire inertial sensor data detected by an inertial sensor and distance measuring sensor data detected by a distance measuring sensor; and a data processing unit configured to estimate a relative position on a basis of the inertial sensor data and the distance measuring sensor data.

(2)

The information processing device according to (1), in which the inertial sensor and the distance measuring sensor are included in a terminal, and the data processing unit calculates a position of the terminal at each of a plurality of measurement times on a basis of the inertial sensor data, calculates a distance between the terminal and a searching target at each of the plurality of measurement times on a basis of the distance measuring sensor data, and estimates a relative position of the searching target based on the position of the terminal, on a basis of the position of the terminal and the distance.

(3)

The information processing device according to (2), in which the relative position includes the distance between the terminal and the searching target and a direction of the searching target based on the position of the terminal.

(4)

The information processing device according to (2) or (3), including an output control unit configured to control an output for prompting a gesture of moving the terminal.

(5)

The information processing device according to (4), in which the output control unit controls display of a track having a predetermined shape and display for prompting a gesture of moving the terminal along the track.

(6)

The information processing device according to (5), in which the data processing unit determines a plurality of times when a speed calculated in accordance with the inertial sensor data satisfies a predetermined speed condition as the plurality of measurement times.

(7)

The information processing device according to (4), in which the output control unit controls display of a track having a predetermined shape and display for prompting a gesture of temporarily keeping the terminal stationary at a predetermined position while moving the terminal along the track.

(8)

The information processing device according to (7), in which the data processing unit determines a plurality of times when an acceleration indicated by the inertial sensor data satisfies a predetermined acceleration condition as the plurality of measurement times.

(9)

The information processing device according to (4), in which the data processing unit determines the plurality of measurement times of predetermined time intervals.

(10)

The information processing device according to (2) or (3), in which the data processing unit calculates the position of the terminal at each of the plurality of measurement times by pedestrian dead reckoning, and calculates the distance between the terminal and the searching target at each of the plurality of measurement times.

(11)

The information processing device according to any one of (1) to (3), including an output control unit configured to control output of an error in a case where the estimation of the relative position is not successful.

(12)

The information processing device according to (2) or (3), including an output control unit configured to control output of a predetermined notice in a case where the distance between the terminal and the searching target exceeds a predetermined distance.

(13)

The information processing device according to any one of (1) to (3), including an output control unit configured to control output of the relative position.

(14)

The information processing device according to (2) or (3), in which the data processing unit determines whether or not there is an intersection point between tracks each centered on the position of the terminal and having the distance as a radius, in each set of two measurement times selected from among the plurality of measurement times, and estimates the relative position on a basis of an intersection point determined to be present.

(15)

The information processing device according to (14), in which, in a case where there are a plurality of sets including an intersection point, the data processing unit estimates a midpoint or a center of gravity of an intersection point group in which a total distance between intersection points selected from the respective sets is minimized as the relative position.

(16)

The information processing device according to (2) or (3), in which the data processing unit calculates the relative position with respect to each set of two or more measurement times selected from among the plurality of measurement times, and estimates a midpoint or a center of gravity of the calculated relative position as the relative position.

(17)

The information processing device according to (2) or (3), in which the data processing unit calculates a degree of reliability of the relative position, and determines the relative position in a case where the degree of reliability exceeds a threshold value.

(18)

The information processing device according to (17), in which the data processing unit calculates the relative position with respect to each set of two or more measurement times selected from among the plurality of measurement times, and calculates a degree of variation in the calculated relative position as the degree of reliability.

(19)

An information processing method including:

acquiring inertial sensor data detected by an inertial sensor and distance measuring sensor data detected by a distance measuring sensor; and estimating a relative position by a processor on a basis of the inertial sensor data and the distance measuring sensor data.

(20)

A program causing a computer to function as an information processing device including:

a sensor control unit configured to acquire inertial sensor data detected by an inertial sensor and distance measuring sensor data detected by a distance measuring sensor; and a data processing unit configured to estimate a relative position on a basis of the inertial sensor data and the distance measuring sensor data.

REFERENCE SIGNS LIST 1 information processing system
10-1 host terminal (information processing device)
10-2 partner terminal
110 detection unit
111 inertial sensor
112 distance measuring sensor
120 operation unit
130 control unit
131 sensor control unit
132 data processing unit
133 output control unit
140 storage unit
150 output unit
151 display unit
152 vibrator

The invention claimed is:

1. An information processing device, comprising:
a central processing unit (CPU) configured to:
control an output to prompt a gesture that corresponds to a movement of a terminal;
acquire, based on the gesture, inertial sensor data detected by an inertial sensor and distance measuring sensor data detected by a distance measuring sensor, wherein the inertial sensor data includes speed of the terminal;
determine, as a plurality of measurement times, a plurality of times at which the speed of the terminal satisfies a specific speed condition;
calculate a position of the terminal at each of the plurality of measurement times based on the inertial sensor data;
calculate a distance between the terminal and a searching target at each of the plurality of measurement times based on the distance measuring sensor data; and
estimate, based on the position of the terminal at each of the plurality of measurement times and the distance at each of the plurality of measurement times, a relative position of the searching target with respect to the position of the terminal.

2. The information processing device according to claim 1,
wherein the inertial sensor and the distance measuring sensor are included in the terminal.

3. The information processing device according to claim 2,
wherein the relative position includes:
the distance between the terminal and the searching target, and
a direction of the searching target with respect to the position of the terminal.

4. The information processing device according to claim 2, wherein the CPU is further configured to:
control a display screen to display a track having a specific shape; and
control the display screen to display the prompt of the gesture of temporarily keeping the terminal stationary at a specific position while the terminal along the track is moved.

5. The information processing device according to claim 4, wherein
the inertial sensor data further includes acceleration of the terminal, and
the CPU is further configured to determine, as the plurality of measurement times, the plurality of times at which the acceleration of the terminal satisfies a specific acceleration condition.

6. The information processing device according to claim 2, wherein the CPU is further configured to determine the plurality of measurement times specific time intervals.

7. The information processing device according to claim 2, wherein each of the plurality of measurement times is based on pedestrian dead reckoning.

8. The information processing device according to claim 2, wherein the CPU is further configured to control output of a notice based on the distance between the terminal and the searching target exceeds a specific distance.

9. The information processing device according to claim 2,
wherein the CPU is further configured to:
determine an intersection point between a plurality of tracks, wherein
each of the plurality of tracks is centered on the position of the terminal, and
each of the plurality of tracks has the distance as a radius in each set of two measurement times selected from among the plurality of measurement times; and
estimate the relative position based on intersection point.

10. The information processing device according to claim 9, wherein
based on a plurality of sets that includes intersection points, CPU is further configured to estimate, as the relative position, one of a midpoint or a center of gravity of an intersection point group in which a total distance between the intersection points selected from respective sets of the plurality of sets is minimized and the intersection point group includes the intersection points.

11. The information processing device according to claim 2, wherein the CPU is further configured to:
calculate the relative position with respect to each set of two or more measurement times selected from among the plurality of measurement times, and
estimate, as the relative position, one of a midpoint or a center of gravity of the calculated relative position.

12. The information processing device according to claim 2, wherein the CPU is further configured to:
calculate a degree of reliability of the relative position; and
determine the relative position based on the degree of reliability exceeds a threshold value.

13. The information processing device according to claim 12, wherein the CPU is further configured to:
calculate the relative position with respect to each set of two or more measurement times selected from among the plurality of measurement times; and
calculate a degree of variation in the calculated relative position as the degree of reliability.

14. An information processing method, comprising:
controlling an output to prompt a gesture that corresponds to a movement of a terminal:
acquiring, based on the gesture, inertial sensor data detected by an inertial sensor and distance measuring sensor data detected by a distance measuring sensor, wherein the inertial sensor data includes speed of the terminal;
determining, as a plurality of measurement times, a plurality of times at which the speed of the terminal satisfies a specific speed condition;
calculating a position of the terminal at each of the plurality of measurement times based on the inertial sensor data;
calculating a distance between the terminal and a searching target at each of the plurality of measurement times based on the distance measuring sensor data; and
estimating, based on the position of the terminal at each of the plurality of measurement times and the distance at each of the plurality of measurement times, a relative position of the searching target with respect to the position of the terminal.

15. A non-transitory computer-readable medium having stored thereon computer-executable instructions which, when executed by a central processing unit (CPU) of an information processing device, cause the CPU to execute operations, the operations comprising:
controlling an output to prompt a gesture that corresponds to a movement of a terminal;
acquiring, based on the gesture, inertial sensor data detected by an inertial sensor and distance measuring sensor data detected by a distance measuring sensor, wherein the inertial sensor data includes speed of the terminal;
determining, as a plurality of measurement times, a plurality of times at which the speed of the terminal satisfies a specific speed condition;
calculating a position of the terminal at each of the plurality of measurement times based on the inertial sensor data;
calculating a distance between the terminal and a searching target at each of the plurality of measurement times based on the distance measuring sensor data; and
estimating, based on the position of the terminal at each of the plurality of measurement times and the distance at each of the plurality of measurement times, a relative position of the searching target with respect to the position of the terminal.

16. An information processing device, comprising:
a central processing unit (CPU) configured to:
control a display screen to display a track having a specific shape;
control the display screen to display prompt of a gesture of temporarily keeping a terminal stationary at a specific position while movement of the terminal along the track;
acquire, based on the gesture, inertial sensor data detected by an inertial sensor and distance measuring sensor data detected by a distance measuring sensor, wherein the inertial sensor data includes acceleration of the terminal;
determine, as a plurality of measurement times, a plurality of times at which the acceleration of the terminal satisfies a specific acceleration condition;
calculate a position of the terminal at each of the plurality of measurement times based on the inertial sensor data;
calculate a distance between the terminal and a searching target at each of the plurality of measurement times based on the distance measuring sensor data; and
estimate, based on the position of the terminal at each of the plurality of measurement times and the distance at each of the plurality of measurement times, a relative position of the searching target with respect to the position of the terminal.

17. The information processing device according to claim 1, wherein the CPU is further configured to:
control a display screen to display a track having a specific shape; and
control the display screen to display the prompt of the gesture along the track.

18. The information processing device according to claim 1, wherein the CPU is further configured to control output of an error based on the estimation of the relative position is not successful.

19. The information processing device according to claim 1, wherein the CPU is further configured to control output of the relative position.

* * * * *